United States Patent
Yoneda et al.

(10) Patent No.: US 8,396,925 B2
(45) Date of Patent: Mar. 12, 2013

(54) INFORMATION PROCESSING DEVICE AND METHOD TO EXPAND CONTENT RECEPTION NETWORK

(75) Inventors: Yoshihiro Yoneda, Kanagawa (JP); Naoki Miyabayashi, Tokyo (JP); Isao Soma, Saitama (JP); Seiji Kuroda, Kanagawa (JP); Yasuharu Ishikawa, Kanagawa (JP); Kazuo Takada, Chiba (JP)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 12/562,711

(22) Filed: Sep. 18, 2009

(65) Prior Publication Data

US 2010/0077031 A1 Mar. 25, 2010

(30) Foreign Application Priority Data

Sep. 22, 2008 (JP) ................................ 2008-242443

(51) Int. Cl.
*G06F 15/16* (2006.01)
(52) U.S. Cl. ....................................... 709/205; 709/204
(58) Field of Classification Search .......... 709/204–205, 709/230–231, 238–239; 455/436–444, 452–455
See application file for complete search history.

(56) References Cited

U.S. PATENT DOCUMENTS

| 7,054,914 | B2 | 5/2006 | Suzuki et al. |
| 7,350,074 | B2* | 3/2008 | Gupta et al. ................... 713/157 |
| 2004/0023652 | A1* | 2/2004 | Shah et al. .................. 455/426.2 |
| 2004/0203385 | A1* | 10/2004 | Narayanan et al. ........... 455/41.2 |
| 2004/0210657 | A1* | 10/2004 | Narayanan et al. ........... 709/227 |
| 2005/0286478 | A1* | 12/2005 | Mela et al. .................... 370/338 |
| 2005/0288023 | A1* | 12/2005 | Kim et al. ..................... 455/439 |
| 2007/0037576 | A1* | 2/2007 | Subramanian et al. ........ 455/436 |
| 2007/0082699 | A1 | 4/2007 | Karaoguz et al. |
| 2007/0093199 | A1* | 4/2007 | Bowen et al. ................ 455/3.02 |
| 2007/0121541 | A1 | 5/2007 | Matsuo |
| 2008/0049674 | A1* | 2/2008 | Cha et al. ...................... 370/331 |

(Continued)

FOREIGN PATENT DOCUMENTS

| JP | 2001-215975 | 8/2001 |
| JP | 2001-352291 | 12/2001 |

(Continued)

OTHER PUBLICATIONS

M. Handley and V. Jacobson, "SDP: session description protocol, Request for Comments (Proposed Standard) 2327," IETF, Apr. 1998.*

(Continued)

*Primary Examiner* — Brendan Higa
(74) *Attorney, Agent, or Firm* — Oblon, Spivak, McClelland, Maier & Neustadt, L.L.P.

(57) ABSTRACT

An information processing device includes: a first receiving unit to receive, from a first other information processing device, equipment information of a second other information processing device that differs from the first other information processing device, via a first communication and first connecting information useful for connecting with the second other information processing device by a second communication that differs from the first communication; a first transmitting unit to transmit second connection information that is useful for connecting with the device itself by the second communication to the first other information processing device, via the first communication; and a second receiving unit to receive content data transmitted from the second other information processing device by the second communication, based on the first connection information and the second connection information.

45 Claims, 37 Drawing Sheets

U.S. PATENT DOCUMENTS

| | | |
|---|---|---|
| 2008/0085682 A1 | 4/2008 | Rao |
| 2008/0089299 A1* | 4/2008 | Lindsley et al. ............... 370/338 |
| 2009/0006533 A1* | 1/2009 | Guo ............................... 709/203 |
| 2009/0111470 A1* | 4/2009 | Thakare ......................... 455/436 |
| 2009/0221271 A1 | 9/2009 | Soma et al. |
| 2009/0222890 A1* | 9/2009 | Kang et al. ........................ 726/3 |
| 2009/0305694 A1* | 12/2009 | Zheng et al. ................ 455/426.1 |

FOREIGN PATENT DOCUMENTS

| | | |
|---|---|---|
| JP | 2004-260244 A | 9/2004 |
| JP | 2006-092573 A | 4/2006 |
| JP | 2007-189464 A | 7/2007 |
| JP | 2009-538006 A | 10/2009 |
| WO | WO2006/080267 A1 | 8/2006 |
| WO | WO 2007/054775 A2 | 5/2007 |
| WO | WO 2007/054775 A3 | 5/2007 |
| WO | WO2007/131555 A1 | 11/2007 |

OTHER PUBLICATIONS

U.S. Appl. No. 12/561,504, filed Sep. 17, 2009, Yoneda, et al.

* cited by examiner

FIG. 6

| ITEMS | DETAILS | EXAMPLE |
|---|---|---|
| CAPABILITY INFORMATION | ADDRESS | BD ADDRESS, MAC ADDRESS |
| | PROTOCOL TYPE | Bluetooth, WiFi |
| | EQUIPMENT TYPE | PORTABLE TELEPHONE, CAR NAVIGATION SYSTEM, PC |
| | PROFILE | |
| | APPLICATION IDENTIFIER | MUSIC PLAYER, PHOTOGRAPHS, GAMES |
| PROFILE INFORMATION | USER ID | IDENTIFIER TO UNIQUELY IDENTIFY USER |
| | NICKNAME | |
| | PROFILE PHOTOGRAPH | |
| | OCCUPATION TYPE | |
| | COUNTRY | |
| | MARITAL STATUS | |
| | DATE OF BIRTH | |
| | POSTAL CODE | |
| | ADDRESS | |
| | TELEPHONE NUMBER | |
| | MESSAGE | |
| CONTENT OPERATION AUTHORITY | HAVE PLAYING CONTROL AUTHORITY? | YES/NO |

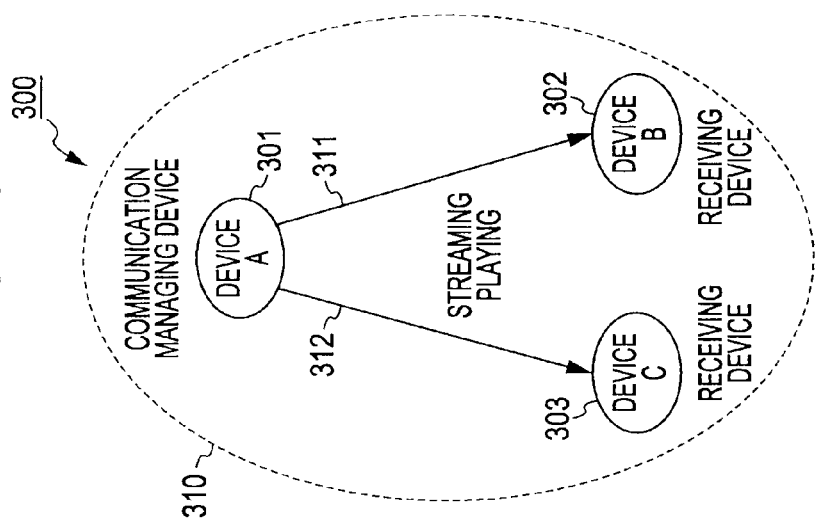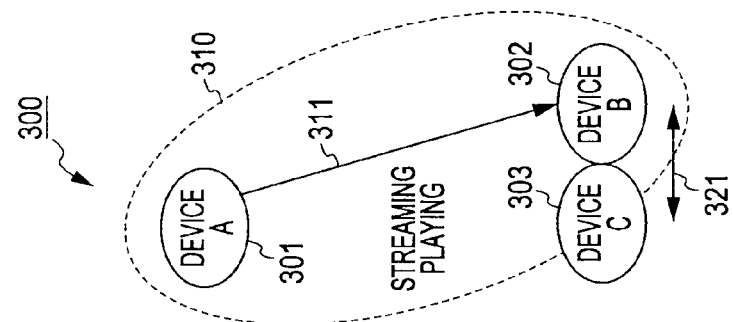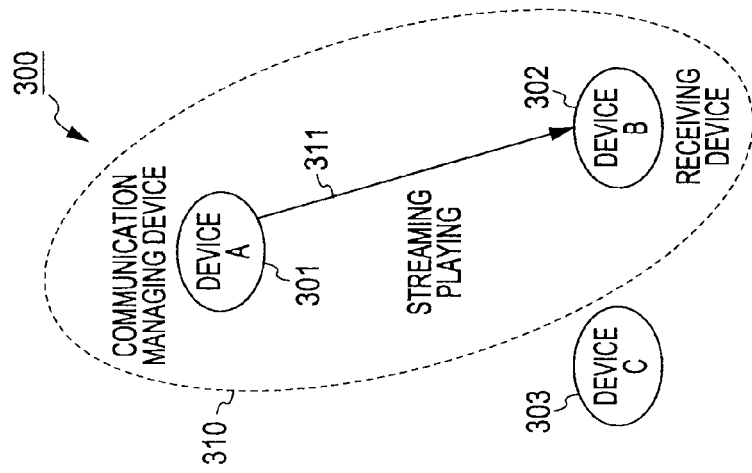

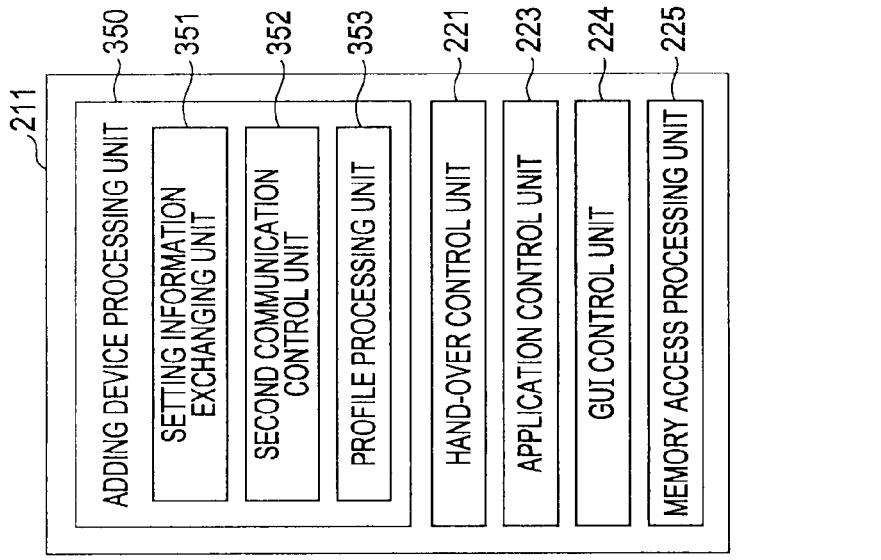
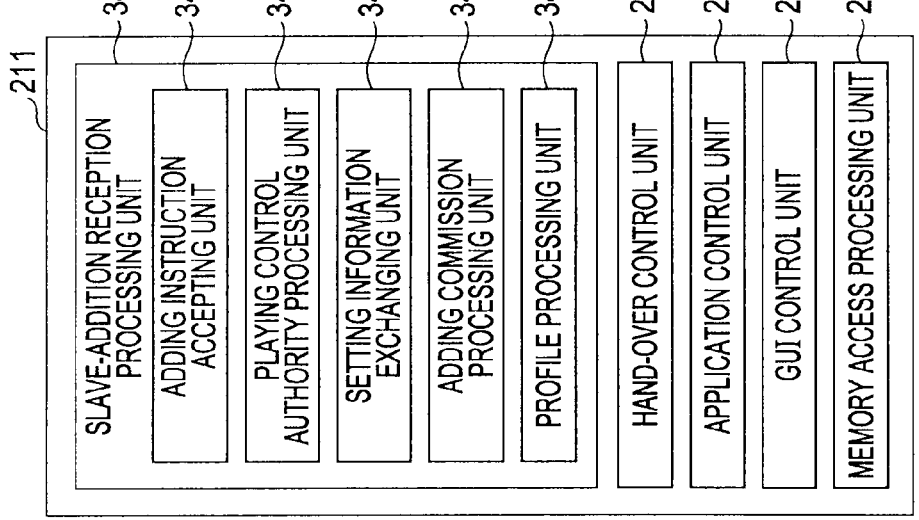
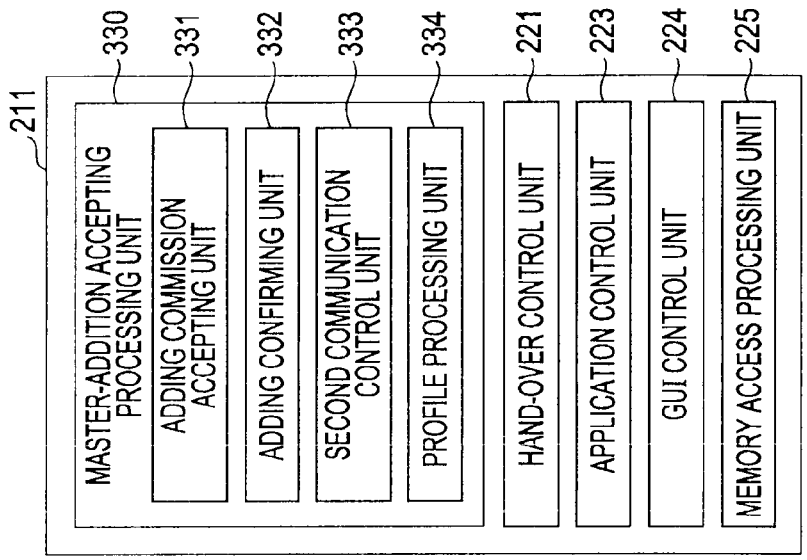

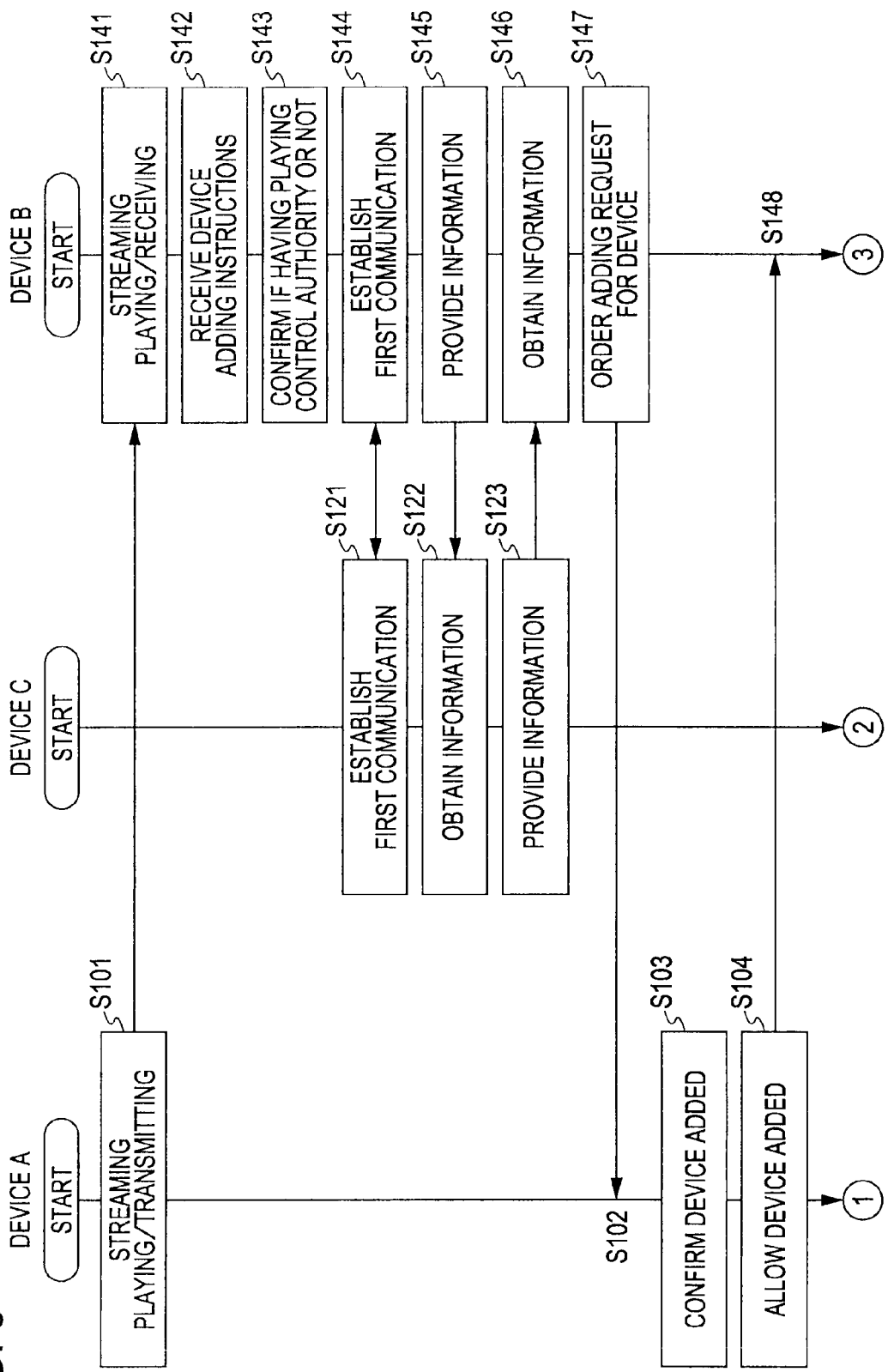

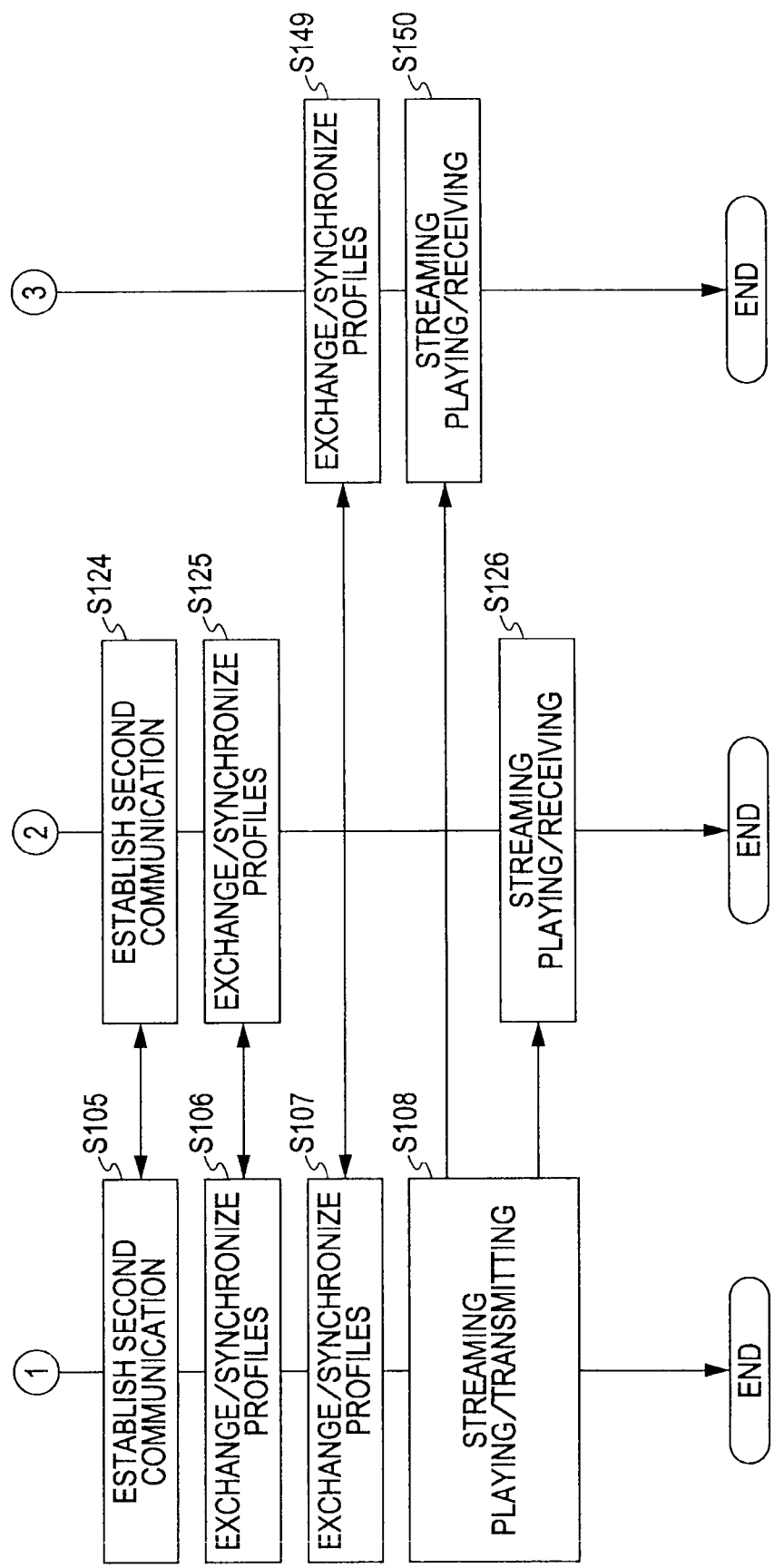

FIG. 17

361
| | |
|---|---|
| MASTER ADDRESS: ADDRESS A | ~371 |
| MASTER CAPABILITY INFORMATION: CAPABILITY INFORMATION A | ~372 |
| NEW MASTER PIN: 1234 | ~373 |
| OWN ADDRESS: ADDRESS B | ~374 |
| OWN CAPABILITY INFORMATION: CAPABILITY INFORMATION B | ~375 |
| CONTENT OPERATION AUTHORITY: THERE ARE PLAYING CONTROLS | ~376 |

362
| | |
|---|---|
| OWN ADDRESS: ADDRESS C | ~377 |
| OWN CAPABILITY INFORMATION: CAPABILITY INFORMATION C | ~378 |
| NEW MASTER PIN: 1234 | ~379 |

363
| | |
|---|---|
| ADDING COMMISSION REQUEST COMMAND | ~380 |
| ADDING DEVICE ADDRESS: ADDRESS C | ~381 |
| ADDING DEVICE CAPABILITY INFORMATION: CAPABILITY INFORMATION C | ~382 |
| NEW MASTER PIN: 1234 | ~383 |
| OWN ADDRESS: ADDRESS B | ~384 |
| OWN CAPABILITY INFORMATION: CAPABILITY INFORMATION B | ~385 |
| ADDING DEVICE CONTENT OPERATING AUTHORITY: THERE ARE PLAYING CONTROLS | ~386 |

364
| | |
|---|---|
| ADDING REQUEST ALLOWING RESPONSE | ~387 |
| NEW MASTER PIN: 1234 | ~388 |
| OWN ADDRESS: ADDRESS A | ~389 |
| OWN CAPABILITY INFORMATION: CAPABILITY INFORMATION A | ~390 |

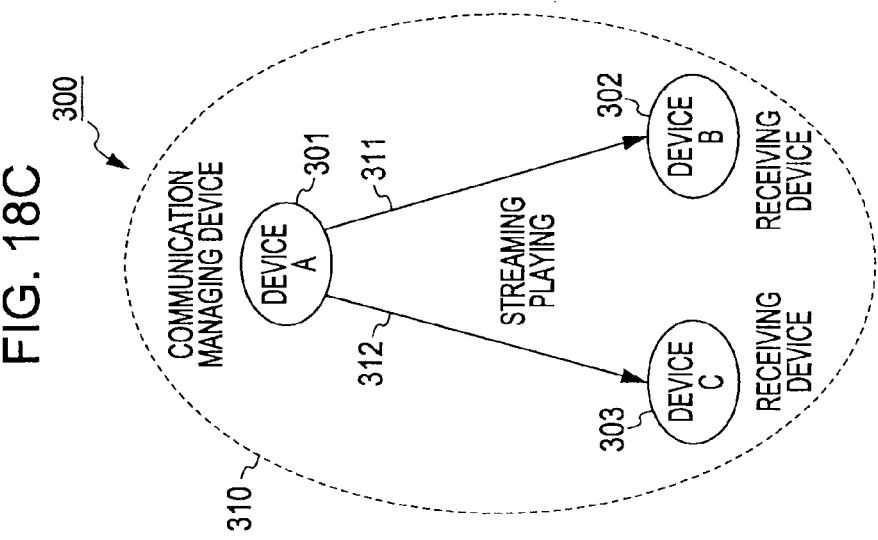
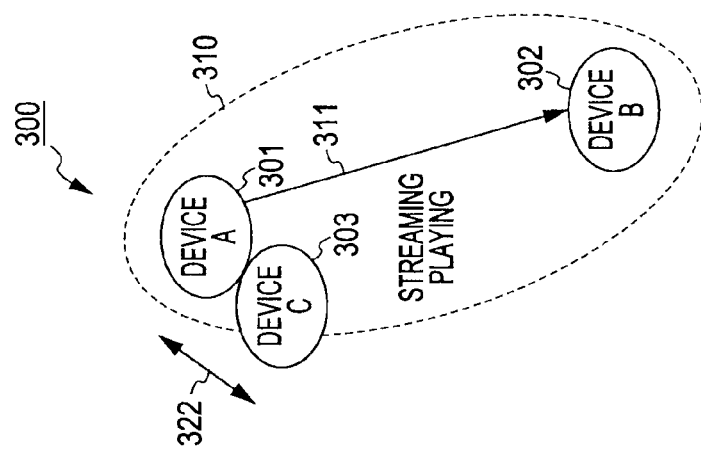
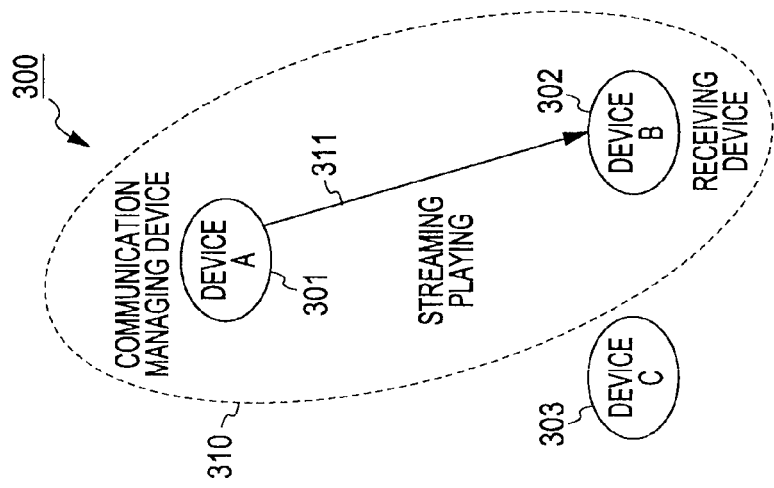

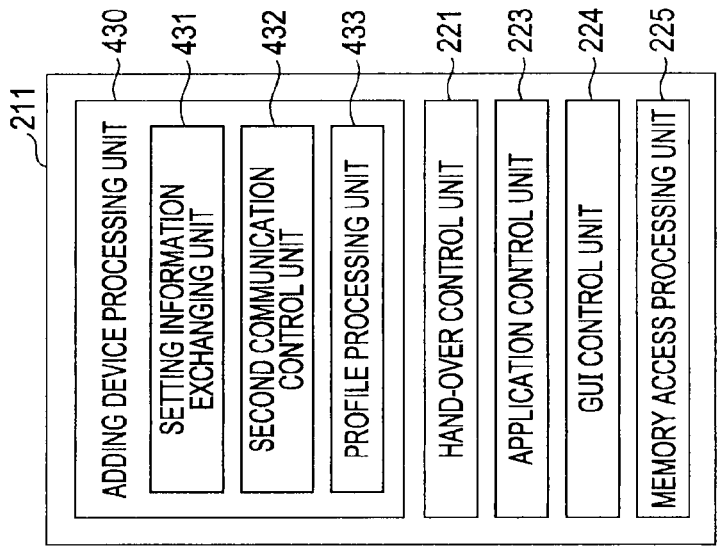
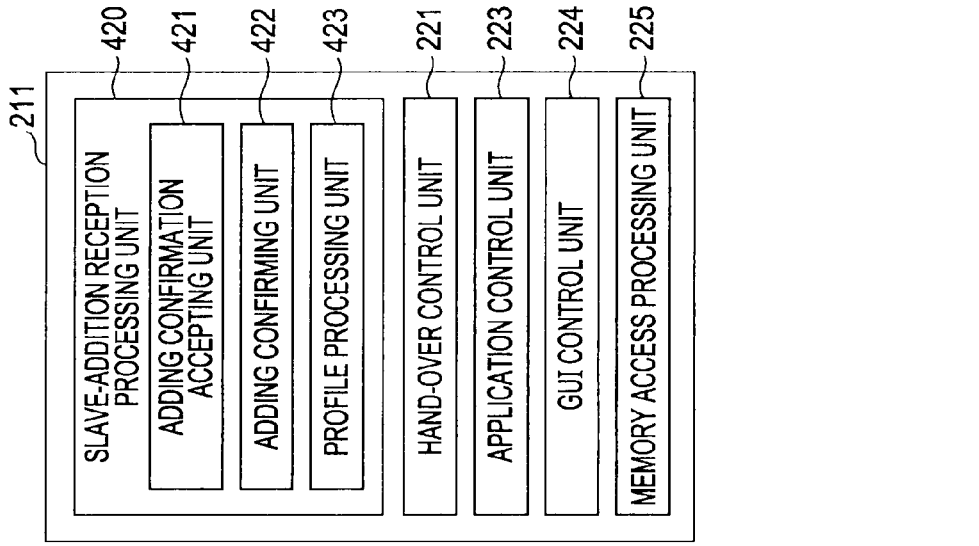
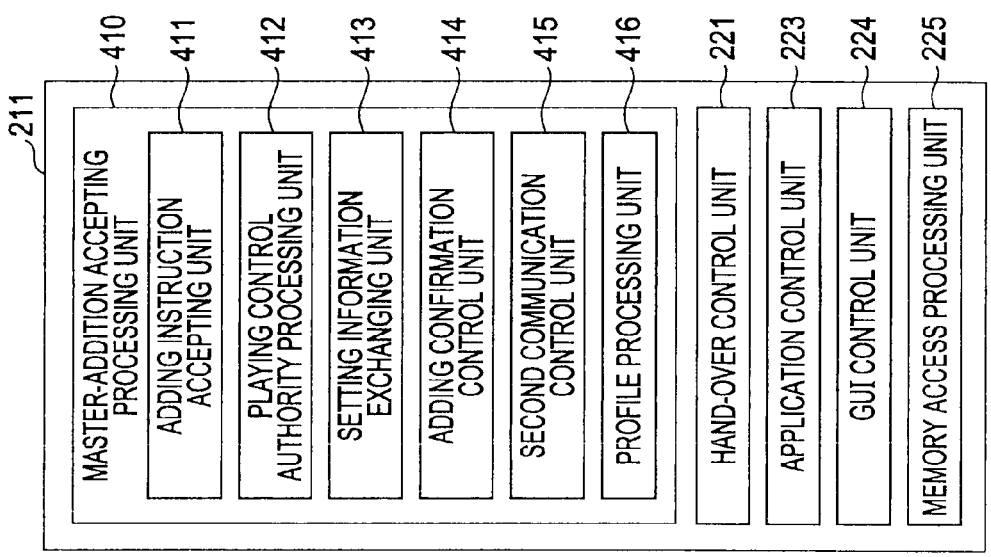

FIG. 22

| | | |
|---|---|---|
| | 461 | |
| | MASTER ADDRESS: ADDRESS A | 471 |
| | MASTER CAPABILITY INFORMATION: CAPABILITY INFORMATION A | 472 |
| | NEW MASTER PIN: 1234 | 473 |
| | OWN ADDRESS: ADDRESS A | 474 |
| | OWN CAPABILITY INFORMATION: CAPABILITY INFORMATION A | 475 |
| | CONTENT OPERATION AUTHORITY: THERE ARE PLAYING CONTROLS | 476 |

| | 462 | |
|---|---|---|
| | OWN ADDRESS: ADDRESS C | 477 |
| | OWN CAPABILITY INFORMATION: CAPABILITY INFORMATION C | 478 |
| | NEW MASTER PIN: 1234 | 479 |

| | 463 | |
|---|---|---|
| | ADDING CONFIRMATION REQUESTING COMMAND | 480 |
| | ADDING DEVICE ADDRESS: ADDRESS C | 481 |
| | ADDING DEVICE CAPABILITY INFORMATION: CAPABILITY INFORMATION C | 482 |
| | ADDING DEVICE CONTENT OPERATING AUTHORITY: THERE ARE PLAYING CONTROLS | 483 |

| | 464 | |
|---|---|---|
| | ADDING CONFIRMATION ALLOWING RESPONSE | 485 |
| | OWN ADDRESS: ADDRESS B | 486 |
| | OWN CAPABILITY INFORMATION: CAPABILITY INFORMATION B | 487 |

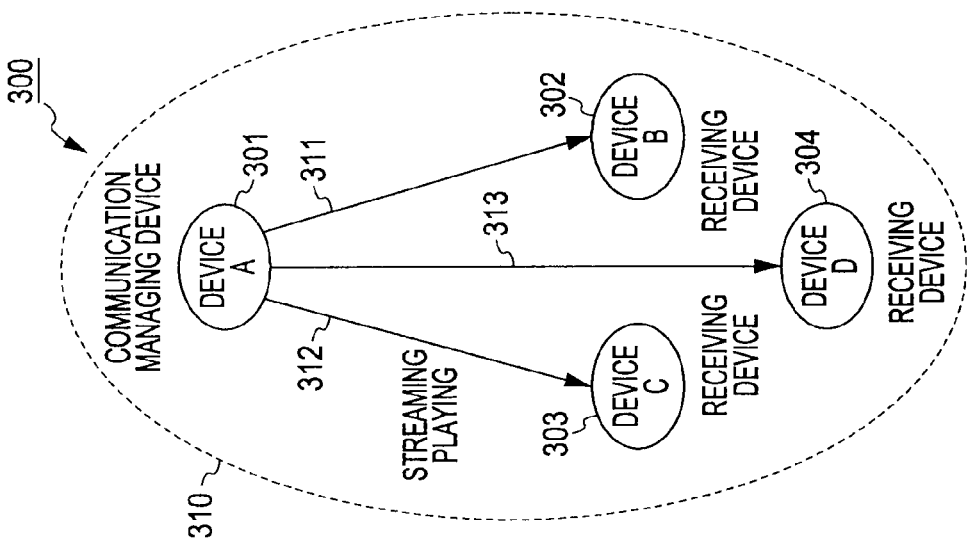
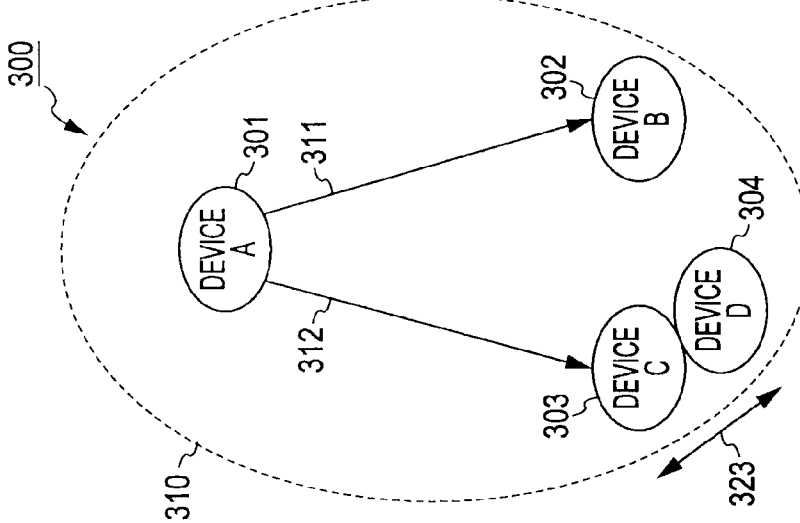
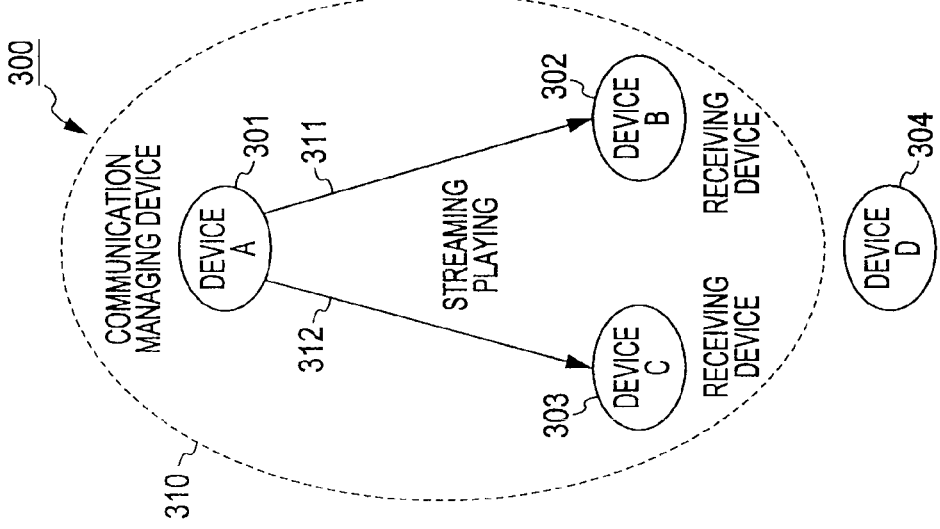

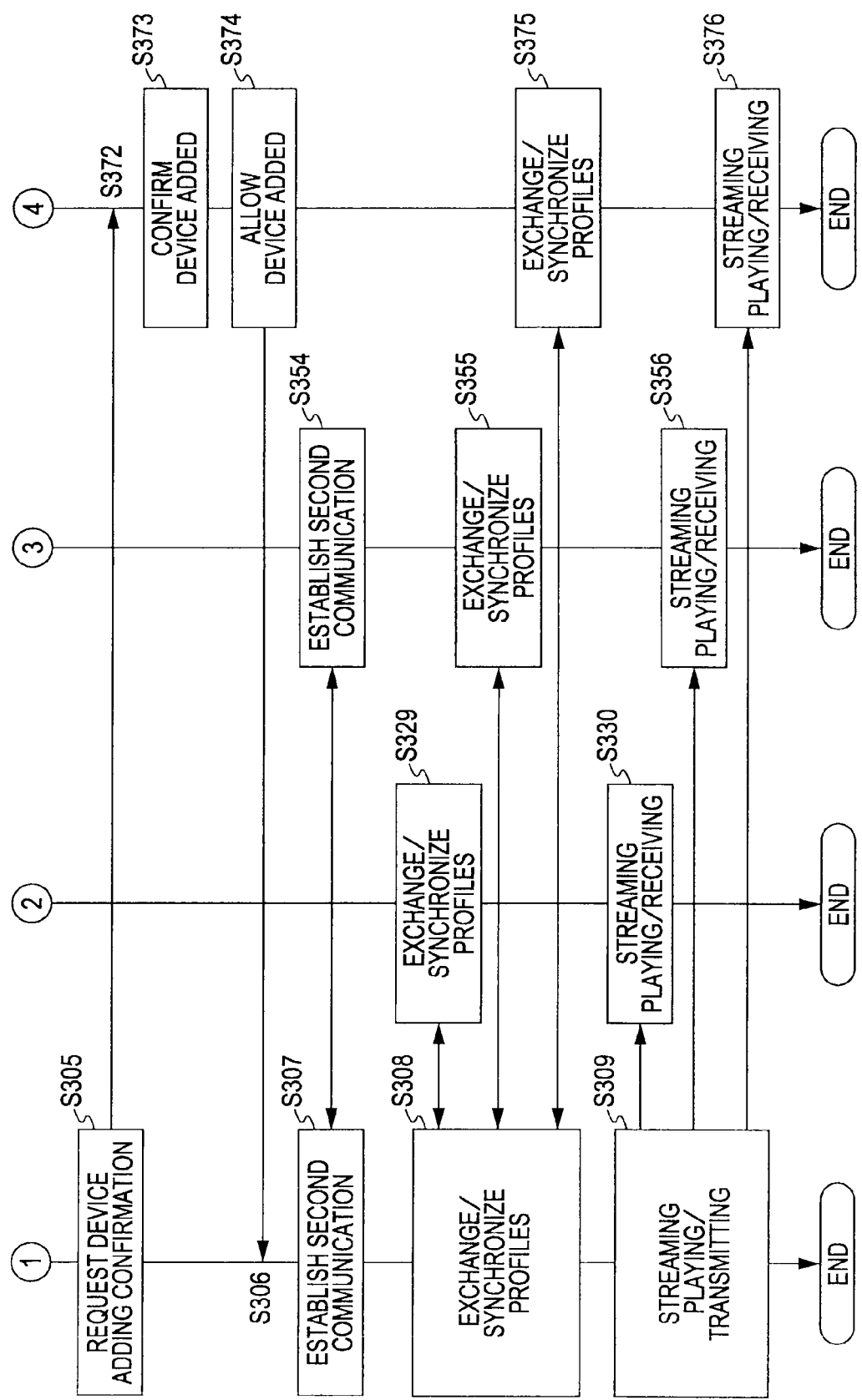

FIG. 28

| 561 | |
|---|---|
| MASTER ADDRESS: ADDRESS A | 571 |
| MASTER CAPABILITY INFORMATION: CAPABILITY INFORMATION A | 572 |
| NEW MASTER PIN: 1234 | 573 |
| OWN ADDRESS: ADDRESS C | 574 |
| OWN CAPABILITY INFORMATION: CAPABILITY INFORMATION C | 575 |
| CONTENT OPERATION AUTHORITY: THERE ARE PLAYING CONTROLS | 576 |

| 562 | |
|---|---|
| OWN ADDRESS: ADDRESS D | 577 |
| OWN CAPABILITY INFORMATION: CAPABILITY INFORMATION D | 578 |
| NEW MASTER PIN: 1234 | 579 |

| 563 | |
|---|---|
| ADDING COMMISSION REQUESTING COMMAND | 580 |
| ADDING DEVICE ADDRESS: ADDRESS D | 581 |
| ADDING DEVICE CAPABILITY INFORMATION: CAPABILITY INFORMATION D | 582 |
| NEW MASTER PIN: 1234 | 583 |
| ADDING DEVICE CONTENT OPERATING AUTHORITY: THERE ARE PLAYING CONTROLS | 584 |

| 564 | |
|---|---|
| ADDING COMMISSION ALLOWING RESPONSE | 585 |
| NEW MASTER PIN: 1234 | 586 |

| 565 | |
|---|---|
| ADDING CONFIRMATION REQUESTING COMMAND | 587 |
| ADDING DEVICE ADDRESS: ADDRESS D | 588 |
| ADDING DEVICE CAPABILITY INFORMATION: CAPABILITY INFORMATION D | 589 |
| CONTENT OPERATION AUTHORITY: THERE ARE PLAYING CONTROLS | 590 |

| 566 | |
|---|---|
| ADDING CONFIRMATION ALLOWING RESPONSE | 591 |

INFORMATION PROCESSING DEVICE AND METHOD TO EXPAND CONTENT RECEPTION NETWORK

BACKGROUND OF THE INVENTION

1. Field of the Invention

The present invention relates to an information processing device and method, program, and information system, and in particular relates to an information processing device and method, program, and information system wherein the usability of an application providing communication between devices can be improved.

2. Description of the Related Art

Heretofore, an application has been proposed to operate in coordination with another device and provide predetermined services such as sharing information for example, by performing communication with the other device using a predetermined communication method (e.g., see Japanese Unexamined Patent Application Publication No. 2001-215975).

In the case of Japanese Unexamined Patent Application Publication No. 2001-215975, a digital cellular phone downloads a song list file from a notebook personal computer according to operations by a user, and displays the song list on a display unit in according with the song list file. Upon downloading and playing the music file selected by the user from the displayed song list from the notebook personal computer or music file server, the digital cellular phone outputs the music file via headphones.

SUMMARY OF THE INVENTION

However, in order to perform communication with another device, information relating to communication functions, applications, and so forth have to be mutually exchanged and connections established based on the information thereof. Setup work for establishing communication is not only complicated, but there are cases wherein special knowledge has to be had. Accordingly, there has been the concern that a user performing the setting work by manual operations may result in the application involving communication with other device not being readily useful.

Particularly, in the case that a communication network is formed with 3 or more devices, there has been the concern that processing of mutual authentication, communication setting, and so forth becomes more complex, and that usability of the application is further decreased.

It has been found desirable to enable improvements to the usability of an application providing communication between devices.

According to an embodiment of the present invention, an information processing device has a first receiving unit to receive, from a first other information processing device, equipment information of a second other information processing device that differs from the first other information processing device, via a first communication and first connecting information useful for connecting with the second other information processing device by a second communication that differs from the first communication; first transmitting unit to transmit second connection information that is useful for connecting with the device itself by the second communication to the first other information processing device, via the first communication; and second receiving unit to receive content data transmitted from the second other information processing device by the second communication, based on the first connection information and the second connection information.

The information processing device may further have a third receiving unit to receive first user information which is information relating to the user of the second other information processing device, transmitted from the second other information processing device by the second communication; and a second transmitting unit to transmit second user information relating to the user of the device itself to the second other information processing device.

The second communication may establish connection only in the case that a user of the second other information processing device allows a connection with the information processing device.

The first receiving unit may further receive third connection information that is useful for connecting with the first other information processing device by the second communication from the first other information processing device, via the first communication.

The information processing device may further have a fourth receiving unit to receive a confirmation request that indicates that the third other information processing device will be deleted from a communication net by the second communication, which is transmitted from the second other information processing device; a notifying unit to notify a user of the indication that the third other information processing device will be deleted from the communication net, based on the confirmation request; and a third transmission unit to transmit an allowance response corresponding to the confirmation request.

The information processing device may further have a playing unit to perform streaming playing by playing while receiving the content data transmitted from the second other information processing device by the second receiving unit.

The information processing device may further have a confirming unit to confirm with a user whether or not to give playing control authority which is the right to perform playing control of the content data; wherein the first transmitting unit further transmits confirmation results of the confirming unit.

According to an embodiment of the present invention, an information processing method includes the steps of: receiving, from a first other information processing device, equipment information of a second other information processing device that differs from the first other information processing device, via a first communication and first connecting information useful for connecting with the second other information processing device by a second communication that differs from the first communication; transmitting second connection information that is useful for connecting with the device itself by the second communication to the first other information processing device, via the first communication; and receiving content data transmitted from the second other information processing device by the second communication, based on the first connection information and the second connection information.

According to an embodiment of the present invention, a program causes a computer to execute an information processing method, including the steps of receiving, from a first other information processing device, equipment information of a second other information processing device that differs from the first other information processing device, via a first communication and first connecting information useful for connecting with the second other information processing device by a second communication that differs from the first communication; transmits second connection information that is useful for connecting with the device itself by the second communication to the first other information processing device, via the first communication; and receives content data transmitted from the second other information processing device by the second communication, based on the first connection information and the second connection information.

With the above-described configuration, from a first other information processing device is received equipment information of a second other information processing device that differs from the first other information processing device, via a first communication and first connecting information useful for connecting with the second other information processing device by a second communication that differs from the first communication; second connection information that is useful for connecting with the device itself by the second communication is transmitted to the first other information processing device, via the first communication; and content data transmitted from the second other information processing device is received by the second communication, based on the first connection information and the second connection information.

According to an embodiment of the present invention, an information processing device includes: a first receiving unit to receive, from a first other information processing device, equipment information of a second other information processing device obtained from the second other information processing device that differs from the first other information processing device, via a first communication and first connecting information useful for connecting with the second other information processing device by a second communication that differs from the first communication; and a first confirming unit to confirm to the user that the second other information processing device will be added to the communication net by the second communication.

The information processing device may further have a second receiving unit to receive first user information which is information relating to the user of the second other information processing device, transmitted from the second other information processing device by the second communication; and a first transmitting unit to transmit second user information relating to the user itself to the second other information processing device, by the second communication.

The information processing device may further have a controlling unit to establish the second communication connection with the second other information processing device, only in the case wherein an addition of the second other information processing device is allowed by the user as a result of confirmation by the confirming unit.

With the information processing device, the second connecting information that is useful for connecting with the device itself by the second communication may be supplied from the first other information processing device to the second other information processing device by the first communication; and the first receiving unit may obtain third connection information that is useful to connect with the first other information processing device from the first other information processing device.

The information processing device may further have: a second confirming unit to confirm with the user the deletion of the third other information processing device from the communication net; and a confirmation control unit to confirm with other information processing devices the deletion of the third other information processing device from the communication net.

The information processing device may further have: a second transmitting unit to perform streaming transmitting of content data to other information processing devices with the second communication.

The first confirming unit may further confirm with the user as to whether or not to give playing control authority which is the right to perform playing control of the content data to the second other information processing device.

According to an embodiment of the present invention, an information processing method includes the steps of: receiving the first other information processing device, from a first other information processing device, equipment information of a second other information processing device obtained from the second other information processing device that differs from the first other information processing device, via a first communication and first connecting information useful for connecting with the second other information processing device by a second communication that differs from the first communication; and confirming to the user that the second other information processing device will be added to the communication net by the second communication.

According to an embodiment of the present invention, a program causes a computer to execute an information processing method, including the steps of receiving the first other information processing device, from a first other information processing device, equipment information of a second other information processing device obtained from the second other information processing device that differs from the first other information processing device, via a first communication and first connecting information useful for connecting with the second other information processing device by a second communication that differs from the first communication; and confirming to the user that the second other information processing device will be added to the communication net by the second communication.

With the above-described configuration, equipment information of a second other information processing device obtained from the second other information processing device that differs from the first other information processing device is received from a first other information processing device via a first communication, and first connecting information useful for connecting with the second other information processing device is received by a second communication that differs from the first communication; and confirmation is made by a user that that the second other information processing device will be added to the communication net by the second communication.

According to an embodiment of the present invention, an information processing device has: a first transmitting unit, to transmit to a first other information processing device, equipment information of a second other information processing device that differs from the first other information processing device, via a first communication and first connecting information useful for connecting with the second other information processing device by a second communication that differs from the first communication; and a second transmitting unit to transmit, to the second other information processing device, equipment information of the first other information processing device and second connection information useful for connecting with the first other information processing device with the second communication, via the second communication.

The information processing device may further have: a first receiving unit to receiving first user information which is information relating to the user of the second other information processing device that is transmitted by the second communication from the second other information processing device; and a third transmitting unit to transmit the second user information relating to the user of the device itself to the second other information processing device.

A connection may be established only in the case wherein the second communication between the first other information processing device and the second other information processing device has been allowed a connection with the first other information processing device by the user of the second other information processing device.

The information processing device may further include a second receiving unit to receive the second connection information from the first other information processing device via the first communication; wherein the first transmitting unit further transmits, to the first other information processing device, third connecting information useful for connecting to the device itself by the second communication, via the first communication. The information processing device may further have: a third receiving unit to receive a confirmation request indicating deleting the third other information processing device from the communication net by the second communication, which is transmitted from the second other information processing device; a notifying unit to notify a user that the third other information processing device will be deleted from the communication net, based on the confirmation request; and a fourth transmitting unit to transmit an allowance response corresponding to the confirmation request.

The information processing device may further have: a playing unit to perform streaming playing that plays while receiving the content data transmitted from the second other information processing device by the second receiving unit.

The information processing device may further have: a confirming unit to confirm with a user whether or not playing control authority, which is a right to perform playing control of the content data, can be given; wherein the second transmitting unit further transmits confirmation results of the confirmation unit.

According to another embodiment of the present invention, an information processing method includes the steps of: transmitting, to a first other information processing device, equipment information of a second other information processing device that differs from the first other information processing device, via a first communication and first connecting information useful for connecting with the second other information processing device by a second communication that differs from the first communication; and transmitting, to the second other information processing device, equipment information of the first other information processing device and second connection information useful for connecting with the first other information processing device with the second communication, via the second communication.

According to another embodiment of the present invention, a program causes a computer to execute an information processing method, including the steps of transmitting, to a first other information processing device, equipment information of a second other information processing device that differs from the first other information processing device, via a first communication and first connecting information useful for connecting with the second other information processing device by a second communication that differs from the first communication; and transmits, to the second other information processing device, equipment information of the first other information processing device and second connection information useful for connecting with the first other information processing device with the second communication, via the second communication.

With the above-described configuration, equipment information of a second other information processing device that differs from the first other information processing device is transmitted to a first other information processing device, via a first communication, and first connecting information useful for connecting with the second other information processing device is transmitted by a second communication that differs from the first communication; and equipment information of the first other information processing device and second connection information useful for connecting with the first other information processing device with the second communication is transmitted to the second other information processing device, via the second communication.

According to another embodiment of the present invention, an information processing system that is a communication system is made up of a first information processing device, second information processing device, and third information processing device performing a first communication and a second communication; the first information processing device having a first receiving unit to receive, from the second information processing device, equipment information of the third information processing device and first connection information useful to connect to the third information processing device, via the second communication and a first confirming unit to confirm with a user that the third information processing device will be added to the communication net by the second communication; the second information processing device having a first transmitting unit to transmit, to a third information processing device, equipment information of the first information processing device and second connection information useful to connect to the first information processing device, via the first communication and a second transmitting unit to transmit to the first information processing device, equipment information of the third information processing device and the first connection information, via the second communication; and the third information processing device having a second receiving unit to receive, from the second information processing device, equipment information of the first information processing device and the second connection information, via the first communication, a third transmitting unit to transmit the first connection information to the second information processing device via the first communication, and a third receiving unit to receive content data transmitted from the first information processing device by the second communication, based on the first connection information and the second connection information.

With the above-described configuration, provided to a first information processing device is a first receiving unit to receive, from the second information processing device, equipment information of the third information processing device and first connection information useful to connect to the third information processing device, via the second communication and a first confirming unit to confirm with a user that the third information processing device will be added to the communication net by the second communication; provided to a second information processing device is a first transmitting unit to transmit, to a third information processing device, equipment information of the first information processing device and second connection information useful to connect to the first information processing device, via the first communication and a second transmitting unit to transmit to the first information processing device, equipment information of the third information processing device and the first connection information, via the second communication; and provided to a third information processing device is a second receiving unit to receive, from the second information processing device, equipment information of the first information processing device and the second connection information, via the first communication, a third transmitting unit to transmit the first connection information to the second information processing device via the first communication, and a third receiving unit to receive content data transmitted from the first information processing device by the second communication, based on the first connection information and the second connection information.

According to the above-described configurations, the usability of an application providing communication between devices can be improved.

BRIEF DESCRIPTION OF THE DRAWINGS

FIG. 6 is a diagram describing a configuration example of various types of information;

FIGS. 7A through 7C are diagrams illustrating a primary configuration example of a communication system to which the present invention has been applied;

FIGS. 8A through 8C are diagrams illustrating a configuration example of a functional block of each device;

FIG. 9 is a flowchart describing the flow of processing of a device addition;

FIG. 10 is a flowchart following FIG. 9 describing the flow of processing of a device addition;

FIG. 17 is a diagram illustrating a configuration example of data that is exchanged;

FIGS. 18A through 18C are diagrams illustrating a primary configuration example of a communication system to which the present invention has been applied;

FIGS. 19A through 19C are diagrams illustrating a configuration example of a functional block of each device;

FIG. 22 is a diagram illustrating a configuration example of data that is exchanged;

FIGS. 23A through 23C are diagrams illustrating a primary configuration example of a communication system to which the present invention has been applied;

FIG. 27 is a flowchart following FIG. 26 describing the flow of processing of a device addition;

FIG. 28 is a diagram illustrating a configuration example of data that is exchanged;

DESCRIPTION OF THE PREFERRED EMBODIMENTS

Figure 1:
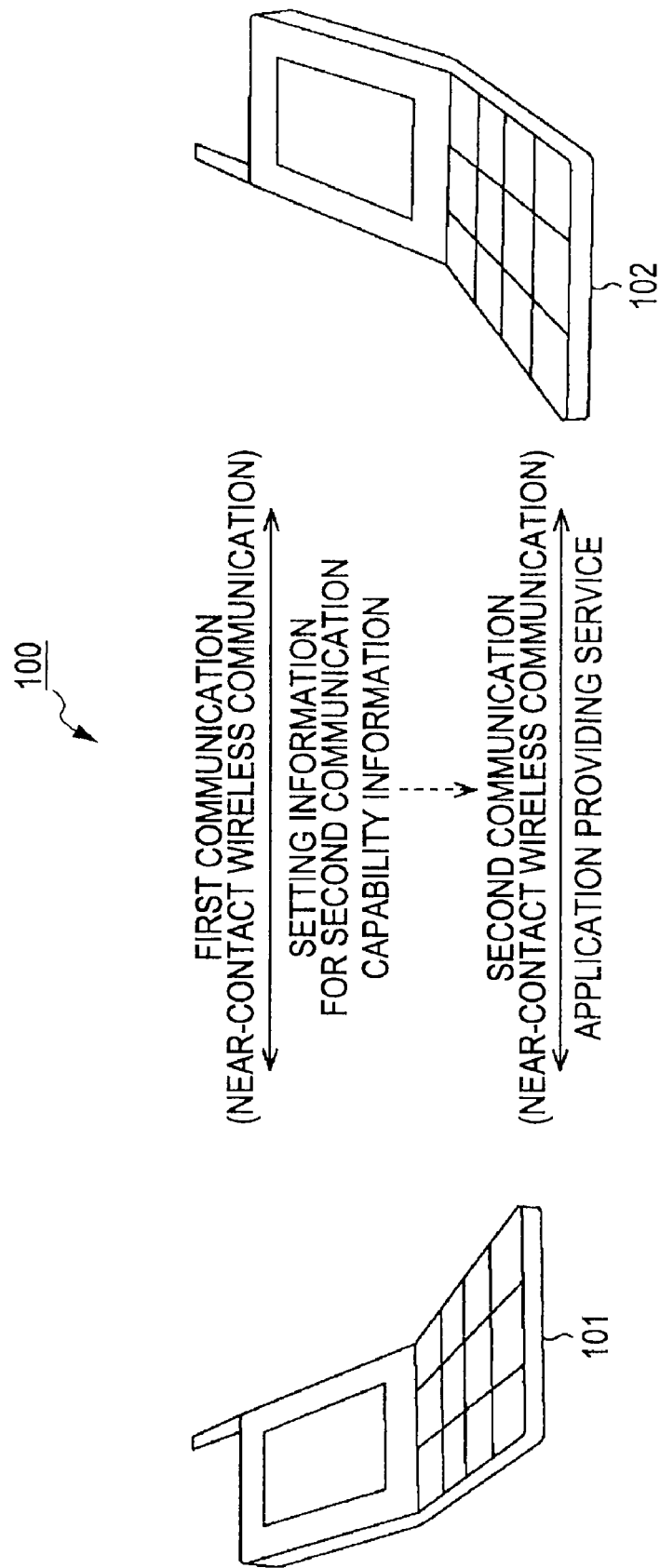
FIG. 1 is a block diagram illustrating a primary configuration example of a communication system.

First, processing at the time of communication connection between devices will be described. FIG. 1 is a diagram showing a configuration example of a communication system to which the present invention has been applied. In FIG. 1, the communication system 100 is a system to operate multiple devices in coordination by wireless communication and execute an application to provide a series of services. As shown in FIG. 1, the communication system 100 has a cellular phone 101 and cellular phone 102, for example.

The cellular phone 101 and cellular phone 102 perform mutual communication with two methods of a first communication and second communication. The first communication is communication to be performed to send/receive equipment information that is information relating to the devices performing the communication and capability information that is made up of useful information for establishing connections for the second communication. For example, a close proximity wireless communication is used as the first communication. The second communication is communication to operate in coordination with an application that is executed at each of the cellular phone 101 and cellular phone 102, and to perform communication for providing a series of services (application providing service). For example, near field wireless communication is used as the second communication.

Note that "close proximity wireless communication" means a wireless communication method in which communication is realized in a state wherein a communication partner is brought close to a distance that can be visually identifiable, such as roughly several centimeters for example. An example thereof is a wireless communication method using electromagnetic induction such as a non-contact IC (Integrated Circuit) card. Note that hereafter, unless particularly noted otherwise, "contact" and "close proximity" as described above will be described without distinguishing therebetween. That is to say, an action described as "making contact" shall be included in "close proximity". The reverse thereof is also the same.

Also, "near field wireless communication" means a wireless communication method that is communicable in a state wherein the cellular phone 101 and cellular phone 102 are positioned at a near distance (for example roughly several tens of meters or less). Examples thereof are Bluetooth (registered trademark) and WiFi (Wireless Fidelity (WiFi accredited IEEE (Institute of Electrical and Electronic engineers) 802.11x)).

Generally, in the case of close proximity wireless communication that is used as the first communication, the communication partner can be readily identified from the physical limitation of the communication range thereof, and setting work to establish the communication connection is that much easier than in the case of near field wireless communication. For example, in the case of near field wireless communication, in the case there are multiple devices in the communicable range, a user has to specify with which device to communicate. Conversely in the case of close proximity wireless communication, the communicable range thereof is narrow, whereby basically the communication partner is limited to one device. Accordingly in this case, the user is requested to move the device that the user himself is operating to be close in proximity to the device serving as the communication partner, but the action thereof itself specifies the communication partner, so inputting specification of a communication partner or the like anew can be omitted.

However, close proximity wireless communication generally has a lower data transfer rate than near field wireless communication, and is not suited for large-capacity data transfers. Also, the two devices have to be placed near one another during communication, so there may be cases wherein maintaining the state thereof (the positional relation of the two devices) is difficult. Further, communication between three or more devices becomes difficult.

From the above points, with the communication system 100, coordination of the applications (applications executed at each of the cellular phone 101 and cellular phone 102) are performed with the second communication (near field wireless communication), and the first communication (close proximity wireless communication) is used for the mutual sending/receiving of equipment information and capability information for the second communication. That is to say, the cellular phone 101 and cellular phone 102 first perform the first communication, and perform preparations for connection for the second communication by sending/receiving equipment information of one another. However, in reality, with only the equipment information, versatility is poor, whereby establishing a connection for the second communication is difficult. Thus, the cellular phone 101 and cellular phone 102 exchange capability information including further detailed information, and flexibly establish a connection for the second communication based on the capability information thereof. Upon the connection for the second communication being established, the cellular phone 101 and cellular phone 102 perform linking operations of the application using the second communication thereof.

The equipment information is made up of general identification information that identifies each device. This may be identification information that complies with predetermined communication protocols. Conditions for establishing the connection for the second communication are varied, by communication capability and information processing capability for the various devices, as well as applications used and so forth. Accordingly, using the basic equipment information only yields poor versatility.

Information relating to the capability of devices such as the communication unit (communication method) and applications and so forth, for example, are included in the capability information, the details of which will be described later. The cellular phone 101 and cellular phone 102 perform detailed settings of the communication unit to be used for the second communication, select applications to be used with the second communication, and so forth, based on the capability information of the communication partner. The cellular phone 101 and cellular phone 102 can share information of one another by exchanging such capability information. Accordingly, the cellular phone 101 and cellular phone 102 can more appropriately perform communication and application settings based on the information thereof without unnecessarily increasing the workload of the user. That is to say, the cellular phone 101 and cellular phone 102 can improve the ease-of-use of applications involving communication between devices. For example, the cellular phone 101 and cellular phone 102 can appropriately select various types of communication settings such as the communication method serving as the second communication and the communication speed and so forth, according to the capability of the telephone itself and of the communication partner, or according to the application to be used. Also, for example, the cellular phone 101 and cellular phone 102 can appropriately select the application to be used according to capabilities of the telephone itself and the communication partner, or according to the objective for processing.

Note that a communication device making up the communication system 100 may be any type of communication device, as long as the device can perform both the first communication and the second communication. For example, the device may be a communication device that can perform both the first communication which performs communication wherein the communication partner is at a visually identifiable distance in the positional relation of the devices at the time of communication, and the second communication which performs communication at a distance wherein the communicable range is greater than that of the first communication and communication is performed at a distance at which visually identifying the communication partner in the positional relation of the devices at the time of communication is difficult.

That is to say, the communication devices making up the communication system 100 may be other than the above-described cellular phone 101 and cellular phone 102. For example, the communication device may be a television signal receiver, video recorder, media player, audio amplifier, audio component, printer, facsimile, automobile audio system, car navigation system or the like. Of course, the device may be a device other than these. Also, the device may have a function wherein each communication device making up the communication system 100 has a different function, such as a cellular phone and audio component, for example.

Further, the number of communication devices making up the communication system 100 is optional, and may be three devices or more. Note that the first communication does not have to be close proximity wireless communication. Also, the second communication does not have to be near field wireless communication. Further, the first communication and second communication may be performed via a live broadcast device or network. Also, the first communication and second communication may be cable communication which is performed via a cable. However, as described above the first communication is communication to send/receive information for establishing the second communication, so it is desirable that the setting work for communication starting is easy or does not have to be performed at all, such as being able to readily identify the communication partner.

Figure 2:
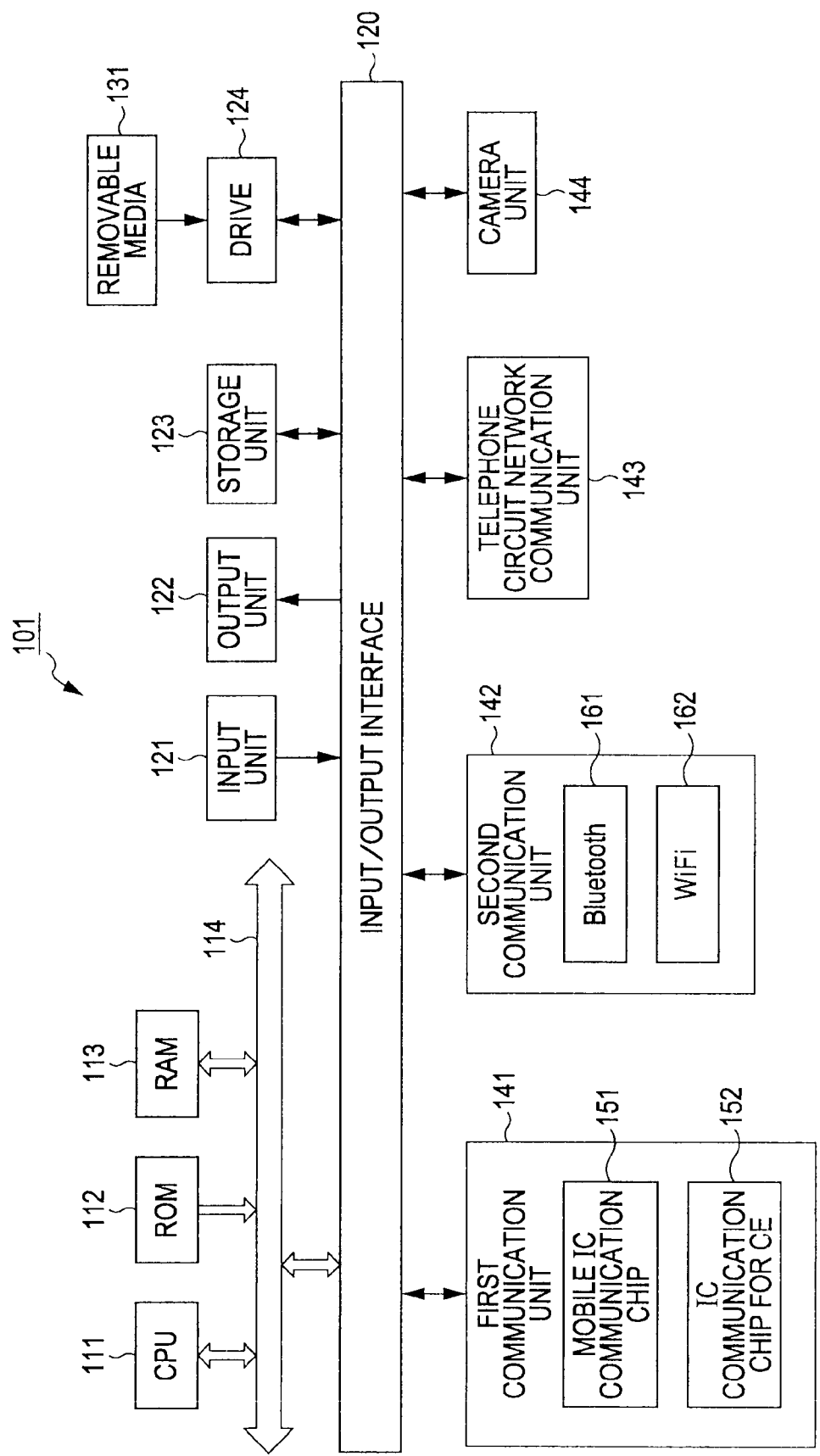
FIG. 2 is a block diagram illustrating a primary configuration example of the cellular phone in FIG. 1.

FIG. 2 is a block diagram illustrating an internal configuration example of the cellular phone 101 in FIG. 1. In FIG. 2, a CPU (Central Processing Unit) 111 of the cellular phone 101 is a computing processing unit that executes various types of processing by executing software programs. The CPU 111 is mutually connected with ROM (Read Only Memory) 112 and RAM (Random Access memory) 113 via the bus 114. Software programs and data are stored beforehand in the ROM 112. Software programs and data that are stored in the ROM 112 and storage unit 123 are loaded in the RAM 113. Also, data for the CPU 111 to execute various types of process and so forth are also stored as appropriate in the RAM 113.

Also, an input/output interface 120 is connected to the bus 114. An input unit 121 made up of a keyboard, mouse, and so forth is connected to the input/output interface 120. Also, an output unit 122 made up of a display such as a CRT (Cathode Ray tube) display, LCD (Liquid Crystal Display) or the like, and speakers or the like, is connected to the input/output interface 120. Further, a storage unit 123 made up of a flash memory, hard disk, or the like is connected to the input/output interface 120.

A drive 124 is also connected to the input/output interface 120 as appropriate, removable media 131 such as a magnetic disk, optical disk, magneto-optical disk, semiconductor memory or the like is mounted as appropriate, and computer programs read therefrom are installed in the storage unit 123 as appropriate.

Further, a first communication unit 141 that performs the first communication and a second communication unit 142 that performs the second communication are connected to the input/output interface 120. Also, a telephone circuit net communication unit 143 that is made up of a modem or the like and that performs audio communication or packet communication with other devices via a public telephone net is connected to the input/output interface 120. Further, a camera unit 144 having a digital camera function that photographs a subject and obtains the image data thereof is connected to the input/output interface 120.

The first communication unit 141 is a wireless communication unit to perform close proximity wireless communication as described above. The first communication unit 141 has a mobile equipment IC communication chip 151 (hereafter called mobile IC communication chip 151) which is a wireless communication unit to perform communication with the communication method used for a non-contact IC card. Also, the first communication unit 141 has a digital home electronics IC communication chip 152 (hereafter called CE (Consumer Electronics) IC communication chip 152). The mobile IC communication chip 151 and CE IC communication chip 152 perform communication based on mutually different communication standards. The first communication unit 141 uses one of these selectively.

The second communication unit 142 is a wireless communication unit to perform the above-described near field wireless communication. The second communication unit 142 has a Bluetooth (registered trademark) unit 161 which is wireless communication unit to perform wireless communication with Bluetooth. Also, the second communication unit 142 has a WiFi unit 162 which is a WiFi accredited wireless communication unit to perform wireless communication with IEEE 802.11x. The second communication unit 142 uses one of these selectively.

Note that FIG. 2 is described such that two types of communication units can be provided to each of the first communication unit 141 and second communication unit 142, but the number (type) of communication units that each has may be any number. Also, the first communication unit 141 only has to perform the first communication, and the second communication unit 142 only has to perform the second communication. That is to say, the communication method of the communicating unit of the first communication unit 141 and second communication unit 142 is optional, and may be other than that which is described above.

Also, the cellular phone 101 may have a configuration other than that described above. Also, a portion of the functions such as the camera unit 144 may be omitted.

The cellular phone 102 serving as the communication partner of the cellular phone 101 also has basically the same configuration as the configuration of the cellular phone 101 described with reference to FIG. 2, so the description of the configuration of the cellular phone 102 is omitted. That is to say, the description in FIG. 2 can be applied to describing the configuration of the cellular phone 102 as well, so the cellular phone 102 will be described with reference to FIG. 2 as with the case of the cellular phone 101. This also holds true for the configurations shown in the later-described FIGS. 3 and 4 as well. Hereafter, the side requesting hand-over processing is described as the cellular phone 101 and the side responding thereto as the cellular phone 102, but there may be cases wherein the same device is at the requesting side and at the responding side according to the situation, and the configurations on the requesting side and the response side do not have to be different from each other. Accordingly, hereafter also, the configuration of the cellular phone 101 and cellular phone 102 are described as being basically the same mutually. That is to say, the description of the configuration of the cellular phone 101 is also applicable to the description of the cellular phone 102.

Figure 3:
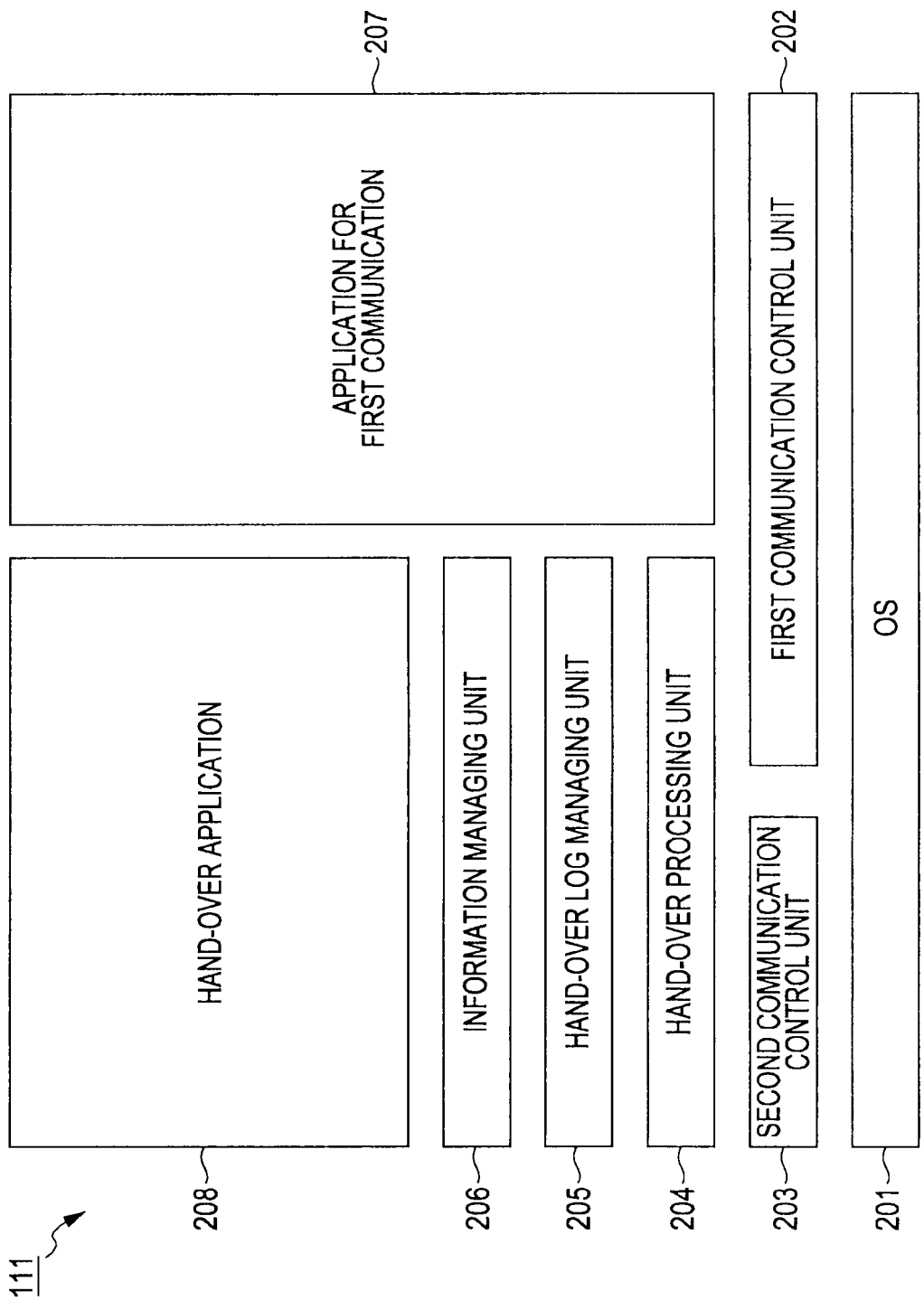
FIG. 3 is a function block diagram illustrating a functional example that the CPU in FIG. 2 can realize.

FIG. 3 is a functional block diagram showing the function that the CPU 111 has in FIG. 2 which executes the application. The CPU 111 reads in various types of data and executes programs, thereby realizing various types of functions. FIG. 3 schematically shows various types of functions thus realized.

The CPU 111 has an OS (Operating System) 201, first communication control unit 202, second communication control unit 203, hand-over processing unit 204, hand-over log managing unit 205, information managing unit 206, first communication application 207, and hand-over application 208.

The OS 201 is a basic software program that provides basic functions which are shared and used by many application software programs and manages the overall computer system. For example, the OS 201 controls the processing unit external to the CPU 111, based on instructions from other function blocks, and performs various control processing such as input/output functions such as user interface input and screen output, and disk and memory managing. The first communication control unit 202 controls the first communication unit 141 via the OS 201, and performs processing relating to the first communication. The second communication control unit 203 controls the second communication unit 142 via the OS 201, and performs processing relating to the second communication.

The hand-over processing unit 204 controls the first communication control unit 202 and second communication control unit 203, sends/receives setting information for the second communication using the first communication, and performs processing (hand-over processing) to establish a connection for the second communication using the information thereof, for example. The hand-over processing unit 204 also performs sending/receiving of equipment information and capability information using the first communication, in the event of this hand-over processing. The hand-over processing unit 204 appropriately performs second communication settings and application execution, based on this capability information.

The hand-over log managing unit 205 manages a log with processing content of the hand-over processing unit 204. The information managing unit 206 manages various types of information such as equipment information, capability information, and profile information exchanged with the communication partner. The profile information is information relating to the user of the device serving as the communication partner. Details thereof will be described later.

The first communication application 207 is an application providing services using only the first communication, such as electronic money settlement, authentication processing, and so forth. The hand-over application 208 is an application providing a service using the second communication, and is an application to perform hand-over processing to establish the second communication. That is to say, both the first communication and second communication are used for the hand-over application 208. A specific example of the hand-over application will be described later.

Note that in FIG. 3, the first communication application 207 is described as one functional block, but the number of first communication applications is optional, and the first communication application 207 may be made up of multiple types of applications. Similarly, the number of hand-over applications is also optional, and the hand-over application 208 may be made up of multiple types of applications.

Figure 4:
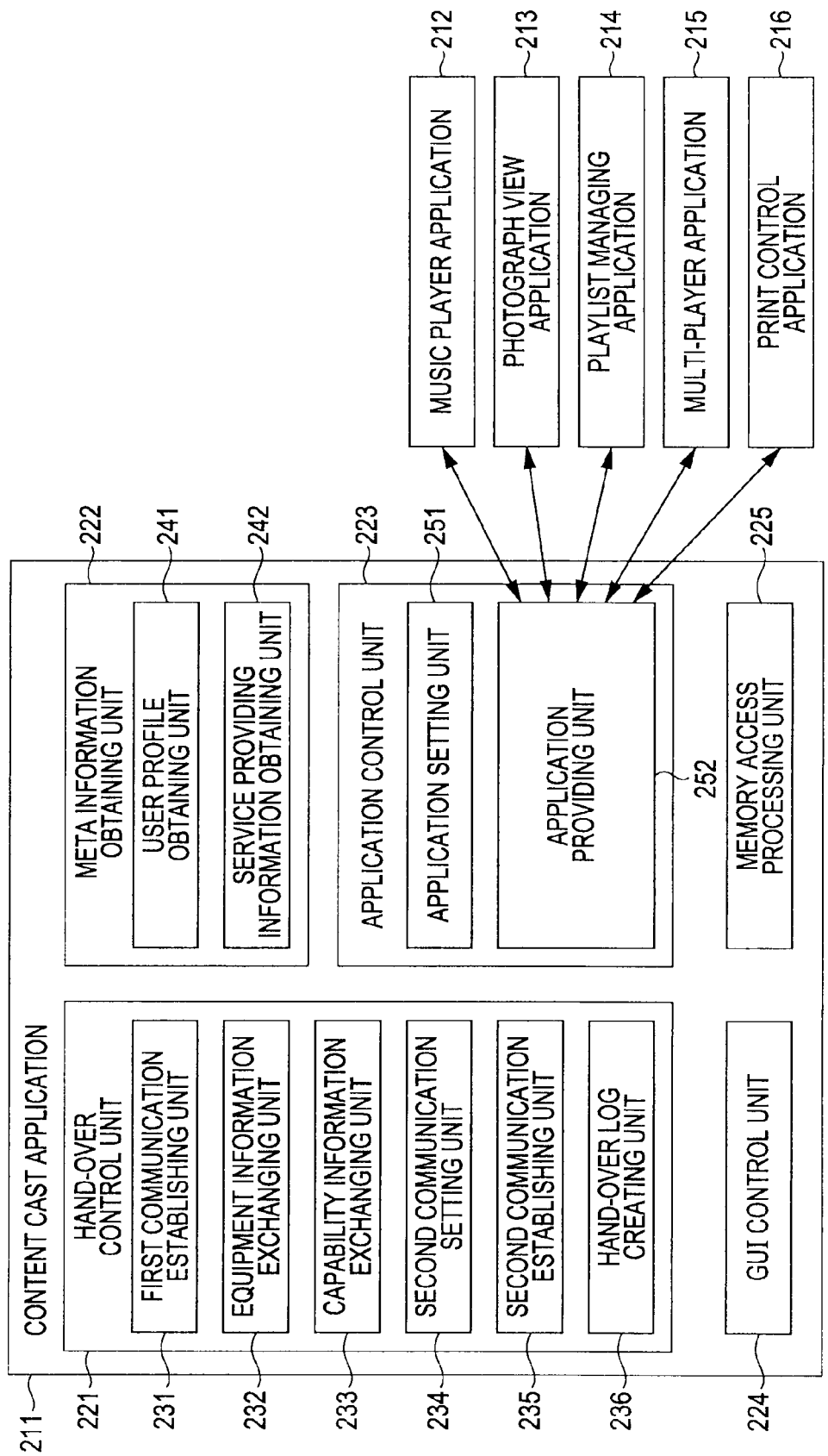
FIG. 4 is a diagram illustrating an example of the hand-over application in FIG. 3.

FIG. 4 is a block diagram schematically showing a configuration example of the hand-over application 208 in FIG. 3. In the case of the example in FIG. 4, the hand-over application 208 has a content cast application 211, music player application 212, photograph viewer application 213, playlist managing application 214, multi-player application 215, and print control application 216.

The content cast application 211 is an application to send/receive content data such as images and audio with the device of a communication partner, using the second communication. The content cast application 211 operates in cooperation with other applications such as the musical player application 212 through print control application 216, and performs sending/receiving of content data for other applications.

The music player application 212 is an application that reads and plays music data stored in the storage unit 123 or the like, for example, and outputs the audio from a speaker or the like (output unit 122). The music player application 212 operates in cooperation with the content cast application 211, thereby enables supplying music data as streaming data to the device of the communication partner, using the second communication, and can output by playing the music with the device of the communication partner, or can obtain the streaming data (music data) supplied by the device of the communication partner and output this by playing the music thereof.

The photograph viewer application 213 is an application displaying image data such as a still image or moving image stored in the storage unit 123 or the like to a monitor (output unit 122), for example. The photograph viewer application 213 operates in cooperation with the content cast application 211, thereby enabling supplying the image data to the device of the communication partner, and obtaining the image data supplied by the device of the communication partner so as to display the image thereof on the monitor (output unit 122), using the second communication.

The playlist managing application 214 is an application to manage a playlist indicating the playing output request (display request) of the content data for playing output (displaying) by the music player application 212 and photograph viewer application 213. The playlist managing application 214 displays the playlist thereof on the monitor (output unit 122) and receives user instruction input as to the displayed playlist. Also, the playlist managing application 214 controls the music player application 212 and photograph viewer application 213, based on the instructions thereof. Further, the playlist managing application 214 operates in cooperation with the content cast application 211, whereby the music player application and photograph viewer application of the device of the communication partner can be controlled using the second communication. For example, the playlist managing application 214 supplies the music data specified by the user to the device of the communication partner using the content cast application 211, starts the music player application of the device of the communication partner, and outputs by playing the music thereof.

The multi-player application 215 is an application that outputs the music data by playing while processing multiple types of content data, such as displaying the image data corresponding to the music thereof on the monitor. That is to say, the multi-player application 215 basically has similar functions as the music player application 212 and photograph viewer application 213, and can exchange content data with the device of the communication partner, using the second communication, by operating in cooperation with the content cast application 211.

The print control application 216 is an application to print image data and text data and so forth on a printing medium such as paper with a printing unit (output unit 122). The print control application 216 can cause the printing unit to print the content data supplied by the device of the communication partner using the second communication, by operating in cooperation with the content cast application 211.

The content cast application 211 has a hand-over control unit 211, meta information obtaining unit 222, application control unit 223, GUI (Graphical User Interface) processing unit 224, and memory access processing unit 225.

Figure 5:
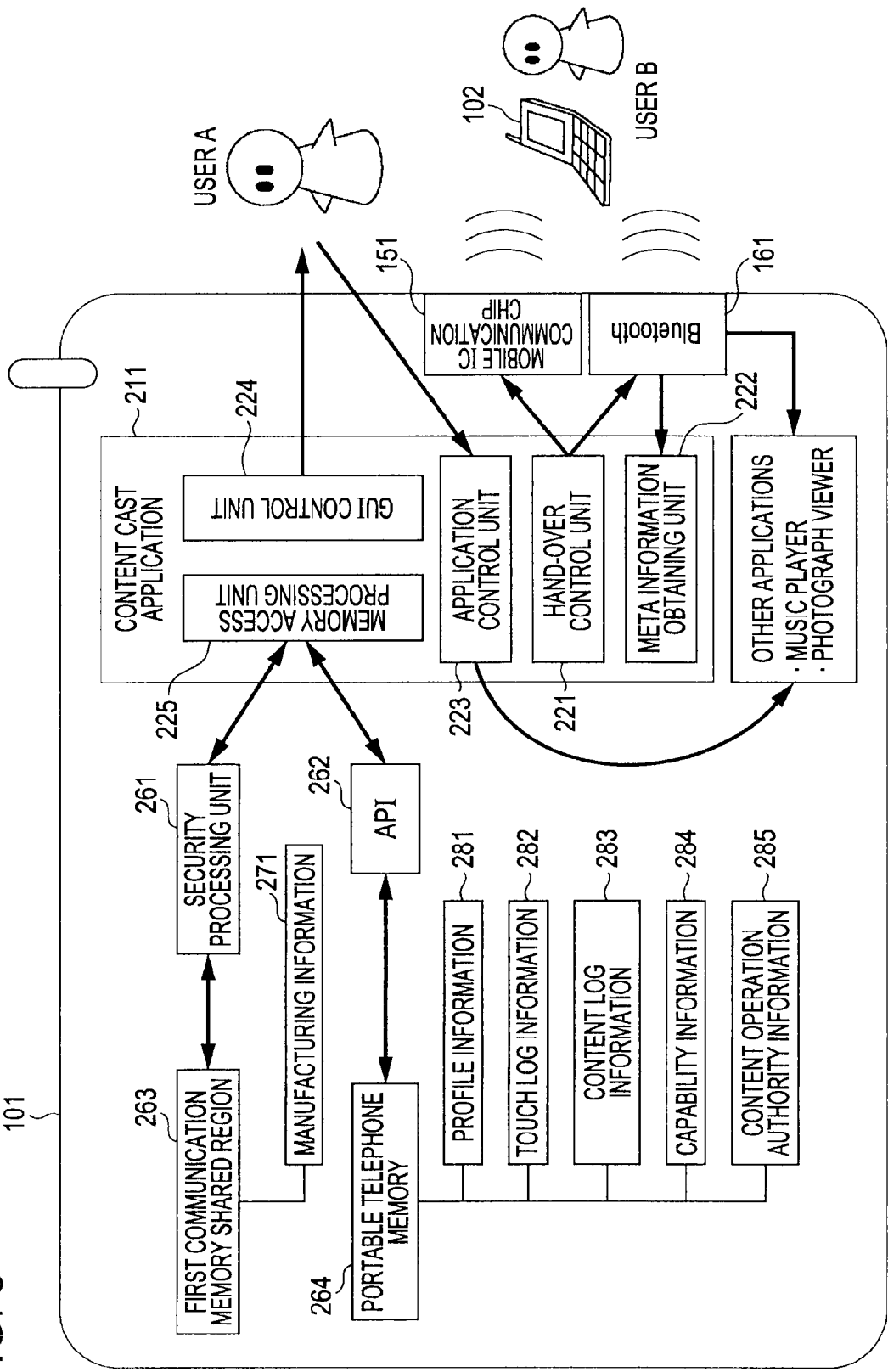
FIG. 5 is a diagram describing an example of the manner of operation of a hand-over application.

The hand-over control unit 221 controls the hand-over processing unit 204 through information managing unit 206 in FIG. 3. For example as shown in FIG. 5, the hand-over control unit 221 directly or indirectly controls the mobile IC communication chip 151 (first communication unit) and Bluetooth unit 161 (second communication unit), and executes processing relating to the hand-over. The hand-over control unit 221 has a first communication establishing unit 231 to perform processing relating to establishing a connection for the first communication, equipment information sending/receiving unit 232 to perform sending/receiving of equipment information with the first communication, capability information sending/receiving unit 233 to exchange mutual capability information with the first communication, second communication setting unit 234 to perform setting relating to the second communication based on equipment information and capability information, second communication establishing unit 235 to perform processing relating to establishing a connection for the second communication, and hand-over log creating unit 236 to create log information relating to the hand-over processing.

The meta information obtaining unit 222 directly or indirectly controls the Bluetooth unit 161 (second communication unit) as shown in FIG. 5 for example, and obtains meta information including user profile information which is information relating to the user of the communication partner, service cooperation information and so forth which is information relating to services and so forth provided by a device of the communication partner or another device operating in cooperation with the device thereof. As shown in FIG. 4, the meta information obtaining unit 222 has a user profile obtaining unit 241 that obtains user profile information (profile information) from the device of the communication partner and a service cooperation information obtaining unit 242 that obtains service cooperation information from the device of the communication partner.

For example as shown in FIG. 5, the application control unit 223 performs processing relating to another application operating in cooperation with the content cast application such as the music player application 212 through the printing control application 216. The application control unit 223 has an application setting unit 251 to perform settings of the other application based on capability information and the like of the device of the communication partner, and an application cooperating unit 252 that starts and controls the other application.

The GUI control unit 224 performs processing as to a GUI display of a content cast application and user instructions or the like input based on the GUI thereof, as shown in FIG. 5, for example. The memory access processing unit 225 performs input/output of information as to the storage region of the cellular phone 101. For example as shown in FIG. 5, the CPU 111 has a security processing unit 261 to perform processing such as encoding and decoding of information as to the memory (storage region) built in the first communication unit 141, and has an API (Application Program Interface) 262 as to a memory (storage region) other than the first communication unit 141 of the cellular phone 101 such as ROM 112 or the storage unit 123. The security processing unit 261 performs access to the first communication memory shared region 263 that is formed in the storage region of the memory built in to the first communication unit 141. The API 262 performs access to the cellular phone memory 264 that is formed on the storage region of the memory of other than the first communication unit 141 of the cellular phone 101.

Manufacturing information 271 such as the serial number, model, and date/time of manufacture for the device serving as the communication partner or the own device is stored in the first communication memory shared region 263. Profile information 281, touch log information 282, content log information 283, capability information 284, and content operating authority information 285 and so forth are stored in the cellular phone memory 264.

The profile information 281 includes information indicating features of the user himself/herself or communication partner, for example, also called "user profile information". The touch log information 282 includes log information of communication using the first communication unit 141, for example. The content log information 283 includes log information relating to content used, for example. The capability information 284 includes information for identifying a device and information indicating device features used at the time of second communication connection and time of application coordination (i.e. at time of second communication), for example. The content operating authority information 285 includes information indicating whether or not there is any content operating authority which is the authority to control the playing (distribution) of content belonging to a device that distributes data, for example. For example, a device having content operating authority can control a device that distributes data as to which content to distribute.

The memory access processing unit 225 accesses the first communication memory shared region 263 via the security processing unit 261 and accesses the cellular phone memory 264 via the API 262, as shown in FIG. 5, for example.

Next, a configuration example for various types of information exchanged between devices will be described with reference to FIG. 6. As shown in FIG. 6, the cellular phone 101 sends/receives equipment information, capability information, and content operating authority information with the first communication, and sends/receives profile information with the second communication.

Capability information is useful detailed information for the second communication connection made up of information indicating device features. The capability information is also called connection information. The capability information includes information such as address, protocol type, equipment type, profile, and application identifier or the like, for example.

The address is identifier information of a device on a communication net with the second communication, and is information that complies with communication protocols defined by protocol type. For example, the information may be made up of one or multiple addresses, such as a BD (Bluetooth Device) address, MAC (Media Access Control) address, or IP (Internet Protocol) address. It goes without saying that multiple types of identification information may be included.

The protocol type is information indicating the type of protocol that can be used, such as Bluetooth or WiFi, for example. The equipment type is information indicating the type (usage) of the device, such as a cellular phone, car navigation system device, personal computer (PC), or and so forth.

The profile is information indicating setting information (profile) that can be used for each protocol. The application identifier is identification information indicating the application that can be used. For example, this may be indicated by the type or name of the application, such as music player, photographs, games, and so forth, or may be indicated by a certain identification number. Also, the application identifier may also be used to identify the application version as well.

The profile information is made up of information indicating features of the device user. Profile information includes a user ID, nickname, profile photograph, occupation type, country, marital status, date of birth, postal code, address, telephone number, message, and so forth, for example. The user ID is an identifier to uniquely identify a user, while the other profile information items are information about the user, and are registered in the device beforehand by the user, for example.

The content operating authority information is information indicating whether or not there is any playing control authority which can authorize control of playing of the content on a device distributing data. For example, a device having content operating authority information that is set as having playing control authority has playing control authority, and even if the device distributing the data is another device, this device can control the content distributed by the other device.

The cellular phone 101 can readily comprehend the type of second communication that the device of the communication partner has, by exchanging capability information as well as equipment information with the cellular phone 102 which is the communication partner, and can more appropriately perform settings. Also, the cellular phone 101 can identify the application which can be executed by the device of the communication partner, by referencing the capability information of the communication partner, and the executable application can be readily selected and used according to the capability of the communication partner.

Note that the makeup of the capability information, profile information, and content operating authority information shown in FIG. 6 is only an example, and other unshown information may be included and a portion of the above-described information may be omitted. For example, the application managed with the capability information only has to execute predetermined processing based on the information exchanged with the communication partner, and for example, may be an application that sends/receives information via the first communication instead of the second communication, or even yet another communication. Also, for example, the communication method for the second communication may be fixed, and information relating to the communication method of the second communication in the capability information may be omitted.

Thus, the cellular phone 101 enables ease of processing to establish communication and start an application in the event of performing a hand-over, and can improve the usability of the application providing communication between devices.

Next, a case of adding a new device to the second communication net which is the network with the second communication thus generated will be described.

FIGS. 7A through 7C are diagrams showing an example of a communication system to which the present invention has been applied.

As shown in FIG. 7A, with a communication system 300, a device A301 and device B302 have established a second communication net 310 beforehand which is a communication net with the second communication, using the method described with reference to FIGS. 1 through 6. The device A301 and device B302 use the second communication net 310 thereof and as indicated by the arrow 311, for example, perform streaming playing (data distribution) of content data such as music, movies, and the like. That is to say, the device A301 operates as a communication managing device and performs distribution of content data (streaming data), and the device B302 operates as a receiving device and plays while receiving the data distributed by the device A301.

With such a situation, in order to add the device C303 to the second communication net 310 and allow participation, and operate the device C303 as the receiving device for streaming playing, in the case of the method described with reference to FIGS. 1 through 6, the second communication has to be established between the device C303 and the device A301. That is to say, the device C303 has to be touched (positioned near) to the device A301 which is the communication managing device, mutual equipment information and capability information to be exchanged with the first communication, and the second communication established.

However, the device C303 may not be positioned near the device A301 in all cases, and in fact there may be cases wherein positioning the device C303 near the device B302 may be easier. However, in the case of the method described with reference to FIGS. 1 through 6, even if the device C303 and device B302 are touched (positioned near), the second communication can be established between the devices C303 and B302, but the second communication is not established between the devices C303 and A301, whereby the device C303 does not receive the data distributed from the device A301.

Also, with the method described above with reference to FIGS. 1 through 6, whether or not a hand-over is performed from the first communication to the second communication can be confirmed by the user using a GUI. However, in the case of adding the device C303 as shown in FIG. 7A, with the above-described method, upon touching (positioning near) the device C303 to the device A301, the user of the device B302 is not able to refuse participation of the device C303.

Further, with the method described above with reference to FIGS. 1 through 6, there is no concept of authority as to the content operation of the device A301. For example, with the communication system 300, instructions can be made as to the device A301 regarding which content to distribute from the devices B302 and C303 which are on the receiving device side. In this case, if a device on the receiving device side can control the content distribution of the device A301 which is the communication managing device without any conditions, an erroneous operation by an unfamiliar user might cause problems for other users. Thus, restricting the operating authority is desirable, but with the method described above with reference to FIGS. 1 through 6, there is no such concept.

Thus, with the communication system 300, processing is performed as follows. That is to say, as shown in FIG. 7B, by touching (positioning near) the device C303 to the device B302, the first communication is established between the device B302 and C303, as indicated by the arrow 321. In the event of exchanging equipment information and capability information with the first communication thereof, the device B302 provides the information of the device A301 to the device C303. The device C303 uses the information of the device A301 to establish second communication with the device A301, as shown in FIG. 7C. Thus, the device C303 can participate in the second communication net 310 as a receiving device, and as indicated by the arrow 312 the device C303 can play while receiving the data distributed from the device A301.

That is to say, by establishing the first communication with the device B302 which does not perform the second communication, the second communication can be established with the device A301 which does not have the first communication established. Thus, the work to add the device C303 to the second communication net 310 becomes easy, and usability of the application proving communication between the devices can be improved.

Further, a GUI that prompts the user as to whether or not the device C303 may be added with the procedures as described above is displayed at the device B302. The user of the device B302 allows or denies the addition of the device C303 following the instructions displayed by the GUI. Thus, even a user of a device that does not perform direct second communication with the device C303, making up the second communication net 310, can control whether or not to add the device C303.

An unknown device (user) can thus be suppressed from participating, whereby the safety of the second communication net 310 can be readily improved. For example, in the case that the device A301 is a device with a high sharing rate such as a server, the device A301 basically attempts to distribute data to the device C303 also, however, the user of the device B302 which is for individual use may not wish to provide personal information of oneself to an unknown user (device C303) i.e., may not wish to participate in the second communication net 310. Also, there may be a case where the user of the device A301 and the user of the device C303 know one another, but the user of the device B302 and the user of the device C303 do not know one another. In this case, the user of the device B302 may not desire to provide personal information of oneself to the device C303. Further, there may be a case wherein the device C303 participates in the second communication net 310 without the knowledge of the user of the device B302, and the personal information is provided thereto. As described above, by performing confirmation of whether or not to participate, such problems are suppressed from occurring, whereby the safety of the second communication net 310 can be readily improved. That is to say, the usability of the application providing communication between devices can be improved.

Further, a GUI that confirms whether or not the device C303 has content operating authority as to the device A301 is displayed on the device B302. The user of the device B302 controls whether or not to give content operating authority to the device C303 in according with this GUI. Thus, authority for an unknown device (user) can be suppressed, whereby the safety of the second communication net 310 can be improved. That is to say, the usability of the application providing communication between devices can be improved.

A specific method thereof will be described below. FIGS. 8A through 8C are functional block diagrams showing a configuration example of the content cast application 211 belonging to the devices A301, B302, and C303 in FIGS. 7A through 7C. The devices A301 through C303 have basically the same configuration as the cellular phone 101 in the case described with reference to FIGS. 1 through 6. That is to say, the devices A301, B302, and C303 may be any sort of device, but have a first communication unit 141 and second communication unit 142 as shown in FIG. 2, and have a function block as shown in FIG. 3. That is to say, devices A301, B302, and C303 have a hand-over application 208 of the configuration as shown in FIG. 4, and have a content cast application 211.

FIG. 8A shows a configuration example of the content cast application 211 of the device A301. FIG. 8B shows a configuration example of the content cast application 211 of the device B302. FIG. 8C shows a configuration example of the content cast application 211 of the device C303. The portions that a similar to the configuration described with reference to FIG. 4 have the same reference numerals appended thereto.

That is to say, as shown in FIG. 8A, the device A301 serving the function of the content cast application 211 has a master adding receiving processing unit 330, hand-over control unit 221, application control unit 223, GUI control unit 224, and memory access processing unit 225.

The master adding receiving processing unit 330 performs processing to receive additional devices as a master (communication managing device) in the second communication net 310. The master adding receiving processing unit 330 has an adding commission accepting unit 331, adding confirming unit 332, second communication control unit 333, and profile processing unit 334.

The adding commission accepting unit 331 performs processing as to an addition commission of the device C303 supplied by the device B302 which is touched (positioning near) the device C303. The adding confirming unit 332 performs processing to confirm whether or not the addition can be made as to the user of the device A301. The second communication control unit 333 establishes second communication with the device C303 which has been allowed to be added. The profile processing unit 334 exchanges profile information with the other devices making up the second communication net 310, and synchronizes the information of each other.

As shown in FIG. 8B, the device B302 serving the function of the content cast application 211 has an slave-addition reception processing unit 340, hand-over control unit 221, application control unit 223, GUI control unit 224, and memory access processing unit 225.

The slave-addition reception processing unit 340 performs processing to receive an additional device as the slave (receiving device) in the second communication net 310. As shown in FIG. 7B, the slave-addition reception processing unit 340 performs processing of the device (device B302) that is touched (positioned near) with the device C303 to be added. The slave-addition reception processing unit 340 has an adding instruction receiving unit 341, playing control authority processing unit 342, setting information sending/receiving unit 343, adding commission processing unit 344, and profile processing unit 345.

The adding instruction receiving unit 341 receives device adding instructions from the user. The playing control authority processing unit 342 performs processing relating to giving playing control authority which is the right to control the playing (distribution) of the content as to the added device. The setting information sending/receiving unit 343 uses the first communication established with the touched (positioned near) device C303 to perform sending/receiving of various types of setting information relating to the communication, such as equipment information, capability information (connection information), and content operating authority information and the like. The adding commission processing unit 344 performs processing to commission the addition of the device C303 as to the device A301. The profile processing unit 345 exchanges profile information with the other devices making up the second communication net 310 and synchronizes the information of one another.

As shown in FIG. 8C, the device C303 serving the function of the content cast application 211 has an adding device processing unit 350, hand-over control unit 221, application control unit 223, GUI control unit 224, and memory access processing unit 225.

The adding device processing unit 350 performs processing as the device added to the second communication net 310. As shown in FIG. 7C, this adding device processing unit 350 has a setting information sending/receiving unit 351, second communication control unit 352, and profile processing unit 353.

The setting information sending/receiving unit 351 uses the first communication established with the touched (positioned near) device B302 to perform sending/receiving of various types of setting information relating to the communication, such as equipment information, capability information (connection information), and content operating authority information and the like. The second communication control unit 352 establishes second communication with the device A301 which is the master. The profile processing unit 353 exchanges profile information with the other devices making up the second communication net 310 and synchronizes the information of one another.

Next, a processing flow example in the addition of a device C303 as shown in FIGS. 7A through 7C will be described with reference to the flowchart in FIGS. 9 and 10. Note that description will be made with reference to FIGS. 11 through 17 as appropriate.

First, in the state shown in FIG. 7A, in step S101 the application of the device A301 performs transmission of the content data for streaming playing of the content data (streaming playing/transmission). Hereafter description will be given in the case of using song data as an example of the content data, and of streaming playing the song data. That is to say, as an example of the application, a music playing application 212 will be used for the description herein. Of course, the content for streaming playing may be any content such as moving images, still images, multi-media content, and so forth, and the application thereof is also optional.

Figure 11:
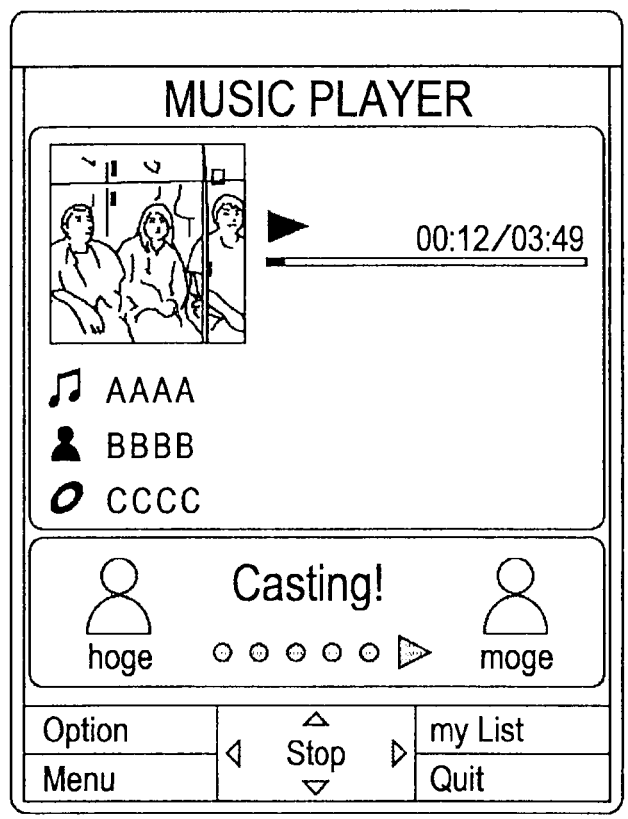
FIG. 11 is a diagram illustrating a screen example.

At this time, a GUI showing that the song data is being transmitted, such as that shown in FIG. 11 for example, is displayed on the monitor of the device A301.

Figure 12:
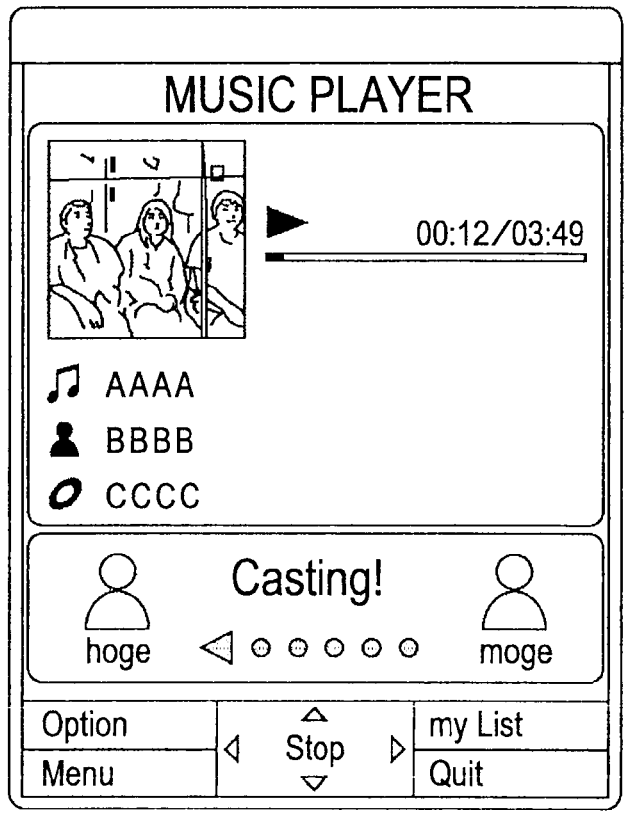
FIG. 12 is a diagram illustrating a screen example.

In step S141, the music playing application 212 of the device B302 plays while receiving the song data distributed by the device A301 (streaming playing/receiving). A GUI as shown in FIG. 12 for example showing that music data is in process of being received/playing is displayed on the monitor of the display device B302. Upon the user operating the Menu buttons displayed on the GUI and so forth to instruct the adding of a device, the adding instruction receiving unit 341 receives the device adding instructions thereof in step S142.

Figure 13:
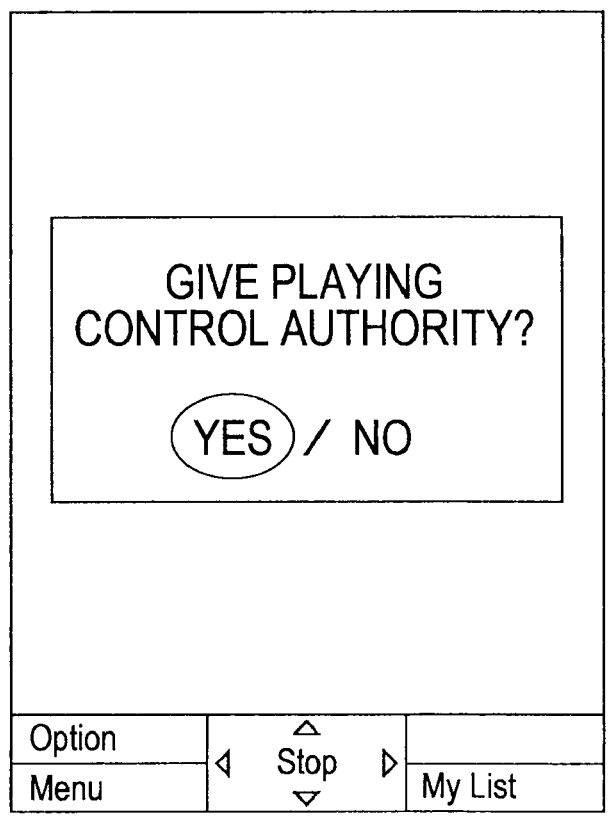
FIG. 13 is a diagram illustrating a screen example.

Upon the device adding instructions being received, in step S143 the playing control authority processing unit 342 displays a GUI for the user to confirm the giving of the playing control authority, as shown in FIG. 13 for example. In the case of the example in FIG. 13, along with the message "will you authorize playing control?", selection options of "yes" and "no" are displayed on the GUI. The user performs control for giving playing control authority by selecting one of the "yes" and "no". For example, in the case that "yes" is selected by the user, the playing control authority processing unit 342 performs settings to give the playing control authority to the added device C303. Conversely, in the case that "no" is selected by the user, the playing control authority processing unit 342 performs settings so as to not give the playing control authority to the added device C303.

Figure 14:
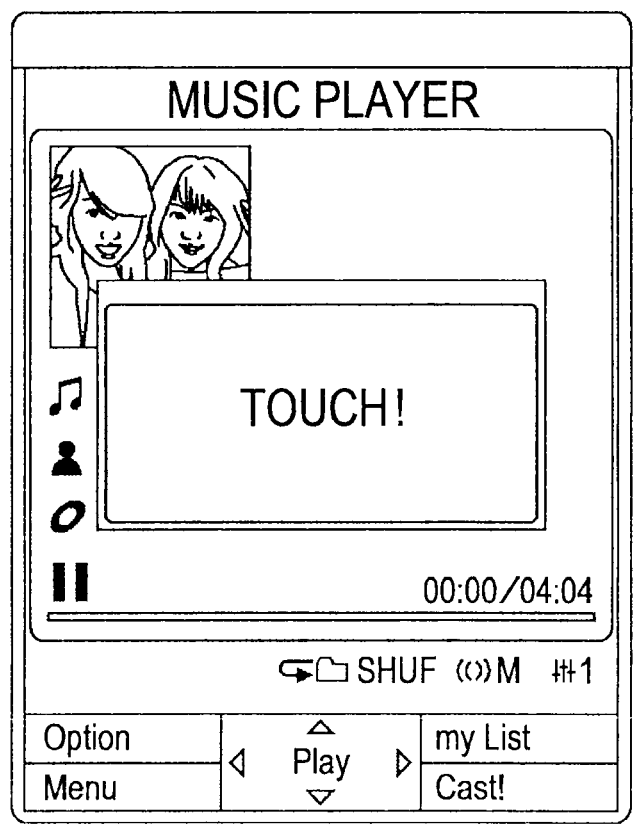
FIG. 14 is a diagram illustrating a screen example.

Upon the playing control authority giving is confirmed, the preparations for the first communication of the device B302 is complete. In this state, when the device C303 is touched (positioned near) to the device B302, in step S144 the hand-over control unit 221 in the device B302 establishes a first communication with the device C303 that is touched (positioned near) as shown in FIG. 7B. Now, a screen that prompts a touching (positioning near) operation to the user such as shown in FIG. 14 for example is displayed on the monitor of the device B302. In the case of the example in FIG. 14, a message of "TOUCH!" is displayed, and prompts the casing of the device B302 to be positioned near or to make contact with the casing of the device C303.

Figure 15:
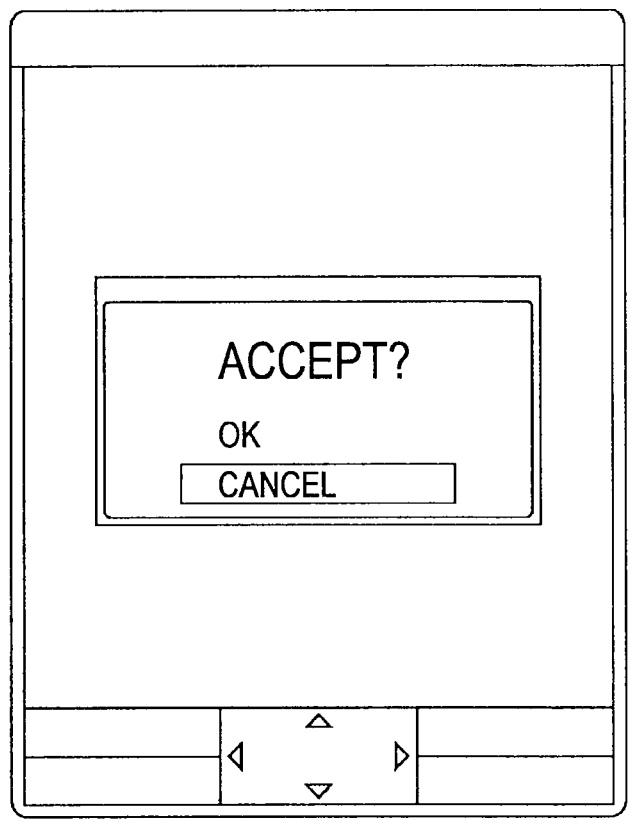
FIG. 15 is a diagram illustrating a screen example.

Corresponding to the processing of the device B302, in step S121 the hand-over control unit 221 of the device C303 also establishes the first communication with the device B302 that is touched (positioned near) as shown in FIG. 7B. Upon the device C303 touching (positioning near) the device B302, a GUI screen for the user to confirm that the first communication is established, such as shown in FIG. 15 for example, is displayed on the monitor of the device C303. In the case of the example in FIG. 15, along with the message of "ACCEPT?", selection options of "OK" and "CANCEL" is displayed. For example, if the user of the device C303 desires participation in the second communication net 310, "OK" is operated. Otherwise, "CANCEL" is operated. Upon "OK" being operated, the hand-over control unit 221 of the device C303 establishes the first communication.

Upon the first communication being established, in step S145 the setting information sending/receiving unit 343 of the device B302 provides equipment information or various types of setting information relating to communication, such as the capability information and content operating authority information described with reference to FIG. 6, to the device C303. Corresponding to this processing, in step S122 the setting information sending/receiving unit 351 of the device C303 obtains the provided various types of setting information.

The setting information 361 in FIG. 17 shows a configuration example of the setting information provided from the device B302 to the device C303. As shown in FIG. 17, setting information 361 includes a master address 371, master capability information 372, new master PIN (Personal Identification Number) 373, own address 374, own capability information 375, and content operation authority 376. Of course, information other than these may be included.

The master address 371 is equipment information, and is address information (identification information) of the device operating as the master of the second communication net 310. In the case of the example in FIG. 17, the address A which is the address of the device A301 is provided as the master address 371. The master capability information 372 is capability information of the device operating as the master of the second communication net 310. In the case of the example in FIG. 17, the capability information A which is the capability information of the device A301 is provided as the master capability information 372.

The new master PIN 373 is a passkey for confirming a session. This is identification information for confirming which request to respond to and so forth depending on the value of the new master PIN 373. In the case of the example in FIG. 17, the new master PIN 373 is generated by the already-exiting device B302 which forms the second communication net 310 and wherein the first communication is established with the device C303 to be added. Let us say that the value "1234" is provided as the new master PIN 373. Note that the new master pin 373 may be any value, and the data length is also optional.

The own address 374 is equipment information, and is the address information (identification information) of the device itself. In the case of the example in FIG. 17, the address B which is the address of the device B302 is provided as the own address 374. The own capability information 375 is capability information of the device itself. In the case of the example in FIG. 17, the capability information B which is the capability information of the device B302 is provided as the own capability information 375.

The content operating authority 376 is information indicating whether or not to give operating authority for the content in the device A301 to the device C303. In the case of the example in FIG. 17, information to the effect of "there are playing controls" is provided as the content operating authority 376. That is to say, in this case, playing control authority is given to the device C303. In the case that playing control authority is not given, information to the effect of "there are no playing controls" is provided. This content operating authority 376 may be any value as long as the information indicates whether or not there is any playing control.

Returning to FIG. 9, now, in step S123, the setting information sending/receiving unit 351 of the device C303 provides various types of setting information relating to communication, including equipment information, capability information, and content operating authority information as described with reference to FIG. 6, to the device B302. Corresponding to this processing, the setting information sending/receiving unit 343 of the device B302 obtains the provided various types of setting information in step S146.

The setting information 362 in FIG. 17 shows a configuration example of the setting information provided from the device C303 to the device B302. As shown in FIG. 17, the setting information 362 includes the own address 377, own capability information 378, and new master PIN 379. Of course, information other than this may be included.

The own address 377 is equipment information, and is the address information (identification information) of the device itself. In the case of the example in FIG. 17, the address C which is the address of the device C303 is provided as the own address 377. The own capability information 378 is capability information of the device itself. In the case of the example in FIG. 17, the capability information C which is the capability information of the device C303 is provided as the own capability information 378.

The new master PIN 379 is a new master PIN supplied from a first communication connection destination. In the case of the example in FIG. 17, the value "1234" which is the same as the new master PIN 373 supplied by the device B302 is provided as the new master PIN 379. Since the new master PIN 379 is shared, the setting information 362 is indicated to be information corresponding to the setting information 361. Note that the new master pin 379 may be any value, and the data length may also be optional.

With this information exchange, the device B302 obtains the equipment information (address) and the capability information of the device C303. Also, besides the equipment information (address) and the capability information of the device B302, the device C303 also obtains equipment information (address) and the capability information of the device A301 which is the master, and information indicating whether or not there is any content operating authority.

Returning to FIG. 9, upon the exchange of equipment information and connection information and so forth by the first communication ending, the adding commission processing unit 344 of the device B302 uses the second communication in step S147 to perform an adding commission request for the device C303 as to the device A301. The adding commission request 363 in FIG. 17 indicates information provided to the device A301 at this time.

In the example in FIG. 17, the adding commission request 363 includes an adding commission requesting command 380, adding device address 381, adding device capability information 382, new master PIN 383, own address 384, own capability information 385, and adding device content operating authority 386. Of course, information other than this may be included.

The adding commission requesting command 380 is a command requesting the device A301 to add the device C303 to the second communication net 310. The adding device address 381 is equipment information, and is address information of the device to be added to the second communication net 310. In the case of the example in FIG. 17, the address C is provided as the adding device address 381. The adding device capability information 382 is capability information of the device to be added to the second communication net 310. In the case of the example in FIG. 17, capability information C is provided as the adding device capability information 382. The new master PIN 383 is information similar to the above-described new master PIN 373 and the like. In the case of the example in FIG. 17, the adding commission request corresponds to the above-described processing, whereby the value "1234" which is the same as the new master PIN 373 and new master PIN 379 is provided as the new master PIN 383.

The own address 384 is equipment information, and is address information (identification information) of the device itself. In the case of the example in FIG. 17, the address B is provided as the own address 384. The own capability information 385 is capability information of the device itself. In the case of the example in FIG. 17, the capability information B is provided as the own capability information 378.

The adding device content operating authority 386 is information indicating whether or not the device to be added gives operating authority of the content of the device operating as the master, as is information similar to the content operating authority 376. In the case of the example in FIG. 17, information to the effect of "with playing control" serving as the adding device content operating authority 386 is provided.

The adding commission accepting unit 331 of the device A301 provided with an adding commission request as described above obtains this in step S102.

Figure 16:
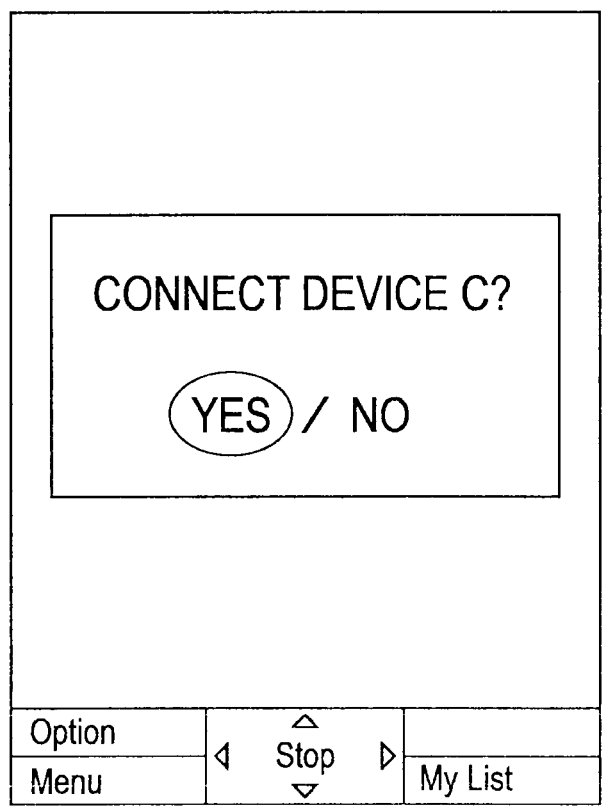
FIG. 16 is a diagram illustrating a screen example.

In step S103 the adding confirming unit 332 displays a GUI screen on the monitor of the device A301 for the user to confirm the addition of the device to the user of the device not touched (positioned near) the device to be added such as shown in FIG. 16 for example. In the case of the example in FIG. 16, along with the message "connect device C?" selection options of "yes" and "no" are displayed on the GUI screen. The user of the device A301 selects one of the "yes" and "no", thereby indicating the intent of the user as to the addition of the device C303.

In the case that "yes" is selected by the user, in step S104 the adding commission accepting unit 331 performs a response as to the adding commission request as to the device B302 via the second communication, and allows the addition of the device C303. The response 364 in FIG. 17 indicates a configuration example of the information provided from the device A301 to the device B302 at this time.

In the example in FIG. 17, the response 364 includes the adding commission allowing response 387, new master PIN 388, own address 389, and own capability information 390. Of course, information other than this may be included.

The adding commission allowing response 387 is a response as to the adding commission requesting command 380, and indicates that the addition is allowed. The new master PIN 388 is information similar to each of the above-described master PINs. The response herein corresponds to each process in the processing described above, whereby in the case of the example in FIG. 17, the value "1234" which is the same as the new master PIN 373, new master PIN 379, and new master PIN 383 is provided as the new master PIN 388.

The own address 389 is equipment information, and is address information (identification information) of the device itself. In the case of FIG. 9, the address A is provided as the own address 389. The own capability information 390 is capability information of the device itself. In the case of the example in FIG. 17, the capability information A is provided as own capability information 390.

The adding commission processing unit 344 of the device B302 obtains the response thereof in step S148.

With this information exchange, the device A301 which is not touching (positioned near) the device C303 can obtain the equipment information (address) and capability information of the device C303. Also, the device B302 can know that the addition of the device C303 has been allowed at the device A301.

Note that in the case that the user of the device A301 selects "no" and denies the addition of the device C303, in step S104 the adding commission accepting unit 331 sends a response indicating denial as to the device B302, via the second communication. This denial response ends the series of processing. In other words, in this case the device C303 is excluded from participation in the second communication net 310.

Communication between the devices A301 and B302 can be performed using the second communication that is performing streaming playing. That is to say, devices A301 and B302 can perform the above-described information exchange without stopping the streaming playing.

Upon the adding commission allowing response having been transferred, in step S105 in FIG. 10 the second communication control unit 333 of the device A301 establishes the second communication with the device C303. Corresponding to this, in step S124 in FIG. 10 the second communication control unit 352 of the device C303 establishes the second communication with the device A301.

Upon the second communication having been established, the profile processing unit 334 of the device A301 uses the second communication thereof to exchange profile information with the device C303 in step S106, and synchronizes the content of the profile information that each has with the device C303. Conversely the profile processing unit 353 of device C303 uses the second communication to exchange profile information with the device A301 in step S125, and synchronizes profile information with the device A301.

Similarly, the profile processing unit 334 of the device A301 uses the second communication to exchange profile information with the device B302 in step S107, and synchronizes the content of the profile information with the device B302. On the other hand the profile processing unit 354 of device B302 uses the second communication to exchange profile information with the device A301 in step S149, and synchronizes profile information with the device A301.

With the above processing, as shown in FIG. 7C, the device C303 is added to the second communication net 310, and content data can be distributed from the device A301 to the device C303. In step S108, the music player application 212 of the device A301 uses the second communication as to the devices B302 and C303 to perform transmission of song data for the purpose of streaming playing (streaming playing/transmission).

On the other hand, in step S150 the music player application 212 of the device B302 plays while receiving the song data supplied by the device A301 (streaming playing/receiving). Similarly, in step S126 the music player application 212 of the device C303 plays while receiving the song data supplied by the device A301 (streaming playing/receiving).

By performing the above processing, the communication system 300 can readily add a device to the second communication net just by touching (positioning near) the devices that do not perform the second communication. Also, at this time, the devices can be added without stopping the data sending/receiving in the second communication net that has been performing before the addition. Further, the user of the device that has not been touched (positioned near) can readily control whether or not to add the device to the second communication net. Also, giving content operating authority to the device added to the second communication net can be readily controlled. Thus the communication system 300 can improve the usability of the application involving communication between devices.

Note that the communication system 300 can add devices with a method other than that described above. For example, as shown in FIGS. 18A through 18C, the device C303 can be made to participate in the second communication net 310 by touching (positioning near) the device C303 to be added as a receiving device (slave) to the device A301 during operation as a communication managing device (master).

In FIG. 18A, similar to the case in FIG. 7A, a second communication net 310 is formed wherein the device A301 operates as the communication managing device (master), and the device B302 operates as the receiving device (slave). In this state, the device C303 is touched (positioned near) to the device A301 as shown in FIG. 18B, and as is indicated by the arrow 322 the first communication is performed between the devices S301 and C303. With the hand-over processing, the second communication between the devices S301 and C303 is established, and as shown in FIG. 18C, the device C303 is added to the second communication net 310. Using the second communication, streaming distribution of the content data is performed from the device A301 to the devices B302 and C303 as indicated by the arrows 311 and 312. The devices B302 and C303 each play while receiving streaming data.

FIGS. 19A through 19C show a configuration example of the content cast application 211 for each device in this case. FIG. 19A shows a configuration example of the content cast application 211 of the device A301. FIG. 19B shows a configuration example of the content cast application 211 of the device B302. FIG. 19C shows a configuration example of the content cast application 211 of the device C303. The portions that are similar to the configuration described with reference to FIG. 4 have the same reference numerals appended thereto.

As shown in FIG. 19A, as a function of the content cast application 211, the device A301 has a master adding receiving processing unit 410, hand-over control unit 221, application control unit 223, GUI control unit 224, and memory access processing unit 225.

The master adding receiving processing unit 410 performs processing to receive the addition of a device as the master (communication managing device) in the second communication net 310. In this case, processing is performed as the device to be touched (positioned near) the device to be added. The master adding receiving processing unit 410 has an adding instruction receiving unit 411, playing control authority processing unit 412, setting information sending/receiving unit 413, adding confirmation control unit 414, second communication control unit 415, and profile processing unit 416.

The adding instruction receiving unit 411 is a processing unit similar to the adding instruction receiving unit 341, and receives device adding instructions from the user. The playing control processing unit 412 is a processing unit similar to the playing control authority processing unit 342, and performs processing relating to the giving of content playing control authority to the device to be added. The setting information sending/receiving unit 413 is a processing unit similar to the setting information sending/receiving unit 343, and uses the first communication established with the touched (positioned near) device C303 to perform sending/receiving of various types of setting information such as equipment information and capability information (connection information).

The adding confirmation control unit 414 is a processing unit similar to the adding confirmation unit 332, and performs processing to confirm with the user of the device B302 not touched (positioned near) the device C303 as to whether or not the device can be added. The second communication control unit 415 is a processing unit similar to the second communication control unit 333, and establishes the second communication with the device C303 having been given permission to be added. The profile processing unit 416 is a processing unit similar to the profile processing unit 334, and exchanges profile information with other devices making up the second communication net 310 and synchronizes the information of each other.

As shown in FIG. 19B, as a function of the content cast application 211, the device B302 has an slave-addition reception processing unit 420, hand-over control unit 221, application control unit 223, GUI control unit 224, and memory access processing unit 225.

The slave-addition reception processing unit 420 performs processing relating to allowing the addition of the device serving as the slave (receiving device) in the second communication net 310. As shown in FIG. 18B, the slave-addition reception processing unit 420 performs processing of the device not touched (positioned near) the device C303 to be added. The slave-addition reception processing unit 420 has an adding confirmation receiving unit 421, adding confirming unit 422, and profile processing unit 423.

The adding confirmation receiving unit 421 receives a confirmation commission for adding the device C303 supplied by the device A301 via the second communication, and responds thereto. Similar to the adding confirming unit 332, the adding confirming unit 422 performs processing to confirm with the user of the device B302 as to whether or not the device can be added. The profile processing unit 423 exchanges profile information with other devices making up the second communication net 310, and synchronizes the information of each other.

As shown in FIG. 19C, as a function of the content cast application 211, the device C303 has an adding device processing unit 430, hand-over control unit 221, application control unit 223, GUI control unit 224, and memory access processing unit 225.

The adding device processing unit 430 performs processing as a device to be added to the second communication net 310. The adding device processing unit 430 is a processing unit similar to the adding device processing unit 350, and has a setting information sending/receiving unit 431, second communication control unit 432, and profile processing unit 433.

Similar to the setting information sending/receiving unit 351, the setting information sending/receiving unit 431 uses the first communication established with the touched (positioned near) device A301 to perform sending/receiving of equipment information and capability information (connection information). Similar to the second communication control unit 352, the second communication control unit 432 establishes the second communication with the device A301 which is the master. Similar to the profile processing unit 353, the profile processing unit 433 exchanges profile information with other devices making up the second communication net 310, and synchronizes the information of each other.

Figure 20:
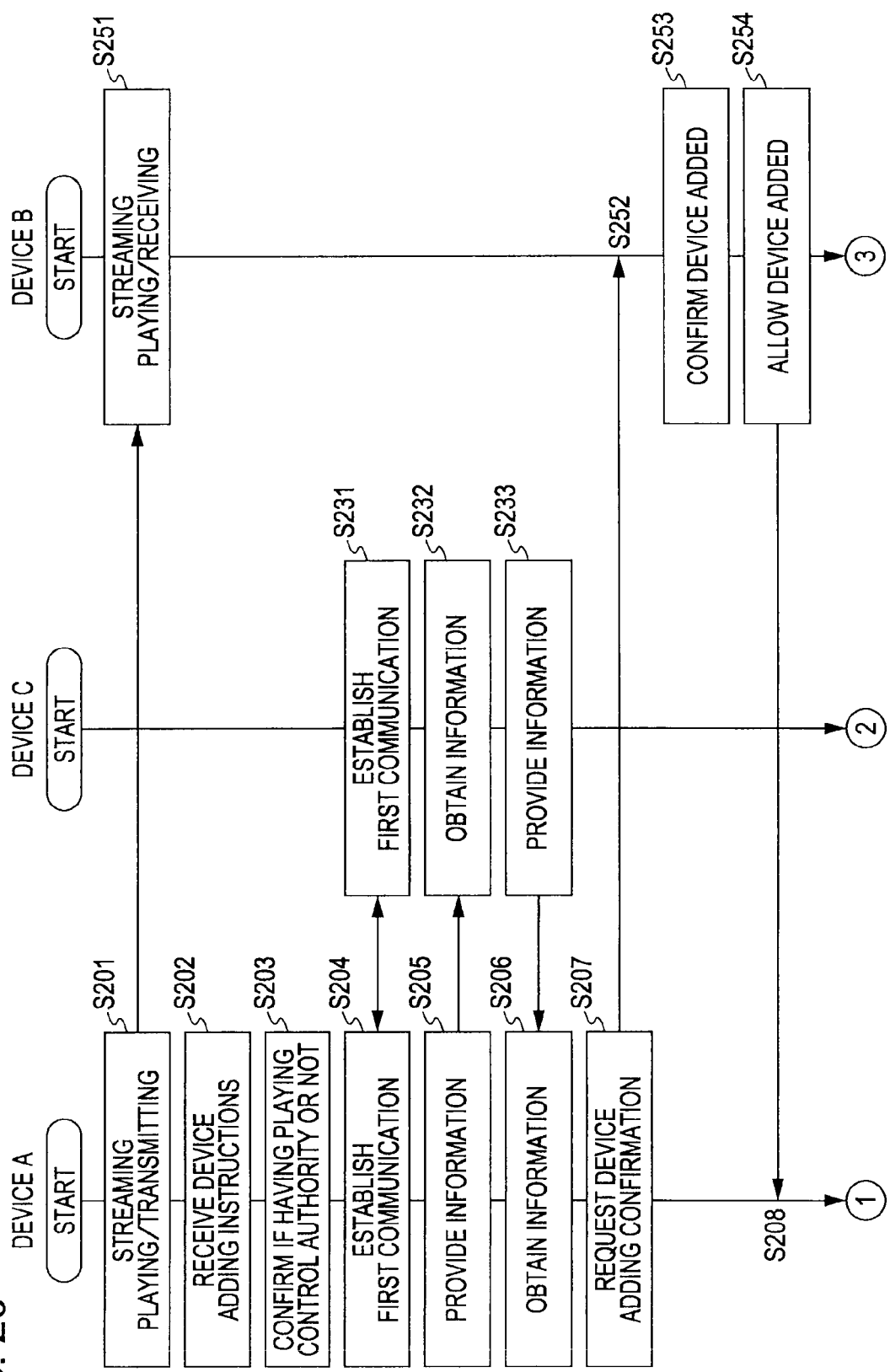
FIG. 20 is a flowchart describing the flow of processing of a device addition.

Next, an example of processing flow in the addition of the device C303 as shown in FIGS. 19A through 19C will be described with reference to the flowcharts in FIGS. 20 and 21. Note that description will be given with reference to FIG. 22 as appropriate.

First, in the state shown in FIG. 18A, in step S201 the music player application 212 of the device A301 performs transmission of song data (streaming playing/transmission). A GUI indicating that the song data is in transmission, such as shown in FIG. 11 for example, is displayed on the monitor of the device A301.

In step S251, the music player application 212 of the device B302 plays while receiving the song data distributed by the device A301 (streaming playing/receiving). A GUI indicating that the music data is being received and played, such as shown in FIG. 12 for example, is displayed on the monitor of the device B302 at this time. During the streaming playing, when the user of the device A301 operates a Menu button displayed on the GUI and so forth to instruct adding the device, for example, the adding instruction receiving unit 411 of the device A301 receives the device adding instruction thereof in step S202.

Upon the adding instructions of the device being received, in step S203 the playing control authority processing unit 412 displays a GUI for the user to confirm giving the playing control authority as shown in FIG. 13, for example.

Upon confirmation that the playing control has been given, preparation for the first communication of the device A301 is complete. When the device C303 is touched (positioned near) the device A301 in this state, the hand-over control unit 221 of the device A301 establishes the first communication with the device C303 that has been touched (positioned near) as shown in FIG. 18B. A screen to prompt the user to perform touching (positioning near) operation as shown in FIG. 14 for example is displayed on the monitor of the device A301 at this time.

Corresponding to the processing of the device A301, in step S231 the hand-over control unit 221 of the device C303 also establishes the first communication with the device A301 that has been touched (positioned near) as shown in FIG. 18B. Upon the device C303 touching (positioning near) the device A301, a GUI screen for the user to confirm that the first communication has been established, as shown in FIG. 15 for example, is displayed on the monitor of the device C303.

Upon the first communication establishing, the setting information sending/receiving unit 413 of the device A301 provides various types of setting information in step S205 such as equipment information, capability information, and content operating authority information to the device C303. Corresponding to this processing, in step S232 the setting information sending/receiving unit 431 of the device C303 obtains the setting information provided thereby.

The setting information 461 in FIG. 22 shows a configuration example of the setting information provided from the device A301 to the device C303. The setting information 461 is in a format similar to the setting information 361, as shown in FIG. 22, and includes a master address 471 which is equipment information, master capability information 472, new master PIN 473, own address 474 which is equipment information, own capability information 475, and content operation authority 476. Of course, information other than this may be included.

In this case, the device itself is the master, so in the example in FIG. 22, the master address 471 and own address 474 which are equipment information become address A, and the master capability information 472 and own capability information 475 which are capability information become capability information A.

Now, in order to reduce the amount of information, one or the other of the master address 471 or own address 474, and the master capability information 472 or the own capability information 475 may be omitted. However, it should be understood at the transmission destination that the values of the master address 471 and own address 474 are shared, and that the values of the master capability information 472 and the own capability information 475 are also shared. For example, a value may be assigned to one or the other only, leaving the other blank, and in the case thereof, referencing the other value at the device of the transmission destination. Also, a value may be assigned to one or the other only, and assigning the information specifying the reference destination on the other side. The device at the transmission destination identifies the values assigned based on the information at the reference destination thereof.

Also, the new master PIN 473 which is a passkey for confirming a session and which is similar to the new master PIN 373 and the like is set by the device A301, and is set as "1234" for example. The content operating authority 476 is information similar to the content operating authority 376, and indicates whether or not to give content operating authority for the device A301 to the device C303. In the case of the example in FIG. 22, "There are playing controls" is indicated.

Returning to FIG. 20, next the setting information transfer unit 431 of the device C303 provides the setting information such as equipment information, capability information, and content operating authority information to the device A301 in step S233. Corresponding to the processing thereof, the setting information transfer unit 413 of the device A301 obtains the provided setting information in step S206.

The setting information 462 is information similar to the setting information 362, and indicates a configuration example of the setting information provided from the device C303 to the device A301. The setting information 462 includes the own address 477 which is equipment information, own capability information 478 which is capability information, and a new master PIN 479, as shown in FIG. 22. Of course, information other than this may be included.

The own address 477 is address information (identification information) of the device itself, and in the case of the example in FIG. 22, the address C is provided. The own capability information 478 is capability information of the device itself, and in the case of the example in FIG. 22, the capability information C is provided. The new master PIN 479 is the new master PIN supplied by the first communication connection destination. In the case of the example in FIG. 22, the value "1234" which is the same as the new master PIN 473 is provided. The value of this new master PIN being shared indicates that the setting information 462 is information corresponding to the setting information 461. Note that the new master PIN 479 may be any value, and the data length is also optional.

From this information exchange, the device A301 obtains the device information (address) and capability information of the device C303. Also, the device C303 obtains the device information (address) and capability information of the device A301 and information indicating whether or not there is any content operating authority.

Returning to FIG. 20, upon the exchange of the equipment information and capability information and the like with the first communication ending, the adding confirmation control unit 414 of the device A301 uses the second communication in step S207 to perform an adding confirmation commission for the device C303 as to the device B302. The adding confirmation request 463 in FIG. 22 shows information provided by the device A301.

In the example in FIG. 22, the adding confirmation request 463 includes an adding commission requesting command 480, adding device address 481, adding device capability information 482, and adding device content operating authority 483. Of course, information other than this may be included.

The adding commission requesting command 480 is a command to confirm the addition of the device C303 to the second communication net 310 as to the device B302. The adding device address 481 is address information of the device to be added to the second communication net 310, and in the case of the example in FIG. 22, the address C is provided. The adding device capability information 482 is capability information of the device to be added to the second communication net 310, and in the case of the example in FIG. 22, the capability information C is provided.

Note that differing from the case in FIG. 17, the device touched (positioned near) to the device C303 is the master (device A301) itself, whereby the new master PIN, own address, and own capability information and so forth are omitted.

The adding device content operating authority 483 is information indicating whether or not content operating authority can be given to the device to be added, and is information similar to the adding device content operating authority 386. In the case of the example in FIG. 22, the information of "there are playing controls" is provided as the adding device content operating authority 483.

The adding confirmation receiving unit 421 of the device B302 provided with the adding confirmation commission as above obtains this in step S252. In step S253 the adding confirming unit 422 displays a GUI screen on the monitor of the device A301, such as shown in FIG. 16 for example, for the user to confirm the addition of the device.

Upon the user selecting "yes", in step S254 the adding confirmation receiving unit 421 responds as to the adding confirming request as to the device A301 via the second communication, and allows the addition of the device C303.

The response 464 in FIG. 22 shows a configuration example of the information provided to the device A301 by the device B302.

In the example in FIG. 22, the response 464 includes an adding confirmation allowing response 485, own address 486, and own capability information 487. Of course, information other than this may be included.

The adding confirmation allowing response 485 is a response as to the adding confirmation requesting command 480, and indicates that the addition is allowed. The own address 486 is address information (identification information) of the device itself, and in the case of the example in FIG. 22, the address B is provided. The own capability information 487 is capability information for the device itself. In the case of the example in FIG. 22, the capability information B is provided as the own capability information 487.

The adding confirmation control unit 414 of the device A301 obtains the response thereof in step S208.

With this information exchange, the device B302 that is not touched (positioned near) to the device C303 can know that the device C303 has been touched (position near) with the device A301. Also, whether or not the device C303 can be added can be controlled.

Note that in step S253, in the case that the user of the device B302 selects "no", and the addition of the device C303 is denied, in step S254 the adding confirmation receiving unit 421 transmits a response to the device B302 indicating denial. This denial response ends the series of processing. That is to say, in this case, the device C303 is excluded from participation in the second communication net 310.

Thus, the communication between the devices A301 and B032 can be performed using the second communication that is performing streaming playing. That is to say, the devices A301 and B302 can perform the information exchange described above without stopping the streaming playing.

Figure 21:
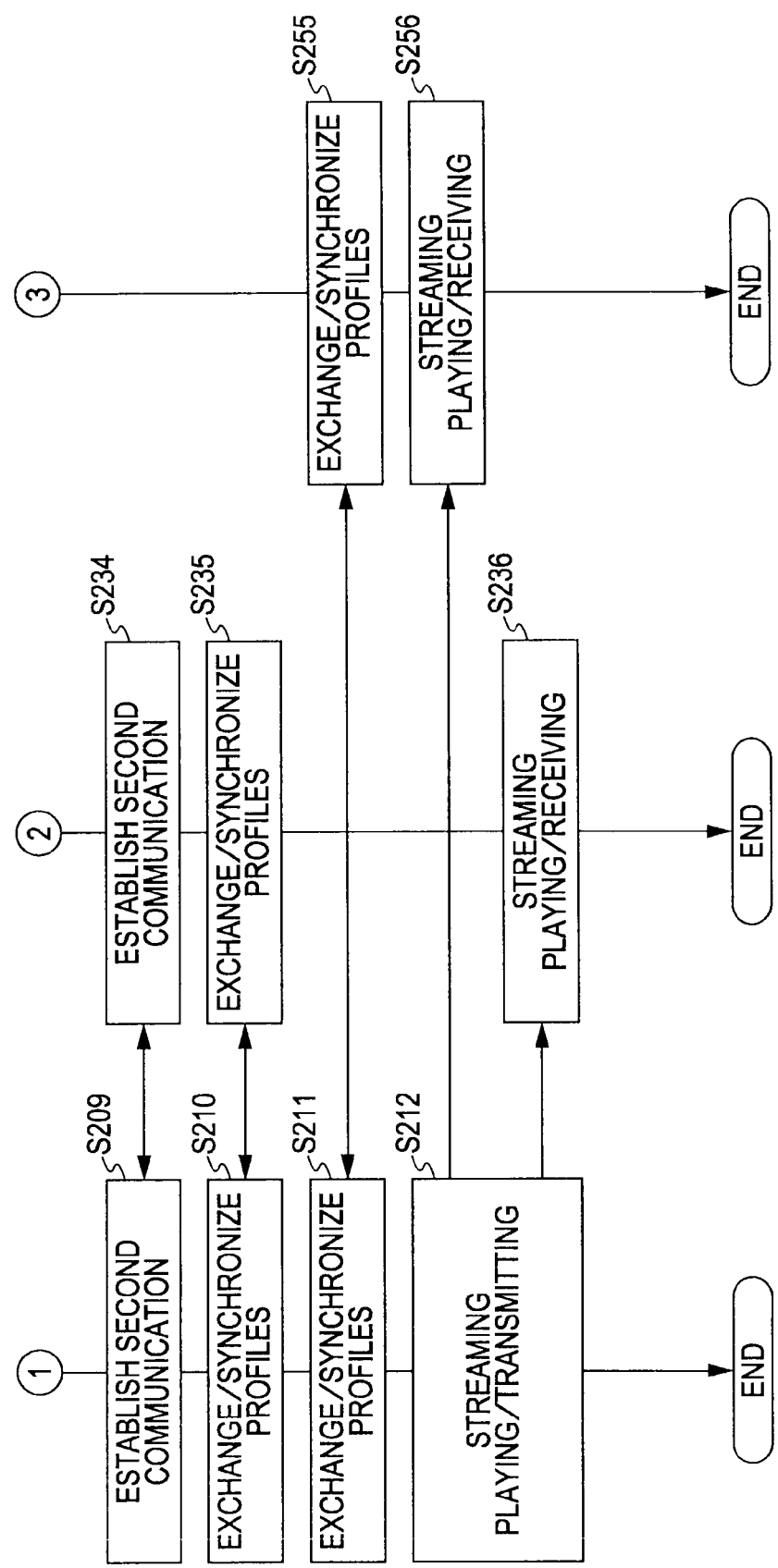
FIG. 21 is a flowchart following FIG. 20 describing the flow of processing of a device addition.

Upon the above processing ending, the second communication can be performed between the devices A301 and C303, but the processing hereafter as shown in FIG. 21 is executed similar to the case shown in FIG. 10.

That is to say, the second communication control unit 415 of the device A301 in step S209 in FIG. 21 and the second communication control unit 432 of the device C303 in step S234 in FIG. 21 establish mutual second communication.

Upon the second communication having been established, the profile processing unit 416 of the device A301 in step S210 and the profile processing unit 433 of the device C303 in step S235 use the second communication to exchange mutual profile information and synchronize the information.

Similarly, the profile processing unit 414 of the device A301 in step S211 and the profile processing unit 423 of the device B302 in step S255 use the second communication to exchange mutual profile information and synchronize the information.

The above processing adds the device C303 to the second communication net 310 as shown in FIG. 18C, and the content data can be distributed from the device A301 to the device C303. Thus, the music player application 212 of the device A301 uses the second communication as to the devices B302 and C303 in step S212 to perform transmission of song data for streaming playing (streaming playing/transmission).

On the other hand, the music player application 212 of the device B302 in step S256 and the music player application 212 of the device C303 each play while receiving song data supplied from the device A301 (streaming playing/receiving).

By thus performing the processing described above, even if the devices performing the second communication are touched (positioned near) to one another, the communication system 300 can readily add a device to the second communication net. That is to say, regardless of which device making up the second communication net is touched (positioned near) by the device to be added, the device can be added to the second communication net. That is to say, adding a device to the second communication net can be made easier.

Also, in this case, the device can be added without stopping the data transmission/reception that was in progress in the second communication net before the addition. Further, in this case also, giving the content operating authority as to the device added to the second communication net can be readily controlled. Thus the communication system 300 can improve usability of the application involving communication between devices.

Note that the number of devices making up the communication system 300 is optional, and for example may be four or more devices. For example, as shown in FIGS. 23A through 23C, a new device can be added to the second communication net made up of three devices.

In FIG. 23A, similar to the case in FIG. 7C and so forth, the device A301 operates as the communication managing device (master), and a second communication net 310 is formed wherein the devices B302 and C303 operate as the receiving devices (slaves). In this state, a device D304 is newly added to the second communication net 310.

Therefore, as shown in FIG. 23B the device D304 is touched (positioned near) to the device C303, and as indicated by the arrow 323 the first communication is performed between the device C303 and D304. The second communication is established between the devices A301 and D304 by the hand-over processing, and as shown in FIG. 23C the device D304 is added to the second communication net 310.

Content data streaming distribution is performed as to the devices B302 through D304 from the device A301, using the second communication, as indicted by arrows 311 through 313. The devices B302 through D304 play while receiving the streaming data thereof.

That is to say, in this case, the device D304 performs processing similar to the device C303 in FIGS. 7A through 7C that is touched (positioned near) to the receiving device, and the device C303 performs processing similar to the device B302 in FIGS. 7A through 7C which is the receiving device to which the device to be added is touched (positioned near). The device B302 performs processing similar to the device B302 in FIGS. 18A through 18C which is the receiving device to which the device to be added is not touched (positioned near). The device A301 performs processing of both the device A301 in FIGS. 7A through 7C which is the communication managing device that processes the adding request from the receiving device to which the device to be added is touched (positioned near), and the device A301 in FIGS. 18A through 18C which is the communication managing device performing confirmation of the addition to the receiving device to which the device to be added is not touched (positioned near).

Figure 24B:
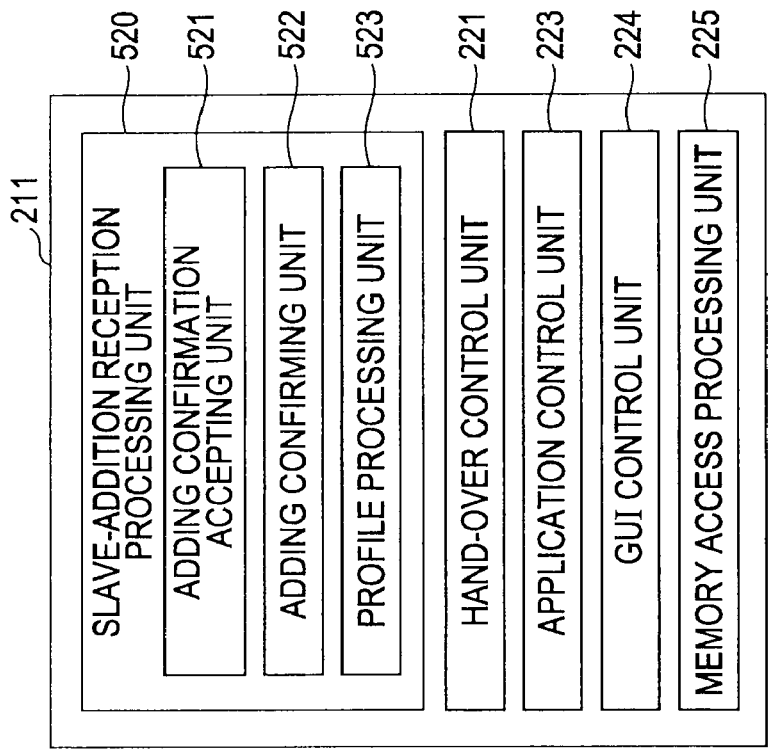
FIGS. 24A through 24B are diagrams illustrating a configuration example of a functional block of each device.
Figure 24A:
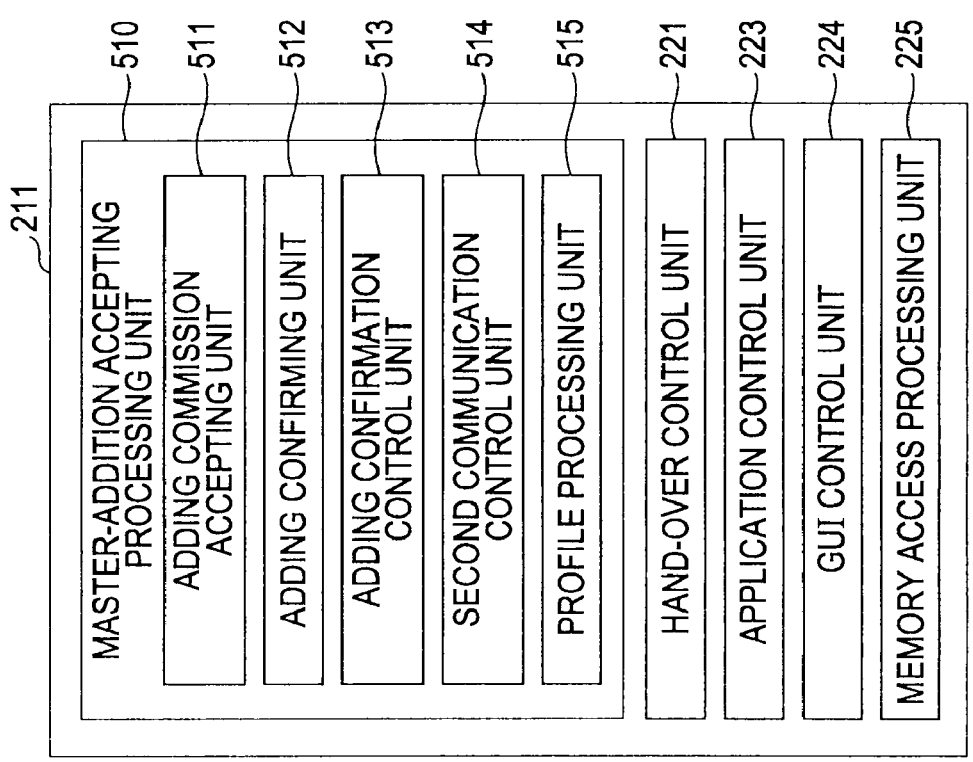
Figure 25B:
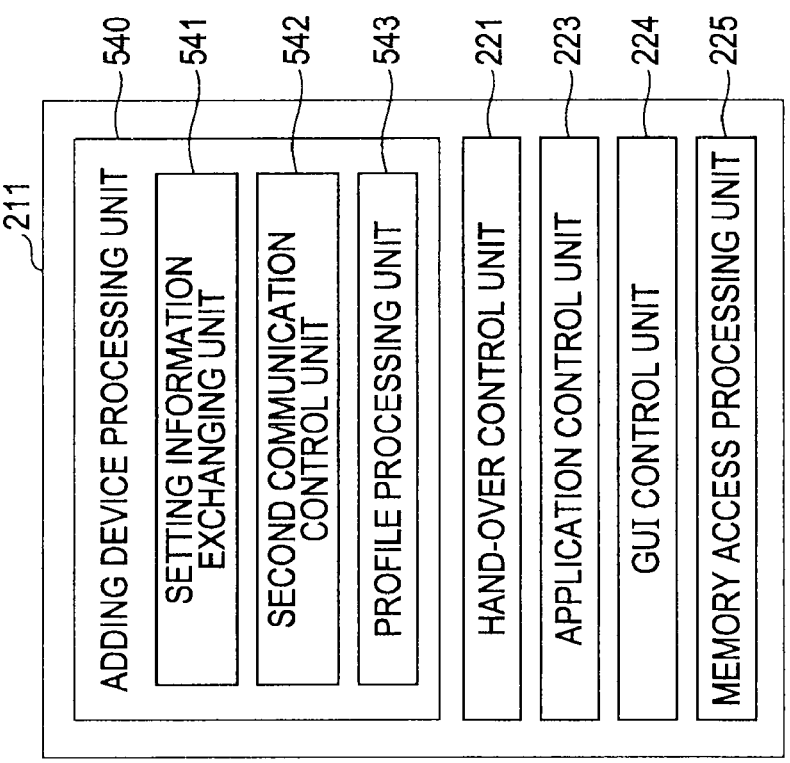
FIGS. 25A and 25B are diagrams illustrating a configuration example of a functional block of each device.
Figure 25A:
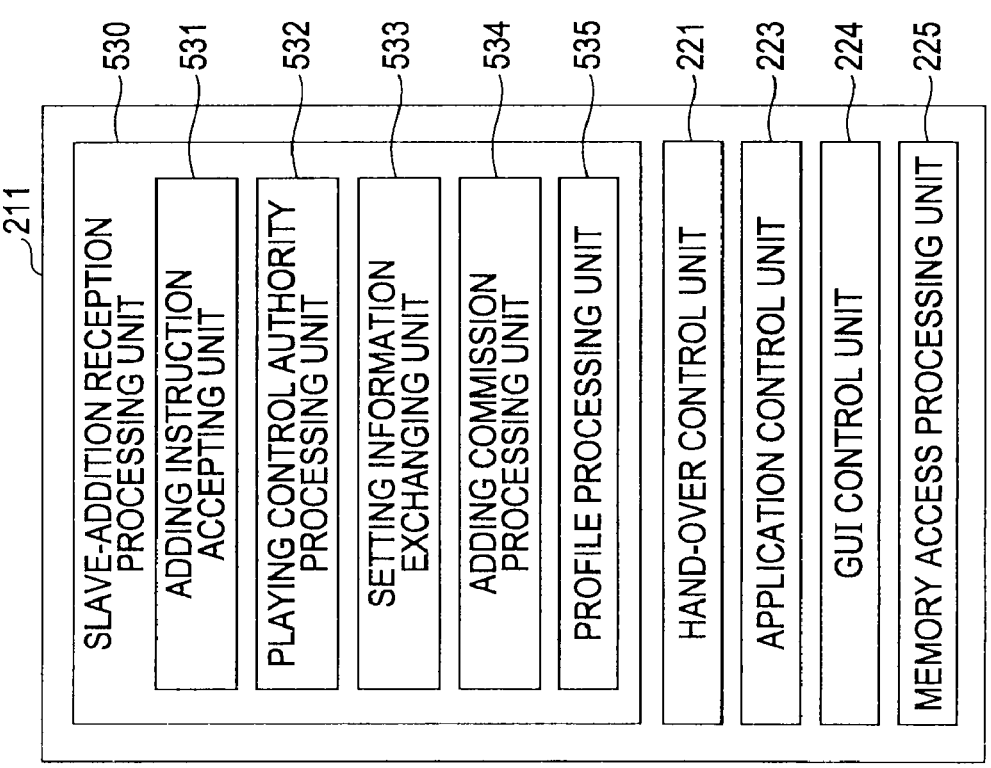

Accordingly, the configuration example of the content cast application 211 for each device in this case is as shown in FIGS. 24A, 24B, 25A, and 25B. FIG. 24A shows a configuration example of the content cast application 211 of the device A301. FIG. 24B shows a configuration example of the content cast application 211 of the device B302. FIG. 25A shows a configuration example of the content cast application 211 of the device C303. FIG. 25B shows a configuration example of the content cast application 211 of the device D304. The portions similar to the configuration described with reference to FIG. 4 have the same reference numerals appended thereto.

As shown in FIG. 24A, as a function of the content cast application 211, the device A301 has a master adding receiving processing unit 510, hand-over control unit 221, application control unit 223, GUI control unit 224, and memory access processing unit 225.

The master adding receiving processing unit 510 performs processing to receive the addition of a device as the master (communication managing device) in the second communication net 310. The master adding receiving processing unit 510 has an adding commission accepting unit 511, adding confirming unit 512, adding confirmation control unit 513, second communication control unit 514, and profile processing unit 515.

The adding commission accepting unit 511 is a processing unit similar to the adding commission accepting unit 331 (FIG. 8A), and performs processing as to the adding commission for the device D304 supplied by the device C303 touched (positioned near) to the device D304. The adding confirming unit 512 is a processing unit similar to the adding confirming unit 332 (FIG. 8A), and performs processing to confirm with the user of the device A301 whether or not the device D304 can be added. The adding confirmation control unit 513 is a processing unit similar to the adding commission accepting unit 414 (FIG. 19A) and performs processing to confirm with the user of the device B302 to which the device D304 is not touched (positioned near), whether or not the device D304 can be added.

The second communication control unit 514 is a processing unit similar to the second communicating control unit 333 (FIG. 8A) and the second communicating control unit 415 (FIG. 19A), and establishes second communication with the device D304. The profile processing unit 515 is a processing unit similar to the profile processing unit 334 (FIG. 8A) and profile processing unit 416 (FIG. 19A), and exchanges profile information with other devices making up the second communication net 310, and synchronizes the information of each other.

As shown in FIG. 24B, as a function of the content cast application 211, the device B302 has a slave-addition reception processing unit 520, hand-over control unit 221, application control unit 223, GUI control unit 224, and memory access processing unit 225.

The slave-addition reception processing unit 520 performs processing to receive the addition of a device as a slave (receiving device) in the second communication net 310. As shown in FIG. 24B, this slave-addition reception processing unit 520 performs processing of a device not touched (positioned near) the device to be added D304. The slave-addition reception processing unit 520 has basically the same configuration as the slave-addition reception processing unit 420 (FIG. 19B), and has an adding confirmation receiving unit 521, adding confirming unit 522, and profile processing unit 523.

The adding confirmation receiving unit 521 is a processing unit similar to the adding confirmation receiving unit 421 (FIG. 19B), and receives a confirmation commission for adding the device D304 supplied by the device A301 via the second communication, and responds thereto. The adding confirming unit 522 is a processing unit similar to the adding confirming unit 422 (FIG. 19B), and performs processing to confirm with the user of the device B302 whether or not the device can be added. The profile processing unit 523 is a processing unit similar to the profile processing unit 423 (FIG. 19B), and exchanges profile information with other devices making up the second communication net 310, and synchronizes the information of each other.

As shown in FIG. 25A, as a function of the content cast application 211, the device C303 has a slave-addition reception processing unit 530, hand-over control unit 221, application control unit 223, GUI control unit 224, and memory access processing unit 225.

The slave-addition reception processing unit 530 performs processing to receive the adding of the device as a slave (receiving device) in the second communication net 310. As shown in FIG. 25A, this slave-addition reception processing unit 530 performs processing of the device touched (positioned near) to the device D304 to be added. The slave-addition reception processing unit 530 has basically the same configuration as the slave-addition reception processing unit 340 (FIG. 8B), and has an adding instruction receiving unit 531, playing control authority processing unit 532, setting information sending/receiving unit 533, adding commission processing unit 534, and profile processing unit 535.

The adding instruction receiving unit 531 is a processing unit similar to the adding instruction receiving unit 341 (FIG. 8B), and receives instructions for adding a device from the user. The playing control authority processing unit 532 is a processing unit similar to the playing control authority processing unit 342 (FIG. 8B), and performs processing relating to giving playing control authority which is a right to control the content playing (distribution) as to the device to be added. The setting information sending/receiving unit 533 is a processing unit similar to the setting information sending/receiving unit 343 (FIG. 8B), and uses the first communication established with the device D304 which has been touched (positioned near), and performs sending/receiving of the setting information such as equipment information and capability information.

The adding commission processing unit 534 is a processing unit similar to the adding commission processing unit 344 (FIG. 8B), and performs processing to commission the addition of the device D304 as to the device A301. The profile processing unit 535 is a processing unit similar to the profile processing unit 345 (FIG. 8B), and exchanges profile information with other devices making up the second communication net 310, and synchronizes the information of each other.

As shown in FIG. 25B, as a function of the content cast application 211, the device D304 has an adding device processing unit 540, hand-over control unit 221, application control unit 223, GUI control unit 224, and memory access processing unit 225.

The adding device processing unit 540 performs processing as a device to be added to the second communication net 310. This adding device processing unit 540 has a configuration basically similar to the adding device processing unit 350, and has a setting information sending/receiving unit 541, second communication control unit 542, and profile processing unit 543.

The setting information sending/receiving unit 541 is a processing unit similar to the setting information sending/receiving unit 351 (FIG. 8C), and uses the first communication established with the device C303 that has been touched (positioned near) to perform sending/receiving of setting information such as equipment information and capability information. The second communication control unit 542 is a processing unit similar to the second communication control unit 352 (FIG. 8C), and established the second communication with the device A301 which is the master. The profile processing unit 543 is a processing unit similar to the profile processing unit 353 (FIG. 8C), and exchanges profile information with other devices making up the second communication net 310, and synchronizes the information of each other.

Figure 26:
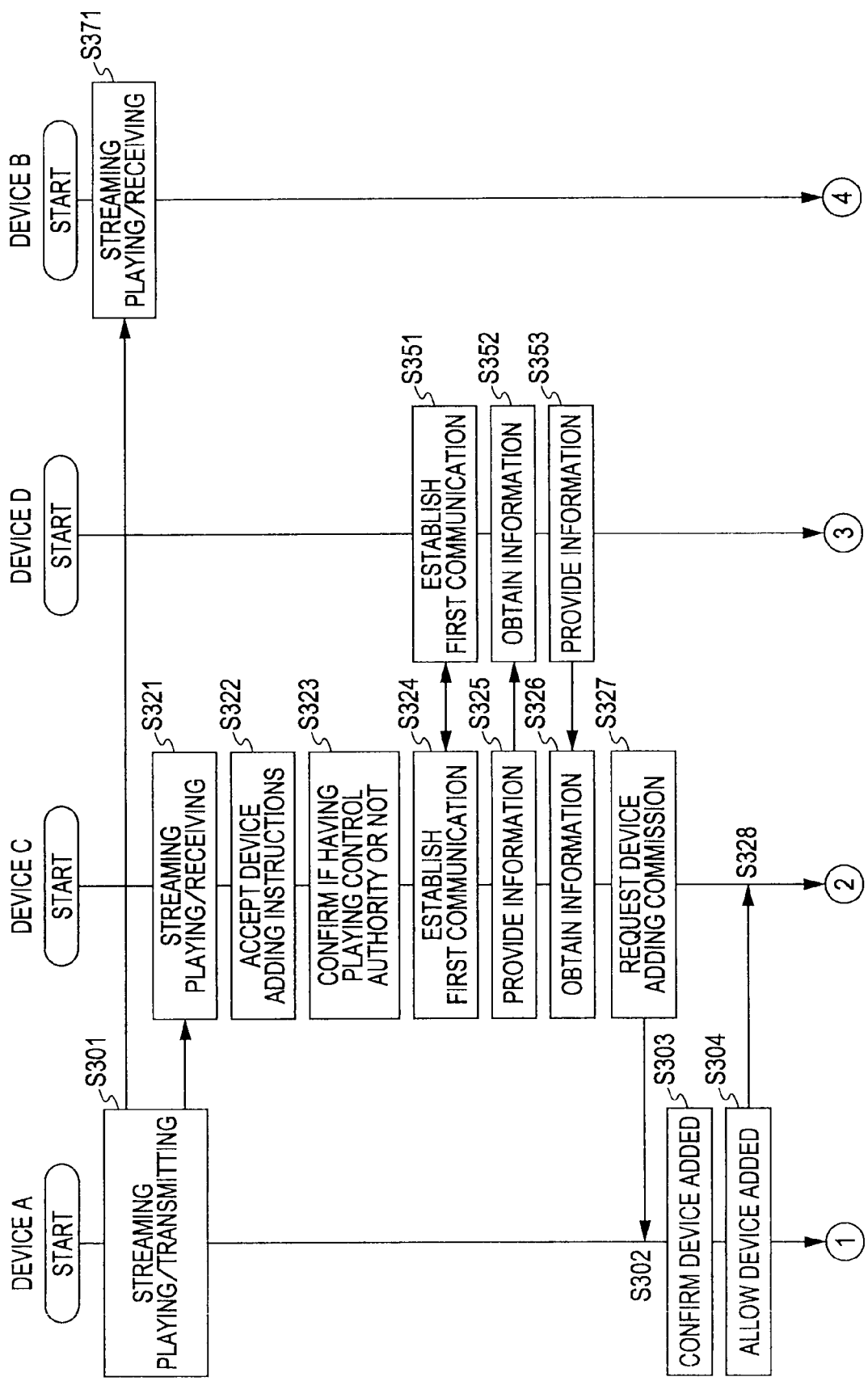
FIG. 26 is a flowchart describing the flow of processing of a device addition.

Next, an example of processing flow in the addition of the device D304 as shown in FIGS. 23A through 23C will be described with reference to the flowchart in FIGS. 26 and 27. Note that description will be made with reference to FIG. 28 as appropriate.

First, in the state shown in FIG. 23A, the music player application 212 of the device A301 transmits the song data (streaming playing/transmission). A GUI indicating that the song data is in transmission, such as shown in FIG. 11 for example, is displayed on the monitor of the device A301.

In step S371 the music player application 212 of the device B302 and in step S321 the music player application 212 of the device C303 each play while receiving the song data distributed by the device A301 (streaming playing/receiving). A GUI indicating that the song data is in during receiving/playing, such as shown in FIG. 12 for example, is displayed on the monitors of the devices B302 and C303. The adding instructions receiving unit 531 of the device C303 receives adding instructions of the device by the user inputting by operating the GUI or the like.

Upon the adding instructions for the device having been received, in step S323 the playing control authority processing unit 532 displays a GUI such as shown in FIG. 13 on the monitor, and confirms with the user whether or not the playing control authority can be given to the device to be added.

Upon the giving the playing control authority having been confirmed, in step S324 the hand-over control unit 221 of the device C303 establishes the first communication with the device D304 that has been touched (positioned near) as shown in FIG. 23B. A screen promoting the touching (positioning near) operation to the user, such as shown in FIG. 14 for example, is displayed on the monitor of the device C303.

Corresponding to the processing of the device C303, the in step S351 the hand-over control unit 221 of the device D304 establishes the first communication with the device C303 that has been touched (positioned near) as shown in FIG. 23B. In this event, a screen for the user to confirm that the first communication is established, such as shown in FIG. 15 for example, is displayed on the monitor of the device D304.

Upon the first communication having been established, in step S325 the setting information sending/receiving unit 533 of the device C303 provides the setting information to the device D304. Corresponding to this processing, in step S352 the setting information sending/receiving unit 541 of the device D304 obtains the provided setting information.

The setting information 561 in FIG. 28 shows a configuration example of the setting information provided from the device C303 to the device D304. As shown in FIG. 28, the setting information 561 includes a master address 571, master capability information 572, new master PIN 573, own address 574, own capability information 575, and content operation authority 576. Of course, information other than this may be included.

The master address 571 is equipment information, and is information similar to the master address 371. In the case of the example in FIG. 28, the address A is provided as the master address 571. The master capability information 572 is capability information, and is information similar to the master capability information 372. In the case of the example in FIG. 28, capability information A is provided as master capability information 572.

The new master PIN 573 is information similar to the new master PIN 373. In the case of the example in FIG. 28, the device C303 generates the new master PIN 573. Let us say that a value "1234" is provided here as the new master PIN 573. Note that the new master PIN 573 may be any value, and the data length thereof is also optional.

The own address 574 is equipment information, and is information similar to the own address 374. In the case of the example in FIG. 28, the address C is provided as the own address 574. The own capability information 575 is capability information, and is information similar to the own capability information 375. In the case of FIG. 28, the capability information B which is the capability information of the device B302 is provided as the own capability information 575. The content operating authority 576 is information similar to the content operating authority 376. In the case of the example in FIG. 28, information to the effect of "there are playing controls" is provided as content operating authority 576.

Returning to FIG. 26, next in step S353, the setting information sending/receiving unit 541 of the device D304 provides setting information to the device C303. Corresponding to this processing, the setting information sending/receiving unit 533 of the device C303 obtains the provided setting information thereof in step S326.

The setting information 562 in FIG. 28 shows a configuration example of the setting information provided from the device D304 to the device C303. The setting information 562 includes a own address 577, own capability information 578, and a new master PIN 579, as shown in FIG. 28. Of course, other information may be included.

The own address 577 is equipment information, and is information similar to the own address information 377. In the case of the example in FIG. 28, the address of the device D304 (address D) is provided as the own address 577. The own capability information 578 is capability information, and is information similar to the own capability information 378. In the case of FIG. 28, the capability information of the device D304 (capability information D) is provided as the own capability information 578.

The new master PIN 579 is information similar to the new master PIN 379. In the case of the example in FIG. 28, "1234" is provided as the new master PIN 579. The value of the new master PIN 579 being shared indicates that the setting information 562 is information corresponding to the setting information 561. Note that the new master PIN 579 may be any value, and the data length is optional.

From this exchange of information, the device C303 obtains the equipment information (address) and capability information of the device D304. Also, the device D304 obtains the equipment information (address) and capability information of the device A301, as well as information indicating whether or not there is content operating authority, in addition to the equipment information (address) and capability information of the device C303.

Returning to FIG. 26, upon the exchange of setting information by the first communication ending, the adding commission processing unit 534 of the device C303 uses the second communication in step S327 and performs an adding commission request for the device D304 as to the device A301. The adding commission request 563 in FIG. 28 indicates information provided to the device A301 at this time.

In the example in FIG. 28, the adding commission request 563 includes an adding commission requesting command 580, adding device address 581, adding device capability information 582, new master PIN information 583, and adding device content operating authority 584. Of course, information other than this may be included. For example, a own address or own capability information may be appended. However, since the data here is transferred using an already-existing second communication, even if there is no own address or own capability information indicating the transmission destination, the device A301 can identify the device A301.

The adding commission requesting command 580 is a command similar to the adding commission requesting command 380, and requests the device A301 to add the device D304 to the second communication net 310. The adding device address 581 is information similar to the adding device address 381. In the case of the example in FIG. 28, the address D is provided as the adding device address 581. The adding device capability information 582 is information similar to the adding device capability information 382. In the case of the example in FIG. 28, the capability information D is provided as the adding device capability information 582. The new master PIN 583 is information similar to the new master PIN 383. In the case of the example in FIG. 28, a value "1234" is provided as the new master PIN 583.

The adding device content operating authority 584 is information similar to the adding device content operating authority 386. In the case of FIG. 26, information to the effect of "there are playing controls" is provided as the adding device content operating authority 586.

The adding commission accepting unit 511 of the device A301 obtains this type of adding commission request in step S302. In step S303 the adding confirming unit 512 displays a GUI screen such as shown in FIG. 16 for example on the monitor of the device A301, and confirms with the user whether or not the device will be allowed to be added.

Upon the user selecting "yes", in step S304 the adding commission accepting unit 511 responds to the adding commission request as to the device C303 via the second communication, and allows the device D304 to be added. The response 564 in FIG. 28 indicates a configuration example of the information provided to the device C303 by the device A301.

In the example in FIG. 28, the response 564 includes an adding commission allowing response 585 and a new master PIN 586. Of course, information other than this may be included.

The adding commission allowing response 585 is information similar to the adding commission allowing response 387, is a response as to the adding commission request command 580, and shows that the addition is allowed. The new master PIN 586 is information similar to the new master PIN 388, and the value "1234" is provided.

The adding commission processing unit 534 of the device C303 obtains the response thereof in step S328.

This information exchange enables the device A301 which is a communication managing device which has not been touched (positioned near) by the device D304 to also obtain the equipment information (address) and capability information of the device D304. Also, the device C303 can know that the addition of the device D304 has been allowed by the device A301.

Note that in step S303, in the case that the user of the device A301 selects "no" and the addition of the device C303 is denied, in step S304 the adding commission accepting unit 511 responds to the adding commission request as to the device C303 via the second communication, and denies the device D304. This denial response ends the series of processing. That is to say, in this case the device C303 is excluded from participation in the second communication net 310.

Now, the device A301 confirms the device addition with the device B302 which is a receiving device to which the device D304 has not been touched (positioned near). That is to say, in step S305 in FIG. 27, the adding confirmation control unit 513 of the device A301 uses the second communication to request confirmation of the addition of the device D304 as to the device B302. The adding confirmation request 565 in FIG. 28 shows information provided at this time by the device A301.

In the example in FIG. 28, the adding confirmation request 565 includes an adding confirmation requesting command 587, adding device address 588, adding device capability information 589, and adding device content operation authority 590. Of course, information other than this may be included.

The adding confirmation requesting command 587 is information similar to the adding confirmation requesting command 480. The adding device address 588 is information similar to the adding device address 481, and in the case of the example in FIG. 28, the address D is provided. The adding device capability information 589 is information similar to the adding device capability information 482, and in the case of the example in FIG. 28, capability information D is provided.

The adding device content operation authority 590 is information similar to the adding device content operation authority 483, and in the case of the example in FIG. 28, information to the effect of "there are playing controls" is provided as the adding device content operation authority 590.

The adding confirmation receiving unit 521 of the device B302 provided by the adding confirmation request 565 as described above obtains this information in step S372. In step S373, the adding confirming unit 522 displays a GUI screen such as shown in FIG. 16 for example on the monitor of the device B302, and receives user instructions. Upon the user selecting "yes", in step S374 the adding confirmation receiving unit 521 responds to the adding confirmation request as to the device A301 via the second communication, and allows the addition of the device D304. The response 566 in FIG. 28 shows a configuration example of information provided to the device A301 by the device B302 at this time.

With the example in FIG. 28, the response 566 includes an adding confirmation allowing response 591. Of course, information other than this may be included. The adding confirmation allowing response 591 is information similar to the adding confirmation allowing response 485. The adding confirmation control unit 513 of the device A301 obtains the response thereof in step S306.

This information exchange enables the device B302 that has not touched (positioned near) with the device D304 to know that the device D304 has been touched (positioned near). Also, whether or not the device D304 can be added can be controlled.

That is to say, in the case that the user of the device B302 selects "no" and denies the addition of the device C303 in step S373, in step S374 the adding confirmation receiving unit 521 transmits the response indicating denial as to the device A301 via the second communication. This denial response ends the series of processing is ended. That is to say, in this case the device C303 is excluded from participation in the second communication net 310.

Thus, communication between the devices A301 and B302 can be performed using the second communication wherein streaming playing is being performed. That is to say, the devices A301 and B032 can perform the above-described information exchange without stopping the streaming playing.

Upon the above processing ending, the second communication is enabled between the devices A301 and C303, but the processing hereafter that is shown in FIG. 27 is executed similar to the case shown in FIG. 10.

That is to say, the second communication control unit 514 of the device A301 in step S307 of FIG. 27 and the second communication control unit 542 of the device D304 in step S354 of FIG. 27 establish the second communication with one another.

Upon the second communication having been established, in step S308 the profile processing unit 535 of the device A301 exchanges and synchronizes profile information with each device of devices B302 through D304 using the second communication. Corresponding to this processing, the profile processing unit 523 of the device B302 in step S375 of FIG. 27, the profile processing unit 535 of the device C303 in step S329 of FIG. 27, and the profile processing unit 543 of the device D304 in step S355 each use the second communication to exchange and synchronize profile information with the device A301.

With the above processing, as shown in FIG. 23C the device D304 is added to the second communication net 310, and distribution of content data from the device A301 to the device D304 is enabled. Thus, the music player application 212 of the device A301 uses the second communication in step S309 to transmit song data for streaming playing as to the devices B302 through D304 (streaming playing/transmission).

The music player application 212 of the device B302 in step S376, the music player application 212 of the device C303 in step S330, and music player application 212 of the device D304 in step S356 each play while receiving song data supplied by the device A301 (streaming playing/receiving).

By performing the processing as above, the communication system 300 can readily add a new device even in the case that there are three or more devices forming the second communication net 310. That is to say, adding a device to the second communication net becomes easier.

Also in this case, a device can be added without stopping the data transmission/reception in the second communication net that is occurring before the addition. Further, in this case also, the user of the device to which the device to be added has not been touched (positioned near) can readily control whether or not a device can be added to the second communication net. Also, in this case also, giving content operating authority to the device to be added to the second communication net can be readily controlled. Thus, the communication system 300 can improve the usability of the application providing communication between devices.

Note that in the communication system 300, in the case of adding a new receiving device when the device A301 is distributing data to three or more receiving devices, there are multiple devices not touched (positioned near) to the device to be added. The device A301 performs adding confirmation requesting as described above as to all of the "receiving devices not touched (positioned near) to the device to be added". That is to say, each of the "receiving devices not touched (positioned near) to the device to be added" have similar configuration to the device B302 in FIGS. 23A through 23C, and perform similar processing.

Also, by touching (position near) the device D304 to the device A301, the device D304 can participate in the second communication net 310. In this case, the devices B302 and C303 which are receiving devices are each "receiving devices not touched (positioned near) to the device to be added", thereby having similar configuration to the case of the device B302 in the example in FIGS. 18A through 18C, and perform similar processing. The case wherein the communication system 300 is made up of five devices or more is also the same.

Figure 29C:
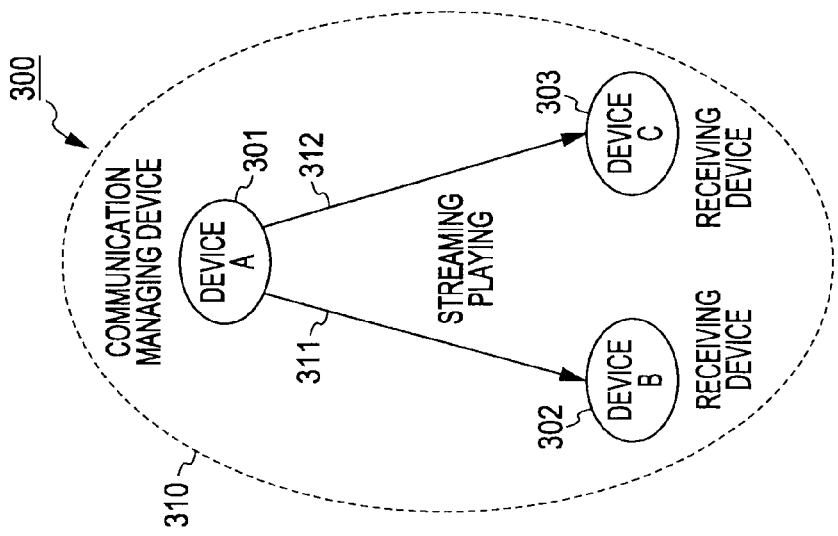
FIGS. 29A through 29C are diagrams illustrating a primary configuration example of a communication system to which the present invention has been applied.

Next, the case of deleting devices forming the second communication net from the second communication net will be described. For example, as shown in FIG. 29A, the second communication net 310 is formed with the devices A301 through D304. Let us say that the device A301 operates as the communication managing device, devices B302 through D304 operate as receiving devices, and the device A301 uses the second communication to perform streaming distribution of song data as to the devices B302 through D304.

Figure 29B:
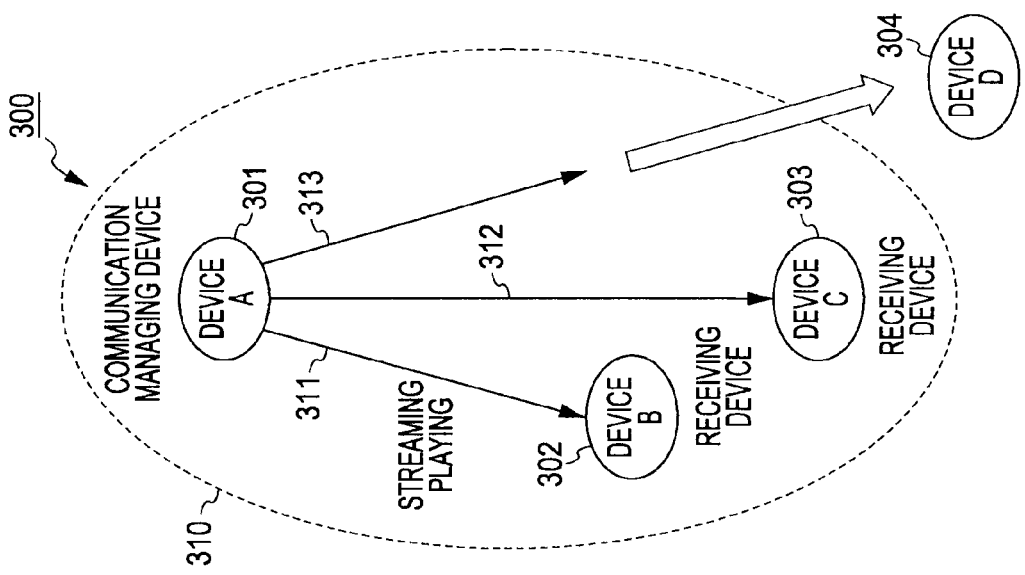
Figure 29A:
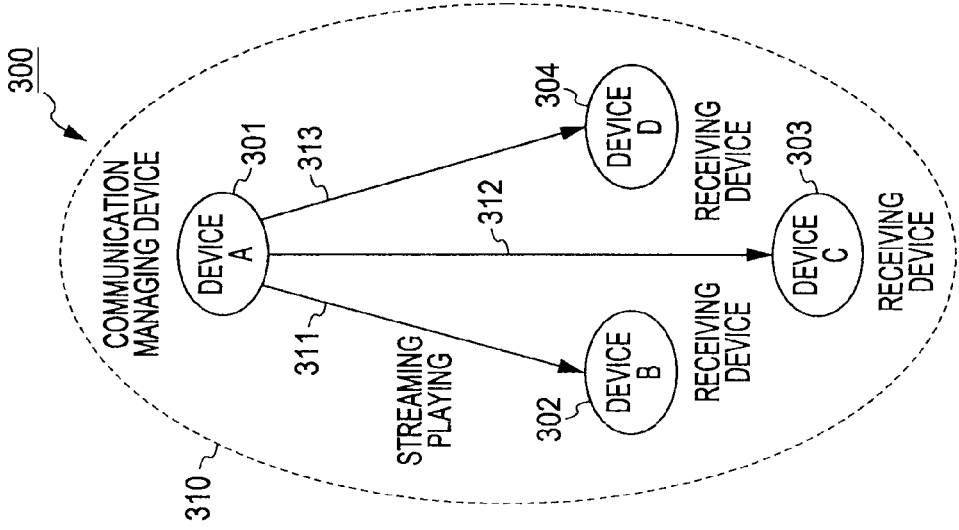

In the case that the device D304 which is the receiving device sufficiently is removed from the device A301 which is the communication managing device for example, as shown in FIG. 29B, the device D304 is outside the communicable range of the second communication. In such a case, second communication between the device D304 thereof and the device A301 is not longer continued (arrow 313), whereby the device D304 is deleted from the second communication net 310. However, in a case that the other devices B302 and C303 which are receiving devices and the device A301 are communicable, the device A301 continues to distribute data to the devices thereof as shown in FIG. 29C (arrows 31 and 312).

Thus, even in the case that the device D304 is deleted from the communication net 310, useless processing such as temporarily stopping all of the streaming distribution can be suppressed, and an increase of the effects of deleting the device D304 can be suppressed. That is to say, the communication system 300 can improve the usability of the application providing communication between devices.

Figure 30A:
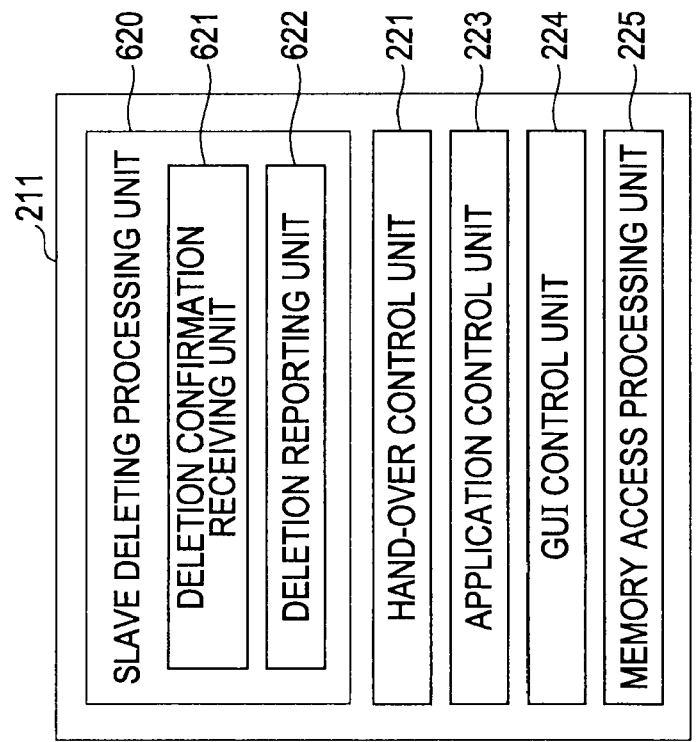
FIGS. 30A and 30B are diagrams illustrating a configuration example of a functional block of each device.
Figure 30B:
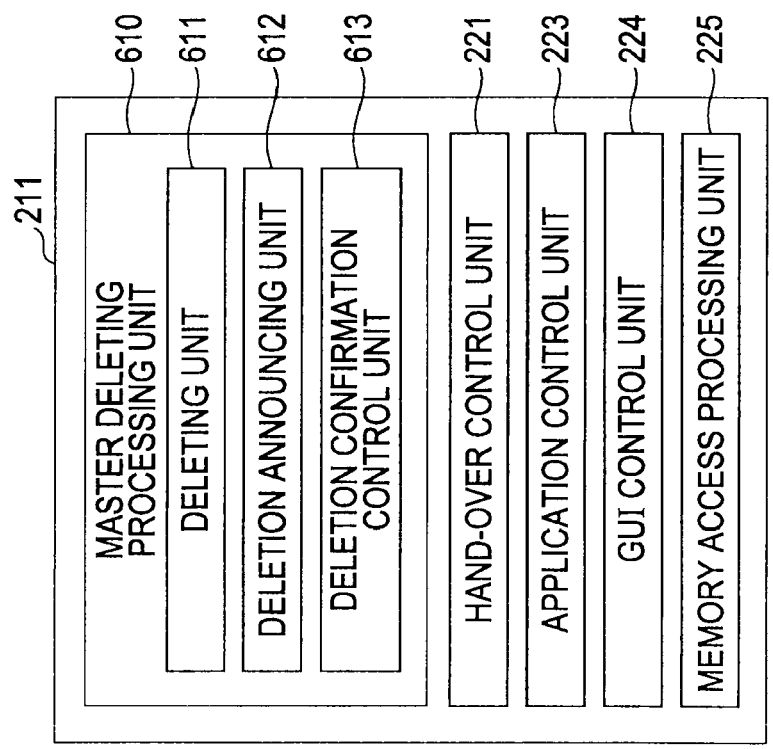

This will be described in detail below. FIGS. 30A and 30B show a configuration example of the content cast application 211 for each device in this case. FIG. 30A shows a configuration of the content cast application 211 of the device A301. FIG. 30A shows a configuration of the content cast application 211 of the devices B302 and C303. The portions similar to the configuration described with reference to FIG. 4 has the same reference numerals appended thereto.

As shown in FIG. 30A, as a function of the content cast application 211, the device A301 has a master deleting processing unit 610, hand-over control unit 221, application control unit 223, GUI control unit 224, and memory access processing unit 225.

The master deleting processing unit 610 performs deleting processing of a device serving as the master (communication managing device) in the second communication net 310. The master deleting processing unit 610 has a deleting unit 611, deletion reporting unit 612, and deletion confirmation control unit 613.

The deleting unit 611 detects a receiving device that has become disabled from the second communication, and performs processing to delete the equipment information thereof and the user profile information thereof. The deletion reporting unit 612 displays a GUI screen on a monitor and so forth to notify the user that the device has been deleted. The deletion confirmation control unit 613 notifies the user that information relating to the receiving device that has become noncommunicable is to be deleted from other devices.

As shown in FIG. 30B, as a function of a content cast application 211, the device B302 has a slave deleting processing unit 620, hand-over control unit 221, application control unit 223, GUI control unit 224, and memory access processing unit 225.

The slave deleting processing unit 620 performs deleting processing of a device serving as the slave (receiving device) in the second communication net 310. The slave deleting processing unit 620 has a deletion confirmation receiving unit 621 and deletion reporting unit 622.

The deletion confirmation receiving unit 621 performs processing as to the deleting confirmation request supported by the device A301. The deletion reporting unit 622 displays a GUI screen on a monitor or the like to notify the user that the device has been detected.

Note that the function which the device C303 has which is a function serving as the content cast application 211 is similar to the case of device B302 shown in FIG. 30B, so the description thereof will be omitted.

Figure 31:
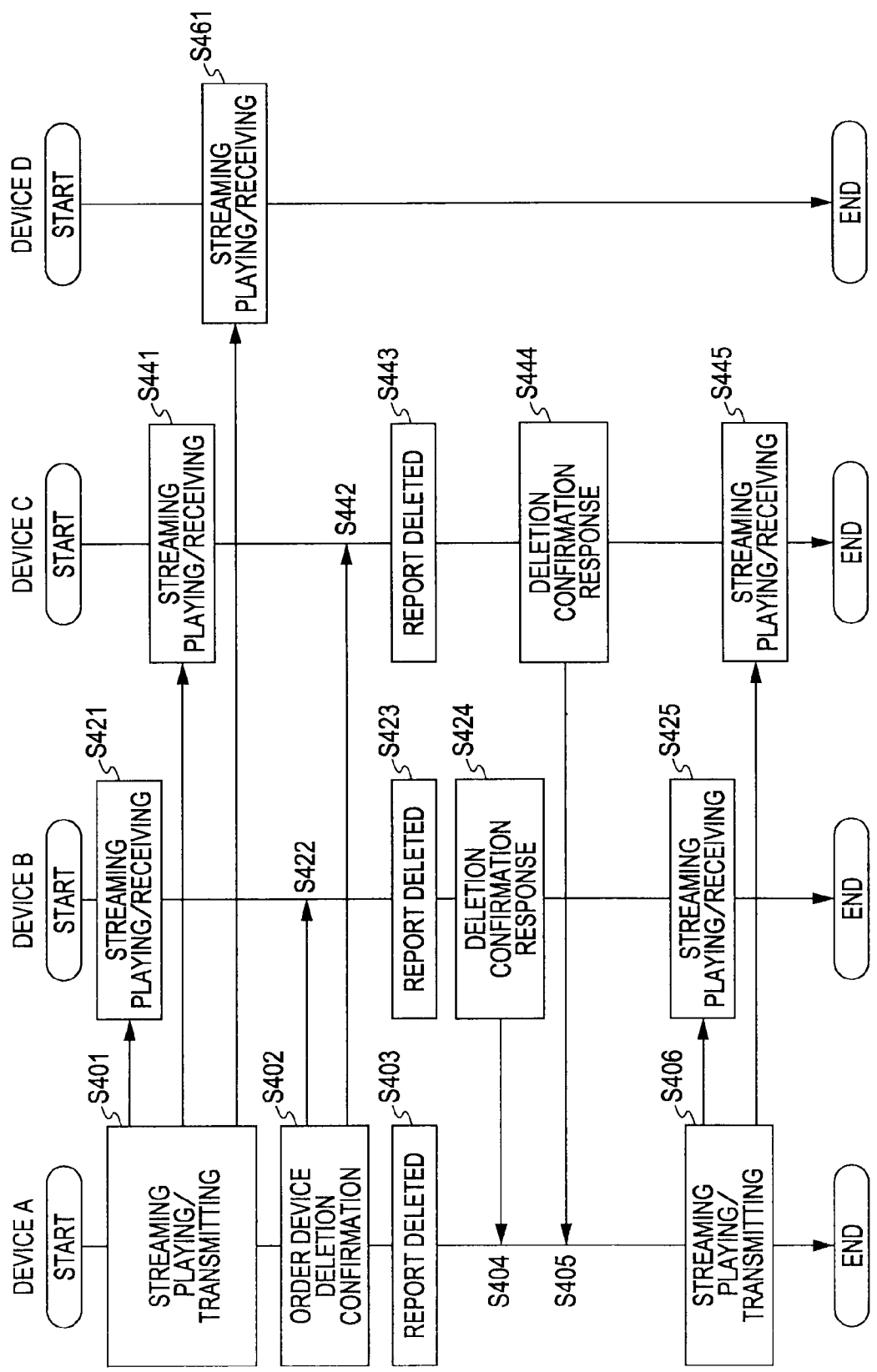
FIG. 31 is a flowchart describing the processing flow of deleting a device.

Next, an example of processing flow when adding the device D304 will be described with reference to the flowchart in FIG. 31. Note that FIGS. 32 and 33 will be reference in the description as appropriate.

First, in the state shown in FIG. 30A, in step S401 the music player application 212 of the device A301 transmits the song data to the devices B302 through D304 (streaming playing/transmission). A GUI such as that shown in FIG. 11 for example is displayed on the monitor of the device A301 at this time indicating that song data is being transmitted.

The music player application 212 of the device B302 in step S421, the music player application 212 of the device C303 in step S441, and the music player application 212 of the device D304 in step S461 each play while receiving song data distributed by the device A301 (streaming playing/receiving). A GUI such as that shown in FIG. 12 indicating that song data is being received and played is displayed on the monitors of each device of the devices B302 through D304.

Upon the device D304 moving outside the communicable range of the second communication, the deleting unit 611 of the device A301 detects this fact, and deletes information relating to the device D304 such as equipment information, profile information, and so forth.

Figure 33:
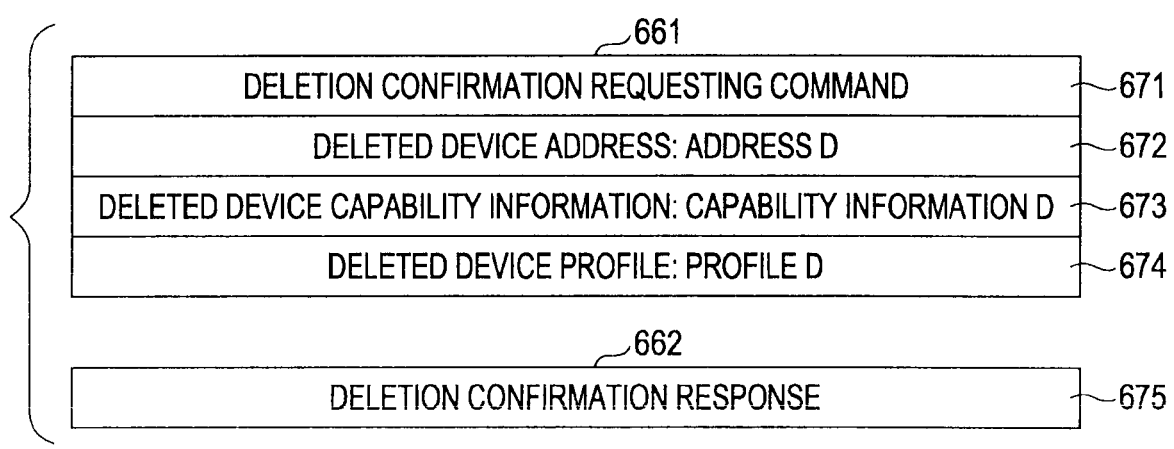
FIG. 33 is a diagram illustrating a configuration example of data that is exchanged.

In step S402, the deletion confirmation control unit 613 of the device A301 uses the second communication to supply information such as shown in the deletion confirmation request 661 of FIG. 33 as to the remaining devices B302 and C303, and requests confirmation of the deletion of the device D304.

The deletion confirmation request 661 has a deletion confirmation requesting command 671, deleted device address 672, deleted device capability information 673, and deleted device profile 674, as shown in FIG. 33. Of course, information other than this may be included.

The deletion confirmation requesting command 671 is a command requesting the deletion of information relating to the device D304 that each receiving device holds. The deleted device address 672 is an address (identification information) of the device to be deleted. In the case of the example in FIG. 33, the address D is provided as the deleted device address 672. The deleted device capability information 673 is capability information of the device to be deleted. In the case of the example in FIG. 33, the capability information D is provided as the deleted device capability information 673. The deleted device profile 674 is profile information of the device to be deleted. In the case of FIG. 33, the profile D is provided as the deleted device profile 674.

Figure 32:
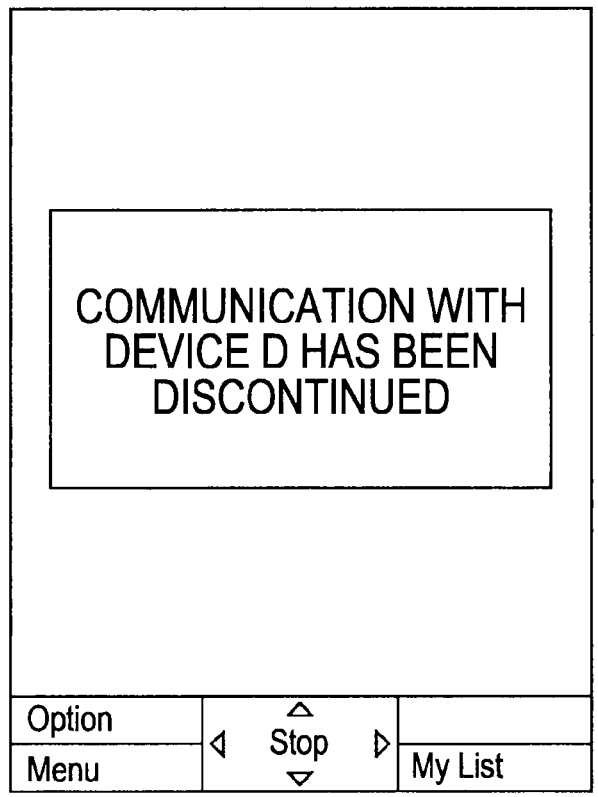
FIG. 32 is a diagram illustrating a screen example.

Upon this type of request having been transmitted, the deletion reporting unit 612 of the device A301 displays a GUI screen such as that shown in FIG. 32 for example, and notifies the user that the device D304 has been deleted from the second communication net. In FIG. 32, a message notifying the user of the deletion, such as "communication with the device D (the device to be deleted) has been disconnected" is displayed on the GUI screen reporting the deletion.

In step S422, the deletion confirmation receiving unit 621 of the device B302 obtains the device deletion confirmation request transmitted by the device A301, and deletes the equipment information and profile information relating to the device D304 according to the request thereof. In step S423, the deletion reporting unit 622 of the device B302 displays a GUI screen such as that shown in FIG. 32 for example, and notifies the user that the device D304 has been deleted from the second communication net 310. In step S424, the deletion confirmation receiving unit 621 of the device B302 supplies a deletion confirmation response such as that shown in the response 662 in FIG. 33, to the device A301 as the response corresponding to the request.

As shown in FIG. 33, the response 662 includes a deletion confirmation response 675. The deletion confirmation response 675 is response information to report that the user has been notified. In step S404, the device A301 obtains the response 662 supplied by the device B302.

Similarly, in step S442 the deletion confirmation receiving unit 621 of the device C303 obtains the device deletion confirmation request transmitted by the device A301, and deletes the equipment information and profile information relating to the device D304 in accordance with the request thereof. In step S443, the deletion reporting unit 622 of the device C303 displays a GUI screen such as that shown in FIG. 32 for example, and notifies the user that the device D304 has been deleted from the second communication net 310. In step S444 the deletion confirmation receiving unit 621 of the device C303 supplies a deletion confirmation response such as that shown in the response 662 in FIG. 33, to the device A301, as a response corresponding to the request. In step S405 the device A301 obtains the response 662 supplied by the device C303.

The device D304 is deleted from the second communication net 310 with the above-described processing. Accordingly, hereafter, the device A301 performs song data distribution to only the devices C302 and C303. That is to say, in step S406 the music player application 212 of the device A301 performs transmission of song data (streaming playing/transmission) as to the devices B302 and C303. A GUI indicating that the song data is being transmitted, such as shown in FIG. 11 for example, is displayed on the monitor of the device A301.

Following the transmission, the music player application 212 of the device B302 in step S425 and the music player application 212 of the device C303 in step S445 each play while receiving the song data distributed by the device A301 (streaming playing/receiving). A GUI indicating that the song data is being received/played, such as that shown in FIG. 12 for example, is displayed on the monitor for each device of the devices B302 and C303.

Note that each process in the processing described above is performed in between the transmission and reception of the data during streaming playing. That is to say, the communication system 300 can readily delete the device D304 from the second communication net 310 while continuing the data distribution by the device A301 as to the devices B302 and C303.

Note that in the case of deleting multiple devices which are slaves (receiving devices), the communication system 300 can readily delete by performing the above-described processing for each of the devices to be deleted. Also, in the case of the device A301 which is the master (communication managing device) moving outside the range, from the perspective of the master, all of the slaves have moved outside the range, so all of the slaves are deleted from the second communication net 310, and the second communication net 310 is dissolved. That is to say, the communication system 300 can readily dissolve the second communication net 310 by repeating the above-described processing. Thus, the communication system 300 can improve the usability of the application that provides communication between devices.

The giving of the playing control authority has been described above, but a device not given playing control authority because of not being given playing control authority at the time of adding the device or because playing control authority that had been given has been removed, can be given playing control authority anew. That is to say, a "does not have playing control authority" device can be upgraded to a "has playing control authority" device.

For example, let us say that in the state shown in FIG. 7C, playing control authority has not been given to the device C303. A case wherein playing control authority is given to the device C303 (the device C303 is upgraded) from this state will be described.

Figure 34:
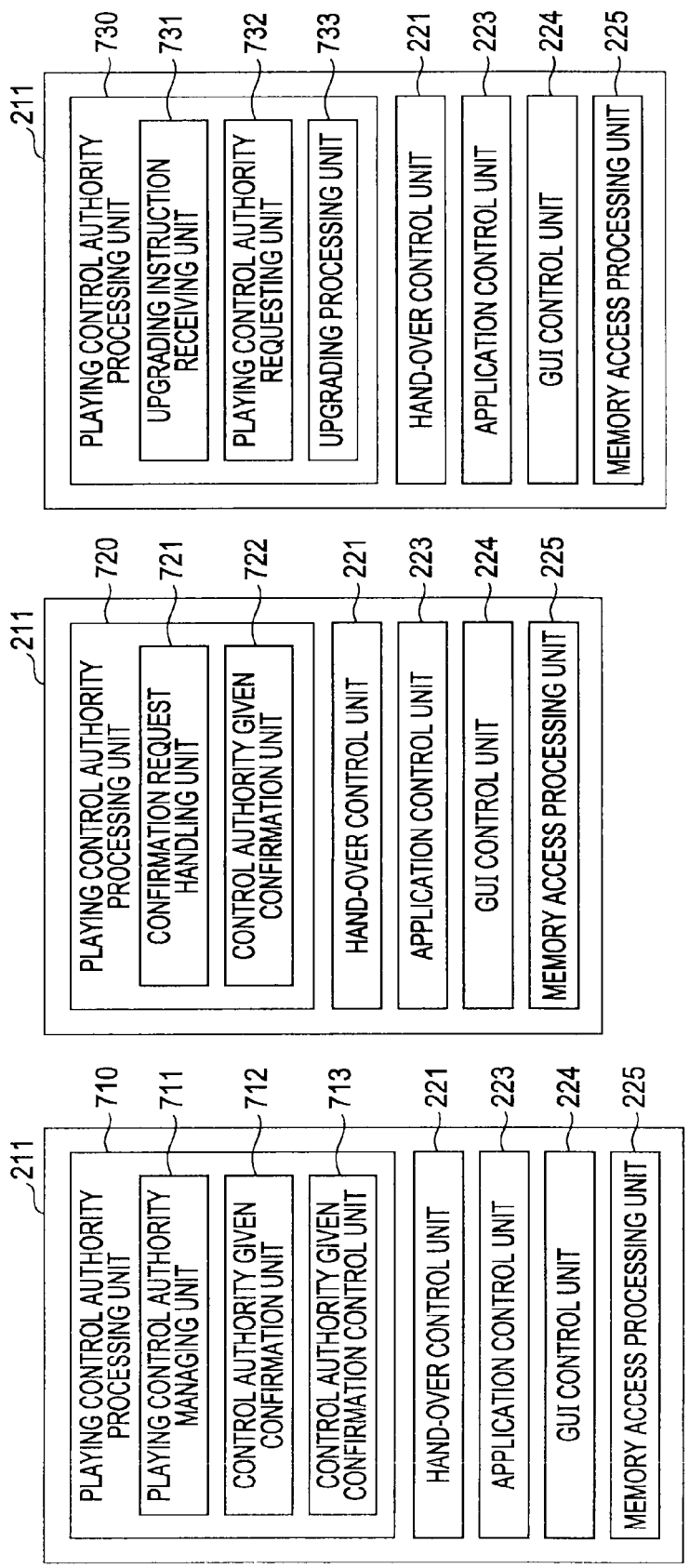
FIGS. 34A through 34C are diagrams illustrating a configuration example of a functional block relating to upgrading processing that each device has.

FIGS. 34A through 34C show a configuration example of the content case application 211 for each device in this case. FIG. 34A shows a configuration example of the content cast application 211 of the device A301. FIG. 34B shows a configuration example of the content cast application 211 of the device B302. FIG. 34C shows a configuration example of the content cast application 211 of the device C303. The portions similar to the configuration described with reference to FIG. 4 have the same reference numerals appended thereto.

As shown in FIG. 34A, as a function of the content cast application 211, the device A301 has a playing control authority processing unit 710, hand-over control unit 221, application control unit 223, GUI control unit 224, and memory access processing unit 225.

The playing control authority processing unit 710 performs processing relating to giving playing control authority as a master (communication managing device) in the second communication net 310. The playing control authority processing unit 710 has a playing control authority managing unit 711, control authority given confirmation unit 712, and control authority given confirmation control unit 713.

The playing control authority managing unit 711 performs processing as to the request of the playing control authority giving. The control authority given confirmation unit 712 displays a GUI screen on a monitor or the like to perform confirmation with the user of giving playing control authority. The control authority given confirmation control unit 713 confirms with the user as to whether or not playing control authority is to be given to a receiving device other than the receiving device requesting giving the playing control authority.

As shown in FIG. 34B, as a function of the content cast application 211, the device B302 has a playing control authority processing unit 720, hand-over control unit 221, application control unit 223, GUI control unit 224, and memory access processing unit 225.

The playing control authority processing unit 720 performs processing to control the giving of the playing control authority as a receiving device other than the receiving device requesting giving the playing control authority. The playing control authority processing unit 720 has a confirmation request handling unit 721 and control authority given confirmation unit 722.

The confirmation request handling unit 721 obtains and responds to the confirmation request for giving control authority supplied by the device A301 which is the master. The control authority given confirmation unit 722 confirms with a user whether or not to acknowledge giving of the control authority.

As shown in FIG. 34C, as a function of the content cast application 211, the device C303 has a playing control authority processing unit 730, hand-over control unit 221, application control unit 223, GUI control unit 224, and memory access processing unit 225.

The playing control authority processing unit 730 performs processing as a receiving device requesting giving the playing control authority. The playing control authority processing unit 730 has an upgrading instruction receiving unit 731, playing control authority requesting unit 732, and upgrading processing unit 733.

The upgrading instruction receiving unit 731 receives instructions to obtain the playing control authority input by a user operation or the like, for example. The playing control authority requesting unit 732 requests the master to give playing control authority, based on the instructions obtained by the upgrading instruction receiving unit 731. The upgrading processing unit 733 performs upgrading processing to give playing control authority in the case that giving of the playing control authority has been allowed.

Figure 35:
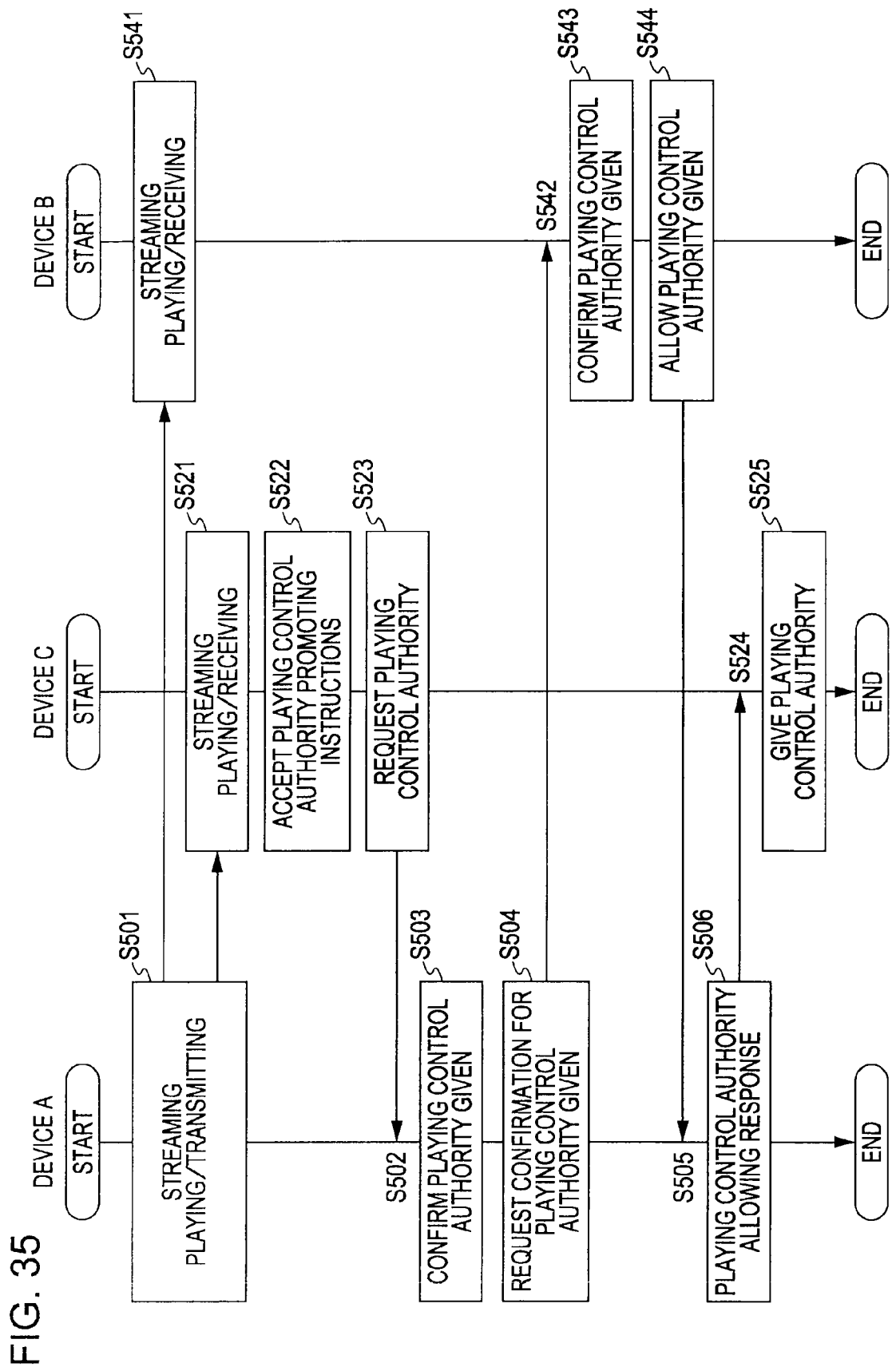
FIG. 35 is a flowchart describing the flow of upgrading processing.

Next, an example of the flow of processing relating to the upgrading of the device C303 will be described with reference to the flowchart in FIG. 35. Note that description will be made with reference to FIGS. 36 and 37 as appropriate.

First, in step S501 the music playing application 212 of the device A301 performs transmission of song data as to the devices B302 and C303 (streaming playing/transmission). A GUI indicating that the song data is being transmitted, such as that shown in FIG. 11 for example, is displayed on the monitor of the device A301.

The music player application 212 of the device B302 in step S521 and the music player application 212 of the device C303 in step S541 each play while receiving song data distributed by the device A301 (streaming playing/receiving). A GUI indicating that the song data is being received/played, such as shown in FIG. 12 for example, is displayed on the monitor for each device of the devices B302 and C303.

Upon the user operating a GUI screen at the device C303 to input the instructions (upgrading instructions) to give playing control authority to the device C303, the upgrading instruction receiving unit 731 receives the upgrading instructions thereof in step S522. In step S523 the playing control authority requesting unit 732 performs the request for the playing control authority as to the device A301 which is the master, based on the instructions thereof. The playing control authority managing unit 711 of the device A301 obtains the request thereof in step S502. In step S503 the control authority given confirmation unit 712 displays a GUI screen, such as that shown in FIG. 36, on a monitor for the user to confirm whether or not to give playing control authority to the device C303, thereby confirming the desire of the user of the device A301.

Figure 36:
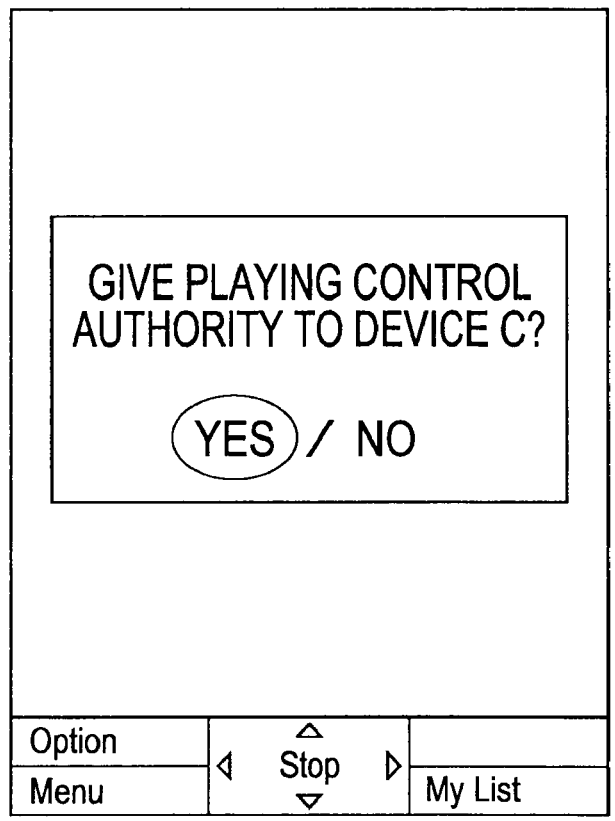
FIG. 36 is a diagram illustrating a screen example.

As shown in FIG. 36, the GUI screen displays a message of "Give playing control authority to device C?" along with the selection options of "Yes" and "No". The user selects "Yes" or "No", thereby controlling the giving of the playing control authority.

Also, in step S504 the control authority given confirmation control unit 713 requests confirmation as to whether or not the user has acknowledged giving the playing control authority to the device B302 which is a receiving device other than the device requesting giving the control authority. Note that in the case there are multiple "receiving devices other than the receiving device requesting giving the playing control authority", the control authority given confirmation control unit 713 performs confirmation as to each device.

The confirmation request handling unit 721 of the device B302 obtains the request thereof in step S542. In step S543 the control authority given confirmation unit 722 displays a GUI screen, such as that shown in FIG. 36, on a monitor to confirm with the user whether or not to give playing control authority to the device C303, thereby confirming the desire of the user of the device B302.

In the case that the user selects "Yes" and allows giving of the playing control authority, in step S544 the confirmation request handling unit 721 supplies the response allowing the giving of the playing control authority to the device A301. The control authority given confirmation control unit 713 of the device A301 obtains the response thereof in step S505.

Upon the response being obtained, in step S506 the playing control authority managing unit 711 of the device A301 supplies the response allowing the giving of the playing control authority to the device C303 which is the request source for giving the playing control authority. The playing control authority requesting unit 732 of the device C303 obtains the response thereof in step S524.

Figure 37:
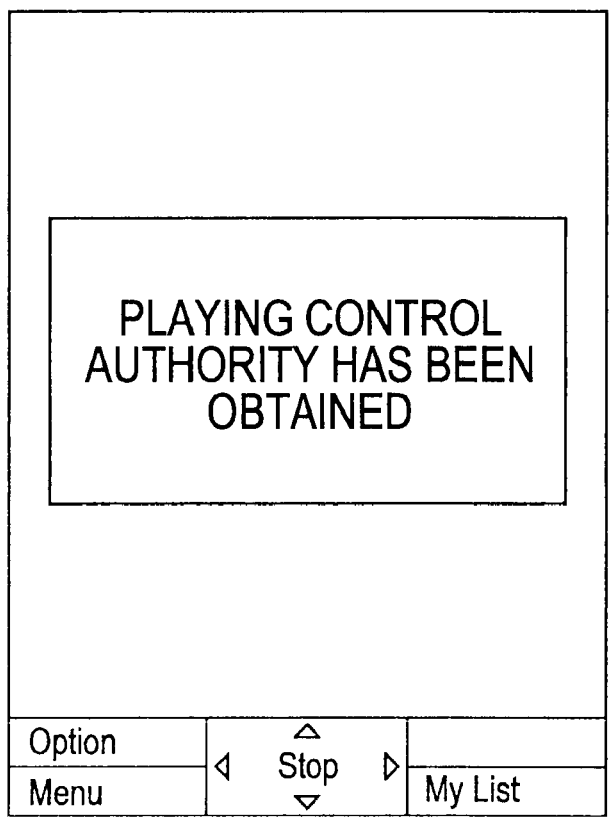
FIG. 37 is a diagram illustrating a screen example.

Upon the response being obtained, in step S525 the upgrading processing unit 733 gives playing control authority to the device C303, and displays on a monitor a screen, such as that shown in FIG. 37 for example, notifying the user that playing control authority has been given. In FIG. 37, a message indicating giving the playing control authority is displayed on the screen, such as "playing control authority has been obtained", for example.

Note that in the case that in step S503 the user of the device A301 has denied giving the playing control authority to device C303, or in the case that in step S543 the user of the device B302 has denied giving the playing control authority to device C303, the playing control authority managing unit 711 of the device A301 supplies the response denying giving the playing control authority to the device C303 which is the request source for giving the playing control authority. This denial response ends the series of processing is ended. That is to say, in this case the device C303 is not upgraded to "with playing control authority".

Also, the above-described processing is performed in between processing of streaming playing. Thus, the communication system 300 suppresses great increases of influence to other processing by the giving of the playing control authority, while readily giving the playing control authority to a device. That is to say, the control system 300 can improve usability of the application providing communication between devices.

Note that removing (downgrading) of the playing control authority may also be performed. In this case, in the above-described upgrading processing, instead of giving the control authority, the control authority is taken away.

With each of the above examples, description has been given to express the various devices performing exchanging and synchronizing of profile information after updating with the second communication net 310 (e.g. steps S106, S107, S125, and S149 in FIG. 10), but in the event thereof, exchanging and synchronizing may be performed for other information, not only profile information. For example, the various devices may exchange, synchronize, and so forth, equipment information and capability information of the various devices.

This information is exchanged by the first communication and second communication in the event of updating the device configuration of the second communication net 310, as described above. Accordingly, at the time of ending the updating of the second communication net 310, each device obtains information of the other devices. However, there may be cases wherein, after updating the second communication net 310, for example the user changes the device settings to update the equipment information and capability information for each device. In this case, there is the concern that the mutual information each device has by sending/receiving at the time of updating the second communication net 310 is no longer the newest information. The equipment information and capability information can be used after updating of the second communication net 310, so unless this information is the newest, problems can occur when using the information thereof.

Thus, as described above, by exchanging and synchronizing not only the profile information but also the equipment information and capability information, each device can constantly have the newest information.

Now, the information belonging to each device which is shared by each device making up the second communication net 310 after updating (equipment information, capability information, and profile information and so forth) not only can be used for processing such as adding and deleting a device as described above, but for example a change to the communication managing device which is the distribution source of the content for example (role-switch) can be performed.

A role switch will be described next. A case of performing a role switch to switch the device distributing the data will be described, regarding a second communication net that is a network using the second communication generated as described above, and that distributes content data from one device to other devices by an application.

Figure 38B:
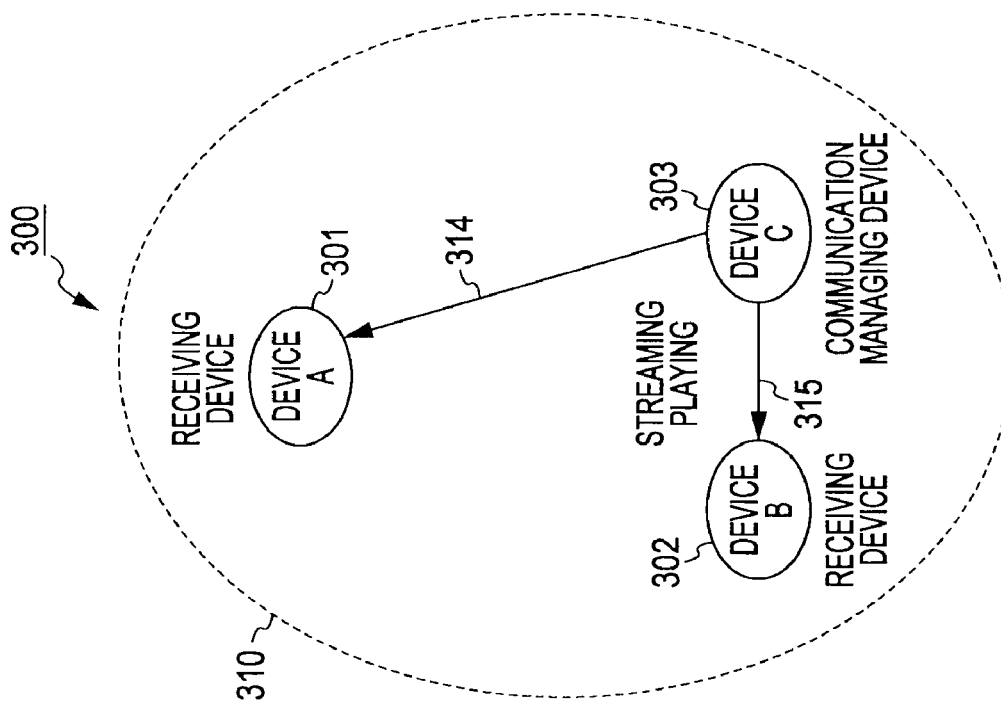
FIGS. 38A and 38B are diagrams illustrating a primary configuration example of a communication system to which the present invention has been applied.
Figure 38A:
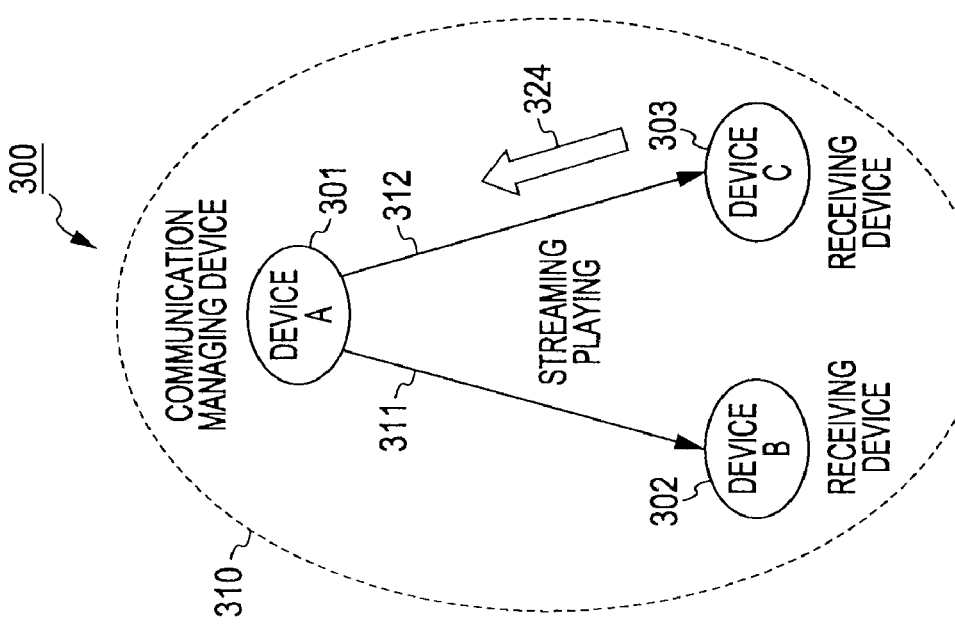

FIGS. 38A and 38B are diagrams showing an example of the communication system to which the present invention has been applied. As shown in FIG. 38A, let us say that in the communication system 300, the devices A301, B302, and C303 establish the second communication net 310 and are in the state shown in FIG. 7C. That is to say, as indicated by the arrows 311 and 312, the device A301 performs streaming playing (data distribution) of content data such as music or movies for example, towards the devices B302 and C303. The devices B302 and C303 play while receiving the data thereof.

As shown in FIG. 38B, this second communication net 310 is changed to a communication net wherein the device C303 is the communication managing device. That is to say, as indicated by the arrows 314 and 315, the device C303 performs streaming playing (data distribution) of content data such as music or movies for example, towards the devices A301 and B302. The devices A301 and B302 operate as receiving devices, and play while receiving the data transmitted by the device C303.

In the event of switching the communication managing device (distribution source of streaming data) to another device, with the method described with reference to FIGS. 1 through 6, even if the device C303 is caused to communicate with the devices A301 and B302, the communication between the devices A301 and B302 is not controllable. Also, even if the device A301 is controlled and the devices B302 and C303 are caused to communication by establishing a connection using the method described with reference to FIGS. 1 through 6, the communication between the devices B302 and C303 is not controllable.

In the case that three or more devices form the second communication net, switching the communication managing device with the method described with reference to FIGS. 1 through 6 is difficult.

Thus, with the communication system 300, the processing is performed as described below. That is to say, as indicated by the arrow 324 in FIG. 38A, the device C303 issues a role-switch command to the device A301 which is currently the communication managing device requesting a switch in communication managing devices.

The device A301 obtaining the role switch command disconnects from the second communication with the device B302, based on the request thereof. Further, the device C303 establishes a connection of second communication with the device B302. Thus, the second communication net 310 is formed with the device C303 as the center thereof, whereby the device C303 begins streaming data distribution as to the devices A301 and B302, as indicated by the arrows 314 and 315 in FIG. 38B.

Thus, the communication managing device can be readily switched from the device A301 to the device C303. That is to say, the distribution source of the content data can be readily changed, and the usability of the application providing communication between devices can be improved.

Figure 39A:
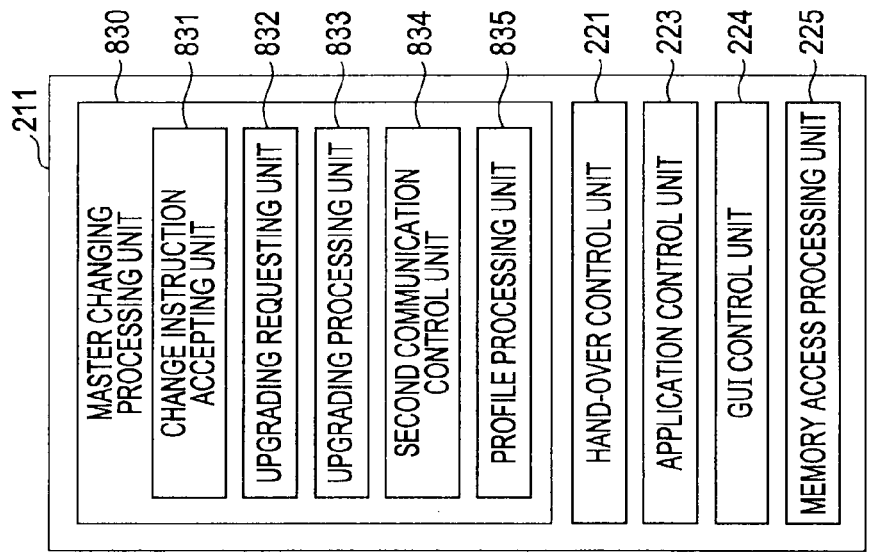
FIGS. 39A through 39C are diagrams illustrating a configuration example of a functional block that each device has.
Figure 39B:
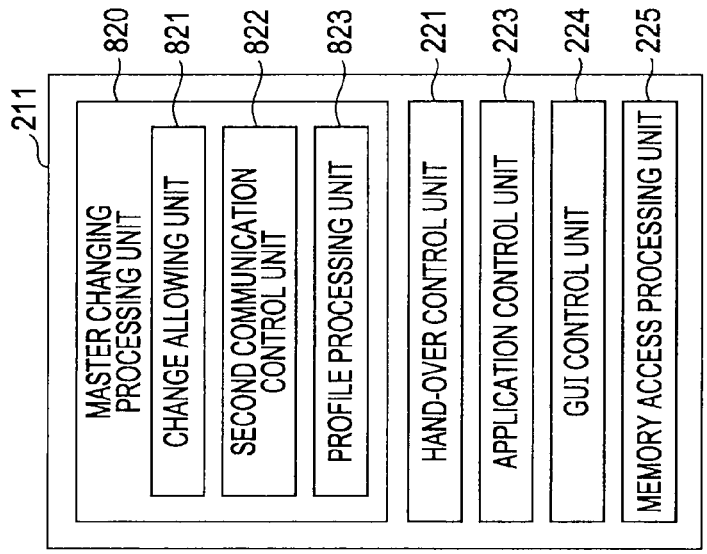
Figure 39C:
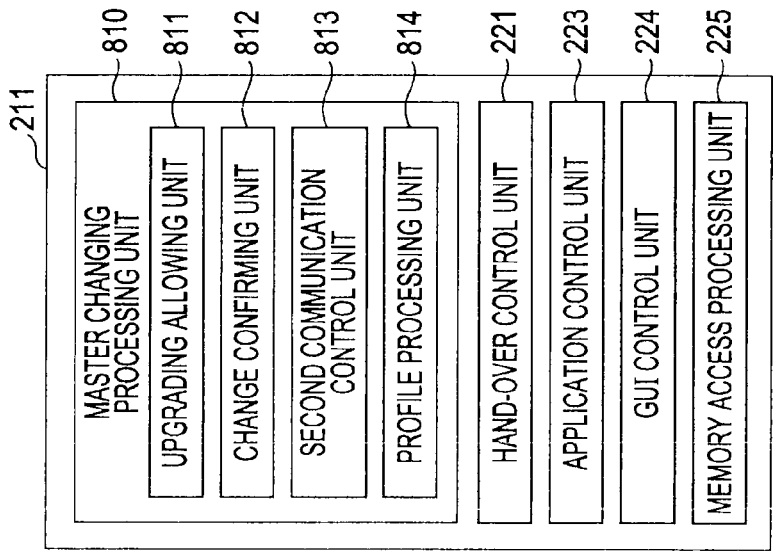

A specific method thereof will be described next. FIGS. 39A through 39C are functional block diagrams showing the configuration example of the content cast application 211 of the devices A301, B302, and C303 in FIGS. 38A and 38B. FIG. 39A shows a configuration example of the content cast application 211 of the device A301. FIG. 39B shows a configuration example of the content cast application 211 of the device B302. FIG. 39C shows a configuration example of the content cast application 211 of the device C303. The portions that are similar to the configuration described with reference to FIG. 4 have the same reference numerals appended thereto.

That is to say, as shown in FIG. 39A, as a function of the content cast application, the device A301 has a master changing processing unit 810, hand-over control unit 221, application control unit 223, GUI control unit 224, and memory access processing unit 225.

The master changing processing unit 810 is a processing unit to perform processing for the current master (communication managing device) in the second communication net 310, and performs processing relating to changing the master (communication managing device). The master changing processing unit 810 has an upgrading allowing unit 811, change confirming unit 812, second communication control unit 813, and profile processing unit 814.

The upgrading allowing unit 811 accepts a master (communication managing device) upgrading request from a receiving device, and allows or denies the request thereof. The change confirming unit 812 confirms the master change to the receiving devices other than the request source. The second communication control unit 813 disconnects the second communication with the device B302 which is a receiving device not upgrading to the master. The profile processing unit 814 sends/receives profile information with the other devices forming the second communication net 310 after the master change, and synchronizes the content thereof. That is to say, the profile processing unit 814 performs processing to share the mutual profile information.

As shown in FIG. 39B, as a function of the content cast application 211, the device B302 has a master changing processing unit 820, hand-over control unit 221, application control unit 223, GUI control unit 224, and memory access processing unit 225.

The master changing processing unit 820 performs processing relating to changing a receiving device that is not upgraded to the master (not requested), i.e. the master (communication managing device) as a receiving device that is not the request source of upgrading to master. The master changing processing unit 820 has a change allowing unit 821, second communication control unit 822, and profile processing unit 823.

The change allowing unit 821 receives the master change (confirmation) request supplied by the device A301 which is the master before changing, determines whether or not the change can be made as to the request, and responds with the determination results. The determining method as to whether or not the change can be made is optional, but for example may be determined based on user instructions. The second communication control unit 822 establishes a second communication connection with the device C303 which is the receiving device that is upgraded to the master. After the master change, the profile processing unit 823 performs sending/receiving of profile information with other devices making up the second communication net 310, and synchronizes the content thereof. That is to say, processing is performed in order to share mutual profile information.

As shown in FIG. 39C, as a function of the content cast application 211, the device C303 has a master changing processing unit 830, hand-over control unit 221, application control unit 223, GUI control unit 224, and memory access processing unit 225.

The master changing processing unit 830 performs processing relating to changing the master (communication managing device) as the receiving device of the request source of the master change. The master changing processing unit 830 has a change instruction receiving unit 831, upgrading requesting unit 832, upgrading processing unit 833, second communication control unit 834, and profile processing unit 835.

The change instruction receiving unit 831 displays a GUI screen on a monitor, for example, and receives master change instructions from the user or the like for example. The upgrading requesting unit 832 requests upgrading to a master (switching the master) as to the device A301 which is the current master. The upgrading processing unit 833 performs processing to upgrade the device C303 to a master in the case that the request has been acknowledged. That is to say, the device C303 is changed from a receiving device to the communication managing device 301. The second communication control unit 834 establishes a second communication connection with the device B302 which is a receiving device that has not been upgraded to a master. After the master change, the profile processing unit 835 performs sending/receiving of profile information with the other device making up the second communication net 310, and synchronizes the content thereof. That is to say, the profile processing unit 835 performs processing to share the mutual profile information.

Figure 40:
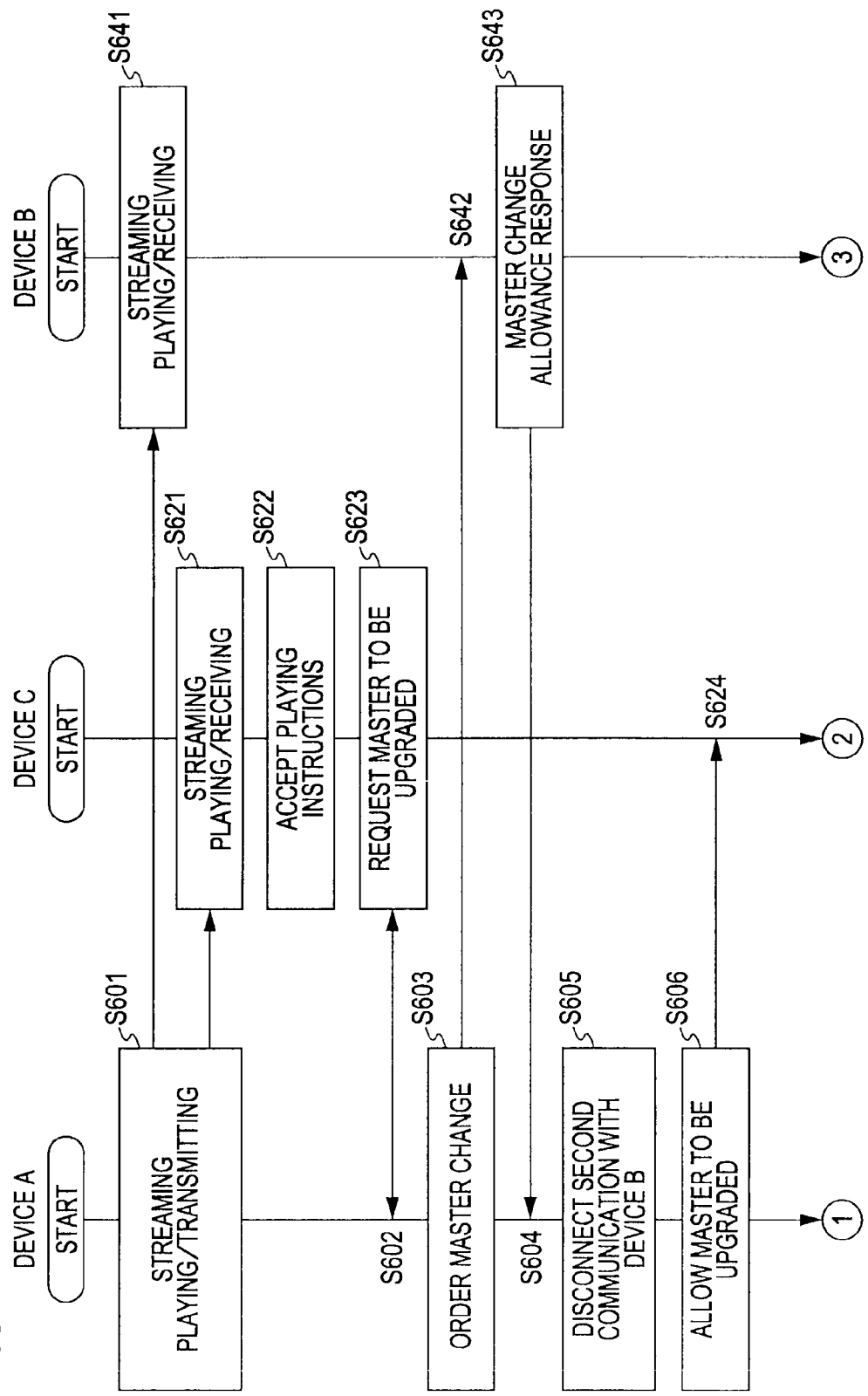
FIG. 40 is a flowchart describing the flow of processing of a roll switch.

Next, an example of processing flow in the master upgrading of the device C303 such as that shown in FIGS. 38A and 38B will be described with reference to the flowcharts in FIGS. 40 and 41. Note that description will be made with reference to FIG. 42 as appropriate.

First, in the state shown in FIG. 38A, the application of the device A301 performs content data transmission for the streaming playing of the content data (streaming playing/transmission). A case of streaming playing of song data will be described below, using song data as an example of content data. That is to say, as an example of the application, the music player application 212 will be used for description. It goes without saying that the content for streaming playing may be any content such as moving images, still images, multi-media content and so forth, and the application is also optional. A GUI indicating that the song data is being transmitted is displayed on the monitor of the device A301 at this time.

In step S641, the music player application 212 of the device B302 plays while receiving the song data distributed by the device A301 (streaming playing/receiving). A GUI indicating that the song data is being received/played is displayed on the monitor of the device B302 at this time.

In step S621, the music player application 212 of the device C303 plays while receiving the song data distributed by the device A301 (streaming playing/receiving). A GUI indicating that the song data is being received/played is displayed on the monitor of the device C303 at this time.

In this state, let us say that the user displays a predetermined GUI screen on the monitor of the device C303, operates the GUI screen thereof, and displays a song name list of the song data stored in the device C303. Upon the user selecting one of the songs therein to play, the change instruction receiving unit 831 of the device C303 receives the selection thereof in step S622 as the master change instructions.

In a system such as that shown in FIG. 38, distribution of the song data can only be performed by the device A301 which is the master. That is to say, the device C303 is not capable of performing distribution of song data that the device C303 itself has. In order to distribute the song data itself that the device C303 itself has, the device C303 has no option but to upgrade to a master. Accordingly, at the point-in-time that the user selects playing of the song data stored in the device C303, the change instruction receiving unit 831 considers this to be an request for upgrading to a master, and in step S623 performs the master upgrading request as to the device A301, corresponding to the request thereof. The upgrading allowing unit 811 of the device A301 obtains this request in step S602.

Figure 42:
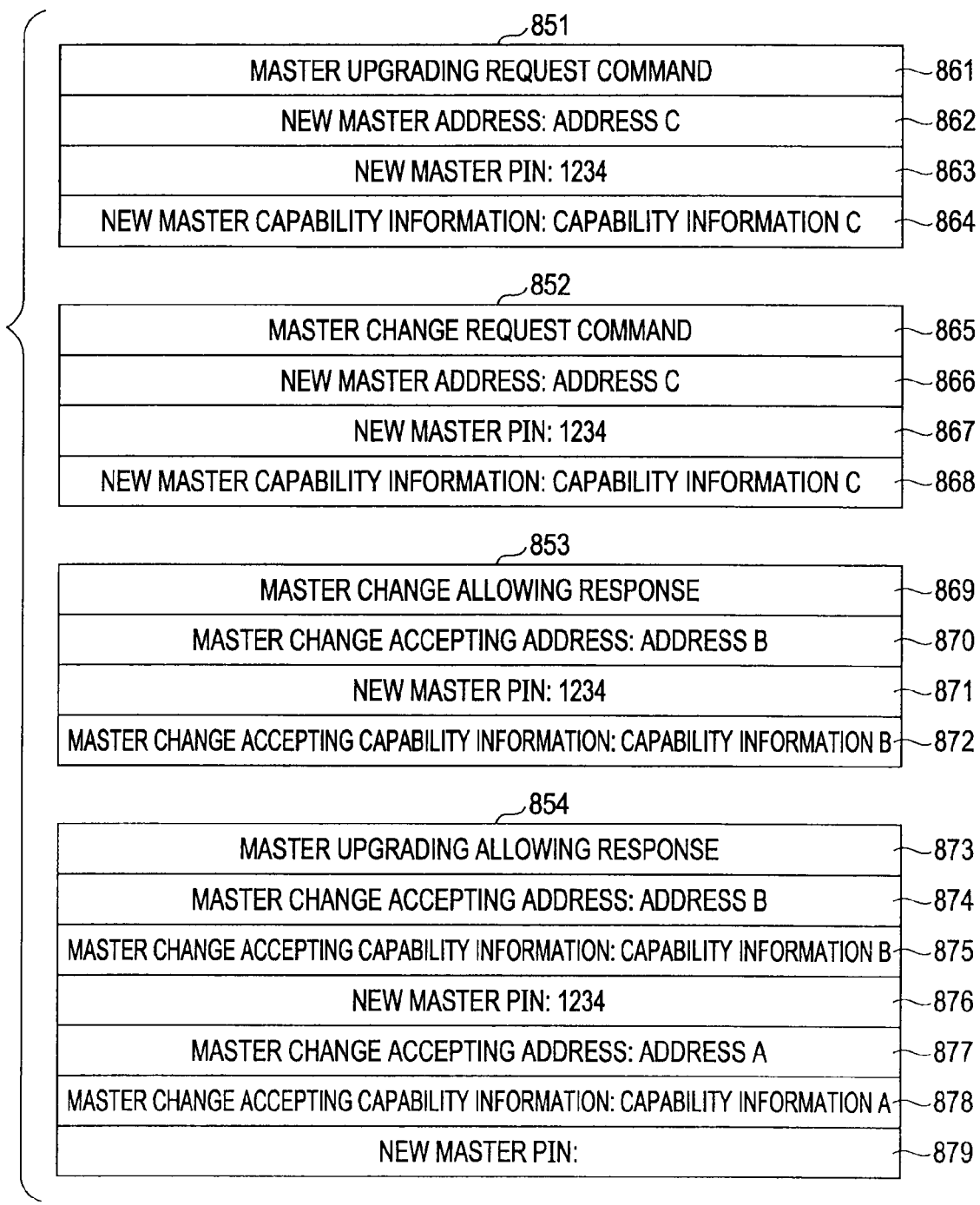
FIG. 42 is a diagram illustrating a configuration example of data that is exchanged.

The master upgrade request 851 in FIG. 42 is a diagram showing a configuration example of an request transmitted from the device C303 to the device A301 in step S623. In FIG. 42, the master upgrade request 851 has a master upgrading requested command 861, new master address 862, new master PIN (Personal Identification Number) 863, and new master capability information 864.

The master upgrading requested command 861 is an requesting command to request upgrading to a master. The new master address 862 is equipment information, and in the case that the request is allowed, is an address (identification information) of the device to be the new master after the master updating. In the case of FIG. 42, the address C which is the address of the device C303 is provided as the new master address 862. The new master PIN 863 is a passkey for confirming a session, and is identification information for confirming which request the response corresponds to, depending on the value of the new master PIN 863. In the case of FIG. 42, the new master PIN 863 is generated by the device C303 which requests the upgrade. Let us say that the value "1234" is provided here as the new master PIN 863. Note that the new master PIN 863 may be any value, and the data length is also optional. The new master capability information 864 is capability information of a device operating as the new master after the master change. In the case of FIG. 42, the capability information C which is the capability information of the device C303 is provided as the master capability information 864.

Returning to FIG. 40, in step S603 the change confirming unit 812 transmits the master change request as to the device B302 which is a receiving device not upgrading to a master, thereby confirming whether or not the master can be changed to the device C303.

A master change request 852 is a diagram illustrating a configuration example of an request transmitted from the device A301 to the device B302 in step S603. In FIG. 42, a master change request command 865, new master address 866, new master PIN 867, and new master capability information 868 are included in the master upgrade request 851. That is to say, the format of the master change request 852 is the same as the format of the master upgrade request 851.

The master change request command 865 is a command requesting the confirmation of whether or not the master can be changed. The new master address 866 is equipment information, and is an address (identification information) of the device to be the new master after master upgrading. In the case of FIG. 42, the address C which is the address of the device C303 is provided as a new master address 866. The new master PIN 867 is a passkey for confirming a session. In the case of FIG. 42, the new master PIN 867 is provided the value "1234" similar to the new master PIN 863. The new master capability information 868 is capability information of the device operating as the new master after master updating. In the case of FIG. 42, the capability information C is provided as the master capability information 868.

Returning to FIG. 40, the change allowing unit 821 of the device B302 obtains the request thereof in step S642. Upon determining whether or not the change can be made, in step S643 the change allowing unit 821 supplies a master change allowing response to the device A301 as a response to the request.

A master change allowing response 853 in FIG. 42 is a diagram showing a configuration example of an request transmitted from the device B302 to the device A301 in the step S643. In step S42, a master change allowing response 869, master change reception address 870, new master PIN 871, and master change acceptance capability information 872 are included in the master change allowing response 853.

A master change allowing response 869 is a response allowing the master change. The master change receiving address 870 is equipment information, and is an address (identification information) of the device allowing the master change, i.e. the transmission source of this master change allowing response 853. In the case in FIG. 9, the address B which is the address of the device B302 is provided as the master change receiving address 870. The new master PIN 871 is a passkey for confirming a session. In the case of FIG. 42, the new master PIN 871 is provided with the value "1234" which is the same as that of the new master PIN 863. The master change acceptance capability information 872 is capability information of the device operating as the new master after the master upgrading. In the case of FIG. 42, the capability information C is provided as master change acceptance capability information 878.

The change confirming unit 812 of the device A301 obtains the response thereof in step S604.

Upon obtaining the master change allowing response which allows the master change, in step S605 the second communication control unit 813 of the device A301 disconnects the second communication with the device B302 which is a receiving device not upgrading to a master (that is not the request source of the master upgrade). In step S606, the upgrade allowing unit 811 supplies the response of allowing the master upgrading as to the device C303 which is the receiving device of the request source.

A master upgrading allowance 854 in FIG. 42 is a diagram showing a configuration of a response transmitted from the device A301 to the device C303 in step S606. In FIG. 42, a master change allowing response 873, master change receiving address 874, master change acceptance capability information 875, new master PIN 876, master change receiving address 877, master change acceptance capability information 878, and new master PIN 879 are included.

The master change allowing response 873 is a response allowing upgrade to a master. The master change receiving address 874 is equipment information, and is an address (identification information) of the device allowing the master change. In the case of FIG. 42, the address B is provided as the master change receiving address 874. The new master PIN 876 is a passkey for confirming a session. In the case of FIG. 42, the new master PIN 876 is provided the value "1234" which is the same as the new master PIN 863. The master change acceptance capability information 875 is capability information of the device allowing the master change. In the case of FIG. 42, the capability information B is provided as the master change acceptance capability information 875.

Information of the other receiving devices allowing the master change is input in the master change receiving address 877, master change acceptance capability information 878, and new master PIN 879. In the case of FIG. 42, the information of device A is input. That is to say, for all of the receiving devices of the second communication net 310, an address, capability information, and master PIN are stored in the master upgrading allowance 854. However, the device A301 has been a master so the new master PIN can be omitted.

Note that upon the user of the device B302 denying the master change, in step S643 a master change denial response indicating denial of the master change, instead of a master change allowing response, is transmitted to the device A301. Upon the response being obtained by the device A301, in step S606 the upgrading allowing unit 811 supplies the response of master upgrading denial as to the device C303 which is the receiving device of the request source. The denial response ends the series of processing. That is to say, in the case the device C303 is not upgradeable to a master.

The upgrading requesting unit 832 of the device C303 obtains the response thereof in step S624.

Figure 41:
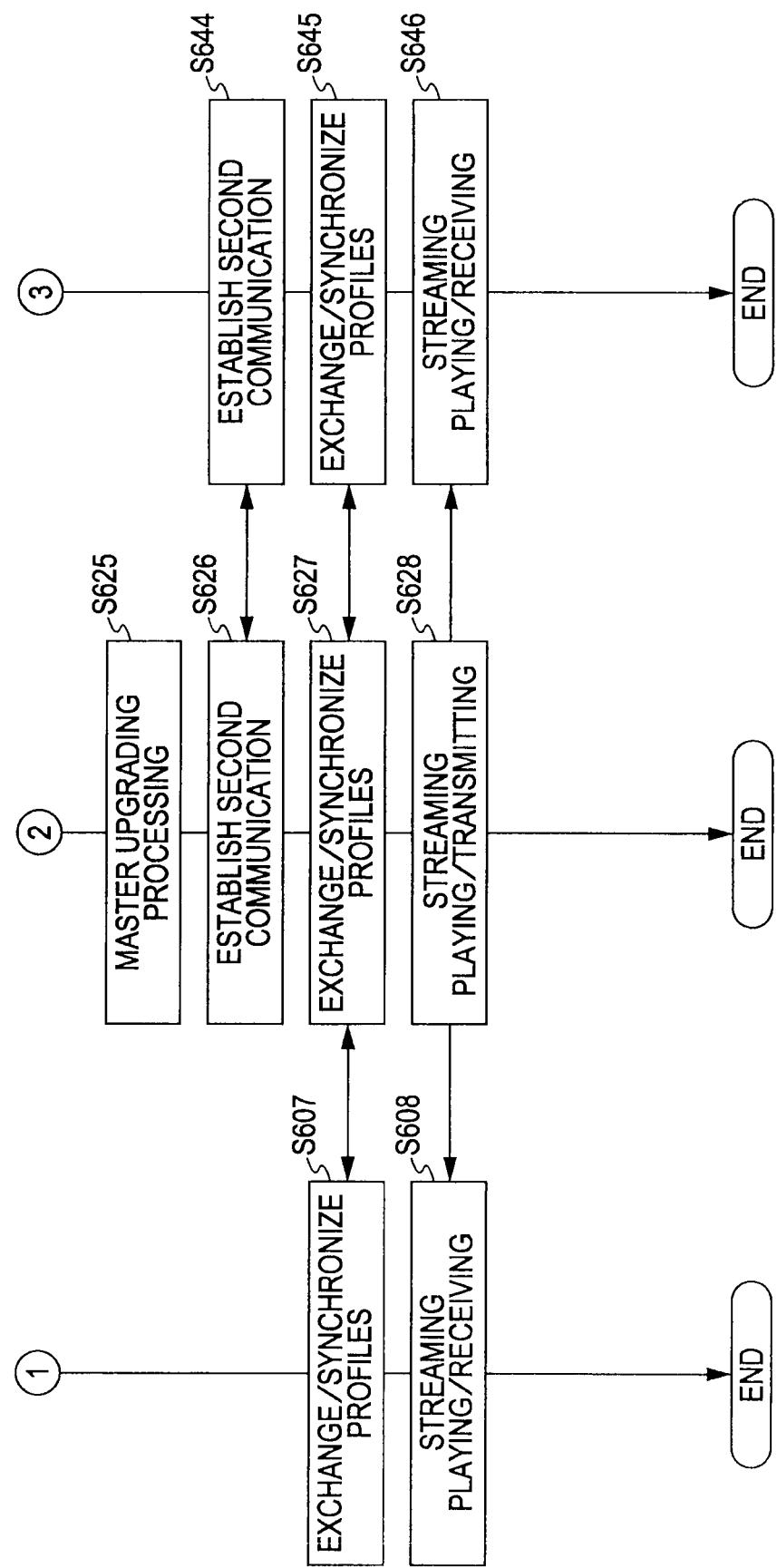
FIG. 41 is a flowchart following FIG. 40 describing the flow of processing of a roll switch.

Upon obtaining the master upgrading allowance, the upgrading processing unit 833 of the device C303 upgrades the device C303 to a master in step S625 of FIG. 41. Upon upgrading to a master, the second communication control unit 834 of the device C303 establishes a second communication connection with the device B302 which is the receiving device that has been disconnected from the second communication with the device A301. Corresponding to this processing, in step S644 the second communication control unit 822 of the device B302 also establishes a second communication connection with the device C303.

Upon the second communication net wherein the device C303 is the master being established, the profile processing unit 823 of the device C303 exchanges and synchronizes profile information with the devices A301 and B302. Corresponding to this processing, in step S607 the profile processing unit of the device A301 exchanges and synchronizes profile information. Also, in step S645 the profile processing unit 835 of the device B302 exchanges and synchronizes profile information.

In step S628, the music player application 212 of the device C303 which is the new master performs transmission of song data for the streaming playing of the content data (streaming playing/transmission). A GUI indicating that song data is being transmitted is displayed on the monitor of the device C303 at this time.

In step S646, the music player application 212 of the device B302 plays while receiving the song data distributed by the device C303 (streaming playing/receiving). A GUI indicating that song data is being received/played is displayed on the monitor of the device B302 at this time.

In step S608, the music player application 212 of the device B302 plays while receiving the song data distributed by the device C303 (streaming playing/receiving). A GUI indicating that song data is being received/played is displayed on the monitor of the device B302 at this time.

Thus, the device A301 which had been the master before the change disconnects the second communication with the device B302, based on the master upgrading request obtained from the device C303 which is the device of the request source for master upgrading. Thus, the communication between the devices A301 and B302 which had not been controllable by the device C303 can be disconnected, and a role switch such as that described with reference to FIGS. 38A and 38B can be realized with a simpler process. Thus, the usability of the application providing communication between devices can be improved.

As described above, with the processing at the time of updating the second communication net, the equipment information and capability information is shared, whereby a portion of the information exchanged in the event of a role switch, which is described with reference to FIG. 42, can be omitted. For example, information that has already been obtained does not have to be obtained again. Accordingly, each device only has to transmit the information that the partner does not have, of the information shown in FIG. 42. Thus, the amount of information exchanged can be reduced, and the burden on the devices relating to the role switching processing and the communication net can be reduced.

Note that as described above, each device synchronizes the equipment information and capability information, and shares the newest information, whereby problems occurring in the case of performing role switching using the information shared by the various devices can be suppressed.

A case wherein three devices make up the second communication net 310 is described above, but should not be limited to this, and the number of devices is optional. For example, four or more devices may be used.

Note that the functional blocks that the various devices have for various cases of the communication system 300 are described above, but only the functions relating to processing are described, and the functional blocks that the various devices have are not limited to these. For example, the various devices of the communication system may simultaneously have a functional block of another device or a functional block of another case.

The above-described series of processing can be executed with hardware or can be executed with software. In the case of executing the above-described series of processing with software, a program making up the software is installed from a network or recording medium.

The recording medium is not restricted to the removable media 131 made up of a magnetic disk (including a flexible disk), optical disk (including CD-ROM and DVD), magneto-optical disk (including MD), semiconductor memory, or the like, which are separate from the device main unit, but may be made up of ROM 112 in which a program is recorded, or a hard disk included in the storage unit 123, which are provided in the state of having been built into the device main unit.

Note that the steps describing the program recorded in the recording medium include the processing performed in a time-series manner in the order described above as a matter of course, but also include processing executed in parallel or individually, not necessarily in a time-series manner.

Also, in the present Specification, the term "system" refers to the entirety of equipment made up of multiple devices.

Note that with the above description, the configuration which is described as one device may be divided, and be configured as multiple devices. Conversely, the configuration which is described as multiple devices can be configured integrally. Also, it goes without saying that configurations other than the above described may be added to the configuration of the various devices. Further, as long as the configuration and operation as an overall system are substantially the same, a portion of the configuration of a certain device may be included in the configuration of another device. That is to say, the embodiments of the present invention are not limited to the above-described embodiments; rather, various of modifications may be made within the scope and intent of the present invention.

The present application contains subject matter related to that disclosed in Japanese Priority Patent Application JP 2008-242443 filed in the Japan Patent Office on Sep. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:

first receiving means for receiving from a first other information processing device equipment information of a second other information processing device that differs from said first other information processing device, via a first communication, and first connection information for a connection with said second other information processing device by a second communication that differs from said first communication;

first transmitting means for transmitting an address of the information processing device and second connection information that is for a connection with the information processing device itself by said second communication to said first other information processing device, via said first communication; and second receiving means for receiving content data from said second other information processing device by said second communication, based on said first connection information, said address of the information processing device, and said second connection information, for establishing a second communication with the first other information processing apparatus, and for transmitting content data to both the first other information processing apparatus and the second other information processing apparatus via the second communications, said second receiving means including hardware for establishing the second communication with the first other information processing apparatus.

2. An information processing device, comprising:

first receiving means for receiving from a first other information processing device equipment information of a second other information processing device that differs from said first other information processing device, via a first communication, and first connection information for connecting with said second other information processing device by a second communication that differs from said first communication;

first transmitting means for transmitting second connection information that is for connecting with the information processing device itself by said second communication to said first other information processing device, via said first communication;

second receiving means for receiving content data transmitted from said second other information processing device by said second communication, based on said first connection information and said second connection information;

third receiving means for receiving first user information which is information relating to said second other information processing device, from said second other information processing device by said second communication; and second transmitting means for transmitting second user information relating to the information processing device itself to said second other information processing device.

3. The information processing device according to claim 2, wherein said second communication establishes a connection only in a case that said second other information processing device allows a connection with said information processing device.

4. The information processing device according to claim 3, wherein said first receiving means further receives third connection information that is for connecting with said first other information processing device by said second communication from said first other information processing device, via said first communication.

5. The information processing device according to claim 4, further comprising:
   fourth receiving means for receiving a confirmation request that indicates that a third other information processing device will be deleted from a communication net by said second communication, which is from said second other information processing device;
   notifying means for notifying of the confirmation request that said third other information processing device will be deleted from said communication net, based on said confirmation request; and
   third transmission means for transmitting an allowance response corresponding to said confirmation request.

6. The information processing device according to claim 5, further comprising:
   a processor that performs a streaming playing by playing while receiving said content data from said second other information processing device by said second receiving means.

7. The information processing device according to claim 6, further comprising:
   confirming means for confirming whether or not to give a playing control authority which is a right to perform a playing control of said content data, wherein said first transmitting means further transmits confirmation results of said confirming means.

8. An information processing method implemented by an information processing device, the information processing method comprising:
   receiving, from a first other information processing device, at the information processing device, equipment information of a second other information processing device that differs from said first other information processing device, via a first communication, and first connection information for a connection with said second other information processing device by a second communication that differs from said first communication;
   transmitting, from the information processing device, an address of the information processing device and second connection information that is for a connection with the information processing device itself by said second communication to said first other information processing device, via said first communication;
   receiving at the information processing device content data from said second other information processing device by said second communication, based on said first connection information, said address of the information processing device, and said second connection information;
   establishing a second communication with the first other information processing apparatus; and
   transmitting content data to both the first other information processing apparatus and the second other information processing apparatus via the second communications.

9. An information processing device, comprising:
   first receiving means for receiving, via a first communication, from a first other information processing device, equipment information of a second other information processing device from said second other information processing device that differs from said first other information processing device, and first connecting information for connecting with said second other information processing device by a second communication that differs from said first communication;
   first confirming means for receiving a selection that said second other information processing device will be added to a communication net by said second communication; and
   means for transmitting content data to said second other information processing device, based on the selection.

10. An information processing device, comprising:
    first receiving means for receiving, via a first communication, from a first other information processing device, equipment information of a second other information processing device from said second other information processing device that differs from said first other information processing device, and first connecting information for connecting with said second other information processing device by a second communication that differs from said first communication;
    first confirming means for confirming that said second other information processing device will be added to a communication net by said second communication;
    second receiving means for receiving first user information which is information relating to said second other information processing device, from said second other information processing device by said second communication; and
    first transmitting means for transmitting second user information relating to the information processing device itself to said second other information processing device, by said second communication.

11. The information processing device according to claim 10, further comprising:
    a processor configured to establish said second communication with said second other information processing device, only in a case wherein an addition of said second other information processing device is allowed as a result of a confirmation by said first confirming means.

12. The information processing device according to claim 11, wherein second connecting information that is for connecting with the information processing device itself by said second communication is supplied from said first other information processing device to said second other information processing device by said first communication, and said first receiving means obtains third connection information to connect with said first other information processing device from said first other information processing device.

13. The information processing device according to claim 12, further comprising:
    second confirming means for confirming a deletion of a third other information processing device from said communication net; and
    confirmation control means for confirming with other information processing devices the deletion of the third other information processing device from said communication net.

14. The information processing device according to claim 13, further comprising:
second transmitting means for performing a streaming transmitting of content data to other information processing devices with said second communication.

15. The information processing device according to claim 14, wherein said first confirming means further confirms whether or not to give a playing control authority which is a right to perform a playing control of said content data to said second other information processing device.

16. An information processing method implemented by an information processing apparatus, the information processing method comprising:
receiving, from a first other information processing device, at the information processing apparatus, equipment information of a second other information processing device from said second other information processing device that differs from said first other information processing device, via a first communication, and first connecting information for connecting with said second other information processing device by a second communication that differs from said first communication;
displaying an image to confirm an addition of the second other information processing device in response to the receiving;
receiving, at the information processing apparatus, in response to the displaying, a selection that said second other information processing device will be added to a communication net by said second communication; and
transmitting, from the information processing apparatus, content data to said second other information processing device, based on the selection.

17. An information processing device, comprising:
first transmitting means for transmitting to a first other information processing device equipment information of a second other information processing device that differs from said first other information processing device, via a first communication, and first connection information for connecting with said second other information processing device by a second communication that differs from said first communication;
receiving means for receiving from said first other information processing device equipment information of said first other information processing device and second connection information for connecting with said first other information processing device with said second communication; and
second transmitting means for transmitting to said second other information processing device said equipment information of said first other information processing device and said second connection information for connecting with said first other information processing device with said second communication, via said second communication.

18. An information processing device, comprising:
first transmitting means for transmitting to a first other information processing device equipment information of a second other information processing device that differs from said first other information processing device, via a first communication, and first connection information for connecting with said second other information processing device by a second communication that differs from said first communication;
second transmitting means for transmitting to said second other information processing device equipment information of said first other information processing device and second connection information for connecting with said first other information processing device with said second communication, via said second communication;
first receiving means for receiving first user information which is information relating to said second other information processing device by said second communication from said second other information processing device; and
third transmitting means for transmitting second user information relating to the information processing device itself to said second other information processing device.

19. The information processing device according to claim 18, wherein a connection is established only in a case wherein said second communication between said first other information processing device and said second other information processing device has been allowed a connection with said first other information processing device by said second other information processing device.

20. The information processing device according to claim 19, further comprising:
second receiving means for receiving said second connection information from said first other information processing device via said first communication, wherein said first transmitting means further transmits to said first other information processing device third connecting information for connecting to the information processing device itself by said second communication, via said first communication.

21. The information processing device according to claim 20, further comprising:
third receiving means for receiving a confirmation request indicating deleting a third other information processing device from a communication net by said second communication, which is transmitted from said second other information processing device;
notifying means for notifying that said third other information processing device will be deleted from said communication net, based on said confirmation request; and
fourth transmitting means for transmitting an allowance response corresponding to said confirmation request.

22. The information processing device according to claim 21, further comprising:
a processor that performs a streaming playing that plays while receiving content data from said second other information processing device by said second receiving means.

23. The information processing device according to claim 22, further comprising:
confirming means for confirming whether or not a playing control authority, which is a right to perform a playing control of said content data, can be given, wherein said second transmitting means further transmits confirmation results of said confirming means.

24. An information processing method implemented by an information processing device, the information processing method comprising:
transmitting, from the information processing device, to a first other information processing device equipment information of a second other information processing device that differs from said first other information processing device, via a first communication, and first connecting information for connecting with said second other information processing device by a second communication that differs from said first communication;
receiving, from said first other information processing device, at the information processing device, equipment information of said first other information processing device and second connection information for connecting with said first other information processing device with said second communication; and transmitting, from the information processing device, to said second other information processing device said equipment information of said first other information processing device and said second connection information for connecting with said first other information processing device with said second communication, via said second communication.

25. An information processing device, comprising:
a first reception unit configured to receive from a first other information processing device equipment information of a second other information processing device that differs from said first other information processing device, via a first communication, and first connection information for a connection with said second other information processing device by a second communication that differs from said first communication;
a first transmission unit configured to transmit an address of the information processing device and second connection information that is for a connection with the information processing device itself by said second communication to said first other information processing device, via said first communication; and
a second reception unit configured to receive content data from said second other information processing device by said second communication, based on said first connection information, said address of the information processing device, and said second connection information, to establish a second communication with the first other information processing apparatus, and to transmit content data to both the first other information processing apparatus and the second other information processing apparatus via the second communications, said second reception unit including hardware to establish the second communication with the first other information processing apparatus.

26. An information processing device, comprising:
a first reception unit configured to receive from a first other information processing device equipment information of a second other information processing device that differs from said first other information processing device, via a first communication, and first connection information for connecting with said second other information processing device by a second communication that differs from said first communication;
a first transmission unit configured to transmit an address of the information processing device and second connection information that is for connecting with the information processing device itself by said second communication to said first other information processing device, via said first communication;
a second reception unit configured to receive content data from said second other information processing device by said second communication, based on said first connection information, said address, and said second connection information;
a third reception unit configured to receive first user information which is information relating to said second other information processing device, from said second other information processing device by said second communication; and a second transmission unit configured to transmit second user information relating to the information processing device itself to said second other information processing device.

27. The information processing device according to claim 26, wherein said second communication establishes a connection only in a case that said second other information processing device allows a connection with said information processing device.

28. The information processing device according to claim 27, wherein said first reception unit further receives third connection information that is for connecting with said first other information processing device by said second communication from said first other information processing device, via said first communication.

29. The information processing device according to claim 28, further comprising:
a fourth reception unit configured to receive a confirmation request that indicates that a third other information processing device will be deleted from a communication net by said second communication, which is from said second other information processing device;
a notification unit configured to notify of the confirmation request that said third other information processing device will be deleted from said communication net, based on said confirmation request; and
a third transmission unit configured to transmit an allowance response corresponding to said confirmation request.

30. The information processing device according to claim 29, further comprising:
a processor configured to perform a streaming playing by playing while receiving said content data from said second other information processing device by said second reception unit.

31. The information processing device according to claim 30, further comprising:
a confirmation unit configured to confirm whether or not to give a playing control authority which is a right to perform a playing control of said content data, wherein said first transmission unit further transmits confirmation results of said confirmation unit.

32. An information processing device, comprising:
a first reception unit configured to receive, via a first communication, from a first other information processing device, equipment information of a second other information processing device from said second other information processing device that differs from said first other information processing device, and first connecting information for connecting with said second other information processing device by a second communication that differs from said first communication;
a first confirmation unit configured to receive a selection that said second other information processing device will be added to a communication net by said second communication; and
a communication unit configured to transmit content data to said second other information processing device, based on the selection.

33. An information processing device, comprising:
a first reception unit configured to receive, via a first communication, from a first other information processing device, equipment information of a second other information processing device from said second other information processing device that differs from said first other information processing device, and first connecting information for connecting with said second other information processing device by a second communication that differs from said first communication;
a first confirmation unit configured to receive a selection that said second other information processing device will be added to a communication net by said second communication;
a communication unit configured to transmit content data to said second other information processing device, based on the selection;
a second reception unit configured to receive first user information which is information relating to said second other information processing device, from said second other information processing device by said second communication; and
a first transmission unit configured to transmit second user information relating to the information processing device itself to said second other information processing device, by said second communication.

34. The information processing device according to claim 33, further comprising:
a control unit configured to establish said second communication with said second other information processing device, only in a case wherein an addition of said second other information processing device is allowed as a result of a confirmation by said first confirmation unit.

35. The information processing device according to claim 34, wherein second connecting information that is for connecting with the information processing device itself by said second communication is supplied from said first other information processing device to said second other information processing device by said first communication, and said first reception unit obtains third connection information to connect with said first other information processing device from said first other information processing device.

36. The information processing device according to claim 35, further comprising:
a second confirmation unit configured to confirm a deletion of a third other information processing device from said communication net; and
a confirmation control unit configured to confirm with other information processing devices the deletion of the third other information processing device from said communication net.

37. The information processing device according to claim 36, further comprising:
a second transmission unit configured to perform a streaming transmitting of content data to other information processing devices with said second communication.

38. The information processing device according to claim 37,
wherein said first confirmation unit further confirms whether or not to give a playing control authority which is a right to perform a playing control of said content data to said second other information processing device.

39. An information processing device, comprising:
a first transmission unit configured to transmit to a first other information processing device equipment information of a second other information processing device that differs from said first other information processing device, via a first communication, and first connection information for connecting with said second other information processing device by a second communication that differs from said first communication;
a first reception unit configured to receive from said first other information processing device equipment information of said first other information processing device and second connection information for connecting with said first other information processing device with said second communication; and
a second transmission unit configured to transmit to said second other information processing device said equipment information of said first other information processing device and said second connection information for connecting with said first other information processing device with said second communication, via said second communication.

40. The information processing device according to claim 39, further comprising:
a second reception unit configured to receive first user information which is information relating to said second other information processing device by said second communication from said second other information processing device; and
a third transmission unit configured to transmit second user information relating to the information processing device itself to said second other information processing device.

41. The information processing device according to claim 40, wherein a connection is established only in a case wherein said second communication between said first other information processing device and said second other information processing device has been allowed a connection with said first other information processing device by said second other information processing device.

42. The information processing device according to claim 41, further comprising:
a third reception unit configured to receive said second connection information from said first other information processing device via said first communication, wherein said first transmission unit transmits to said first other information processing device third connecting information for connecting to the information processing device itself by said second communication, via said first communication.

43. The information processing device according to claim 42, further comprising:
a fourth reception unit configured to receive a confirmation request indicating deleting a third other information processing device from a communication net by said second communication, which is transmitted from said second other information processing device;
a notification unit configured to notify that said third other information processing device will be deleted from said communication net, based on said confirmation request; and
a fourth transmission unit configured to transmit an allowance response corresponding to said confirmation request.

44. The information processing device according to claim 43, further comprising:
a processor configured to perform a streaming playing that plays while receiving content data from said second other information processing device by said third reception unit.

45. The information processing device according to claim 44, further comprising:
a confirmation unit configured to confirm whether or not a playing control authority, which is a right to perform a playing control of said content data, can be given, wherein said second transmission unit transmits confirmation results of said confirmation unit.

* * * * *